(12) United States Patent
Ito et al.

(10) Patent No.: US 6,427,480 B1
(45) Date of Patent: Aug. 6, 2002

(54) REFRIGERANT CYCLE SYSTEM

(75) Inventors: Shigeki Ito, Okazaki; Kurato Yamasaki, Kariya; Teruyuki Hotta, Nagoya; Yasushi Yamanaka, Nakashima-gun; Atsushi Inaba, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/838,835

(22) Filed: Apr. 20, 2001

(30) Foreign Application Priority Data

| Apr. 26, 2000 | (JP) | ............ | 2000-126161 |
| Sep. 14, 2000 | (JP) | ............ | 2000-279956 |
| Jan. 9, 2001 | (JP) | ............ | 2001-001535 |
| Feb. 20, 2001 | (JP) | ............ | 2001-043971 |
| Feb. 26, 2001 | (JP) | ............ | 2001-050923 |

(51) Int. Cl.$^7$ ................................. F25B 39/04
(52) U.S. Cl. ........................................ 62/509
(58) Field of Search ................... 62/509, 512

(56) References Cited

U.S. PATENT DOCUMENTS

| 3,724,226 A | * | 4/1973 | Pachaly ............. 62/39 |
| 4,580,415 A | * | 4/1986 | Sakuma et al. ............. 62/502 |
| 4,624,114 A | * | 11/1986 | Sakuma et al. ............. 62/502 |
| 5,228,315 A | | 7/1993 | Nagasaka et al. |
| 5,651,265 A | | 7/1997 | Grenier |
| 6,032,473 A | | 3/2000 | Morimoto et al. |
| 6,170,272 B1 | * | 1/2001 | Backman ............. 62/117 |
| 6,267,173 B1 | | 7/2001 | Hu et al. |

FOREIGN PATENT DOCUMENTS

| EP | 0 960 755 | 12/1999 |
| FR | 2 750 761 | 1/1998 |
| JP | 60-126545 | 7/1985 |
| JP | A-61-27466 | 2/1986 |
| JP | A-3-164661 | 7/1991 |
| JP | A-7-280362 | 10/1995 |
| WO | WO 98/49502 | 11/1998 |

OTHER PUBLICATIONS

Patent Abstracts of Japan, Publication No. 2000–213826, dated Aug. 2, 2000.
Patent Abstracts of Japan, Publication No. 05/066071, dated Mar. 19, 1993.
Patent Abstracts of Japan, Publication No. 11/190561, dated Jul. 13, 1999.
Patent Abstracts of Japan, Publication No. 04/092714, dated Mar. 25, 1992.
Patent Abstracts of Japan, Publication No. 06/050615, dated Feb. 25, 1994.
Patent Abstracts of Japan, Publication No. 10/185336, dated Jul. 14, 1998.
Patent Abstracts of Japan, Publication No. 2000–213826, dated 08/02/00.
Patent Abstracts of Japan, Publication No. 05/066071, dated 03/19/93.
Patent Abstracts of Japan, Publication No. 11/190561, dated 07/13/99.

(List continued on next page.)

Primary Examiner—William Doerrler
Assistant Examiner—Malik N. Drake
(74) Attorney, Agent, or Firm—Harness, Dickey & Pierce, PLC

(57) ABSTRACT

A condenser of a refrigerant cycle system includes a first heat exchange unit into which refrigerant discharged from a compressor flows, a second heat exchange unit disposed at a downstream of the first heat exchange unit in a refrigerant flow direction, and a gas-liquid separator disposed between the first and second heat exchange units in the refrigerant flow direction. In the refrigerant cycle system, at least gas refrigerant separated in the gas-liquid separator flows into the second heat exchange unit so that an amount of liquid refrigerant stored in the gas-liquid separator is changed in accordance with a super-heating degree of refrigerant discharged from the compressor.

50 Claims, 37 Drawing Sheets

OTHER PUBLICATIONS

Patent Abstracts of Japan, Publication No. 04/092714, dated 03/25/92.

Patent Abstracts of Japan, Publication No. 06/050615, dated 02/25/94.

Patent Abstracts of Japan, Publication No. 10/185336, dated 07/14/98.

Patent Abstracts of Japan, Abstract of Japanese Patent Pub. No. 58–098679, dated Jun. 1983.

Patent Abstracts of Japan, Abstract of Japanese Patent Pub. No. 09–060986, dated Mar. 1997.

* cited by examiner

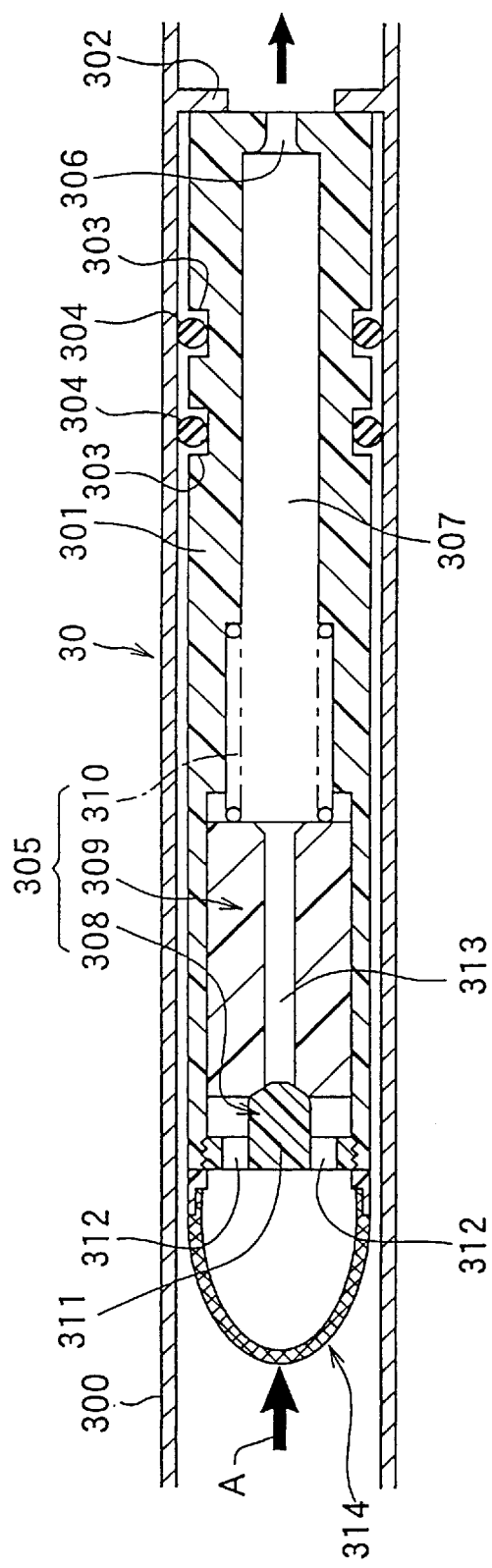
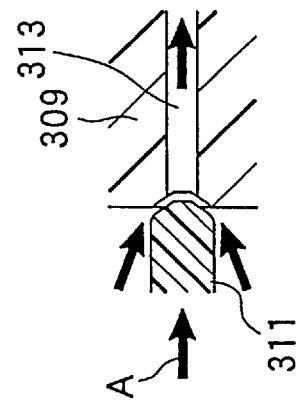
FIG. 7A
FIG. 7B

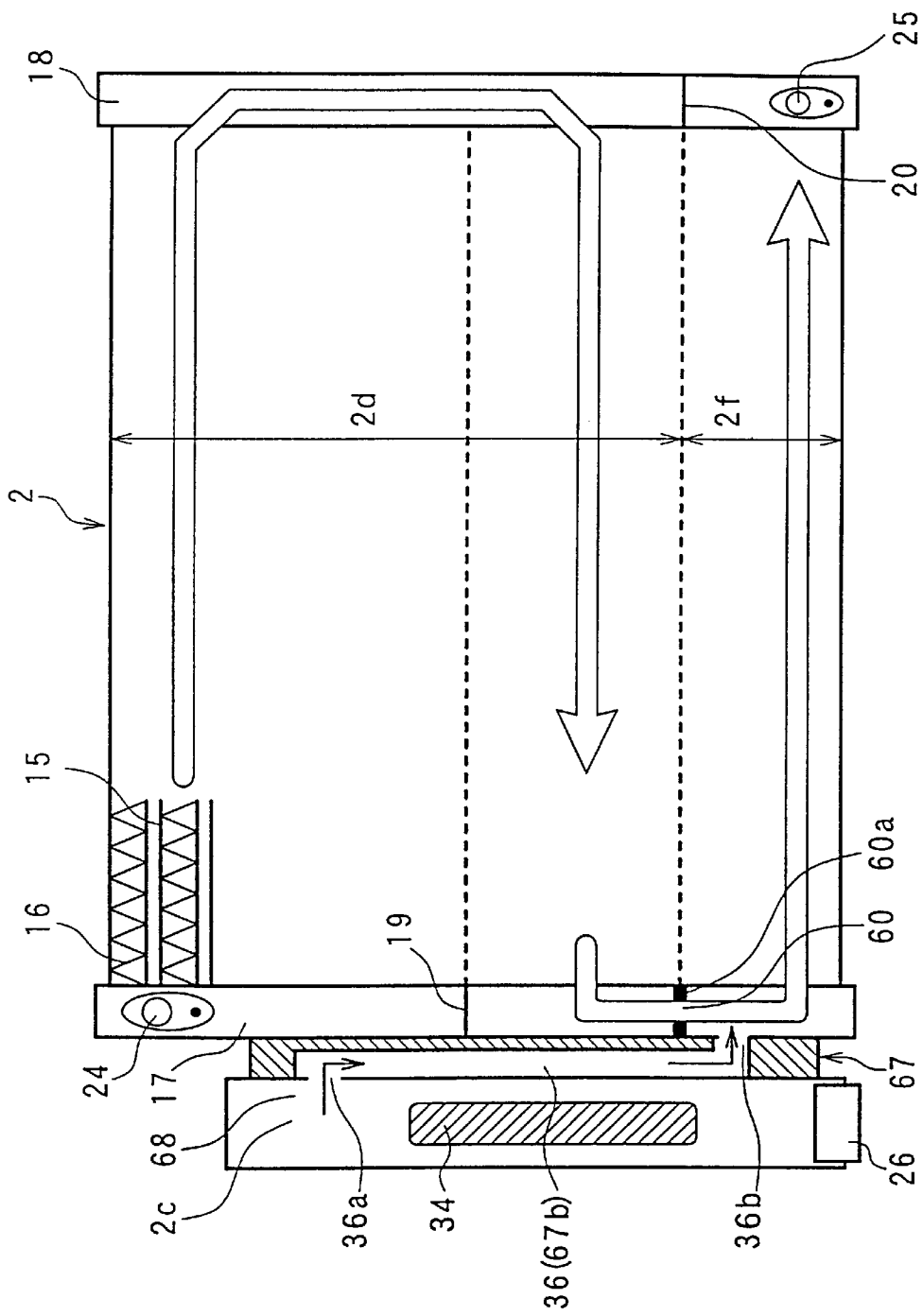

FIG. 48A
FIG. 48B
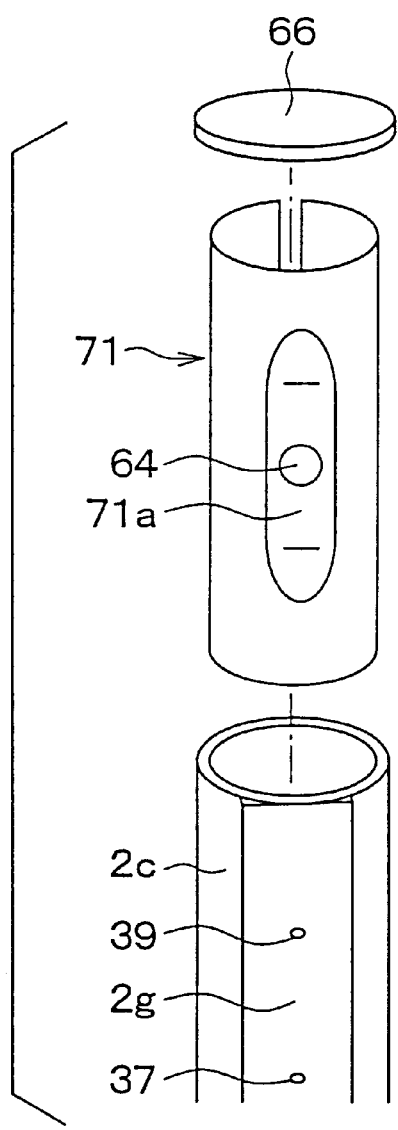
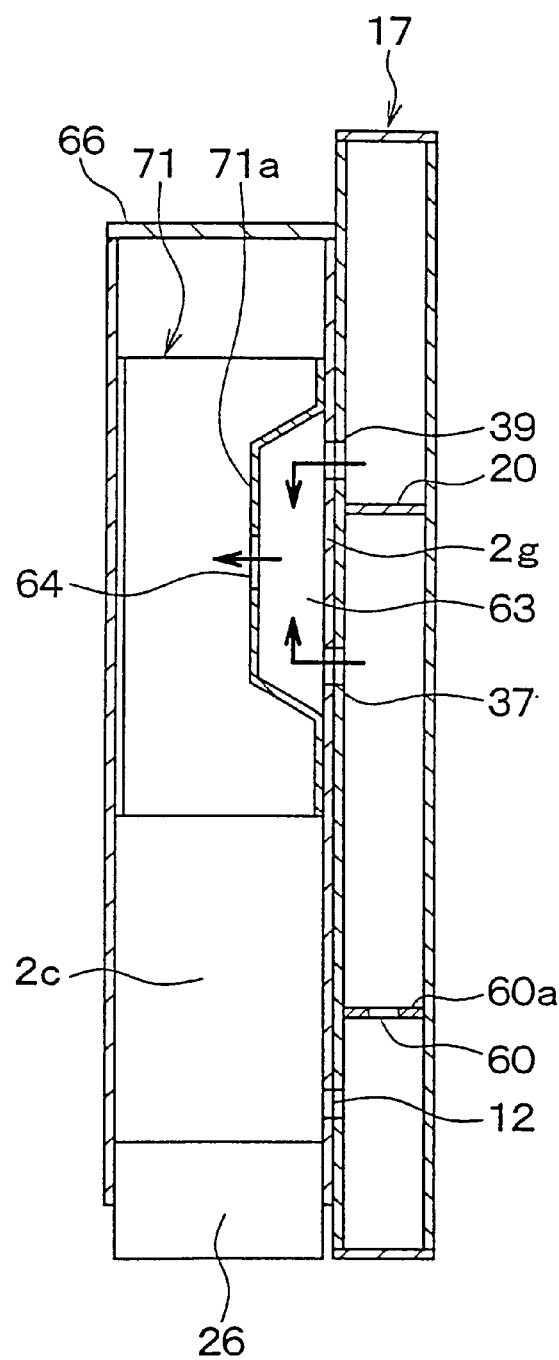

FIG. 51
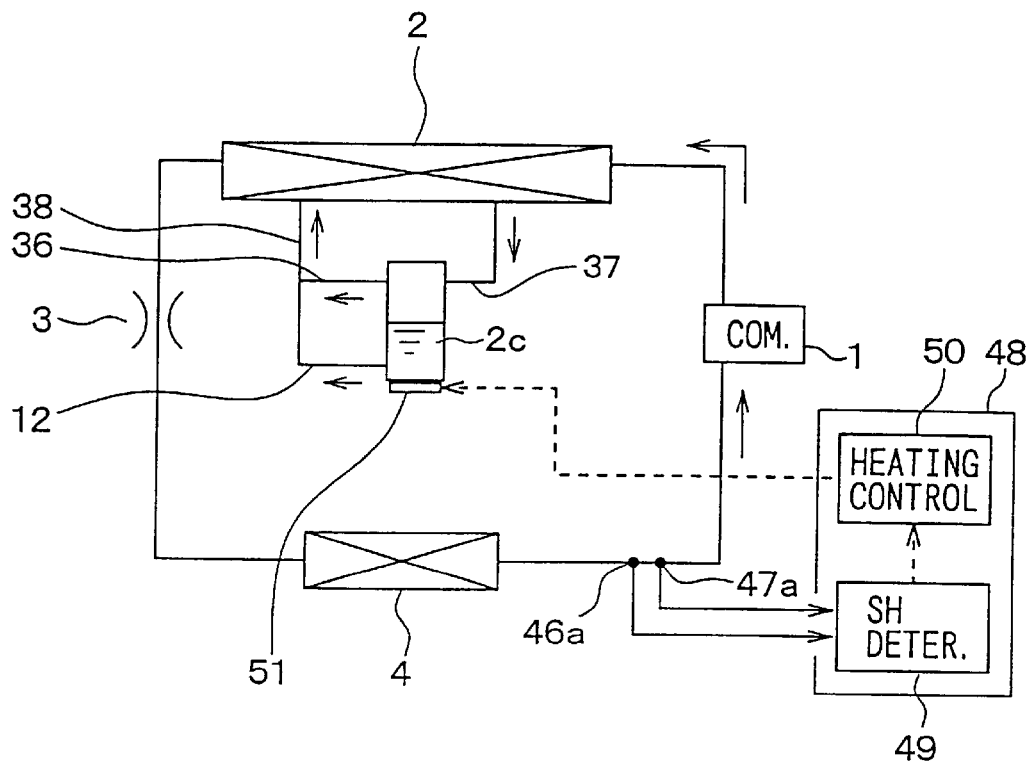
FIG. 52        PRIOR ART
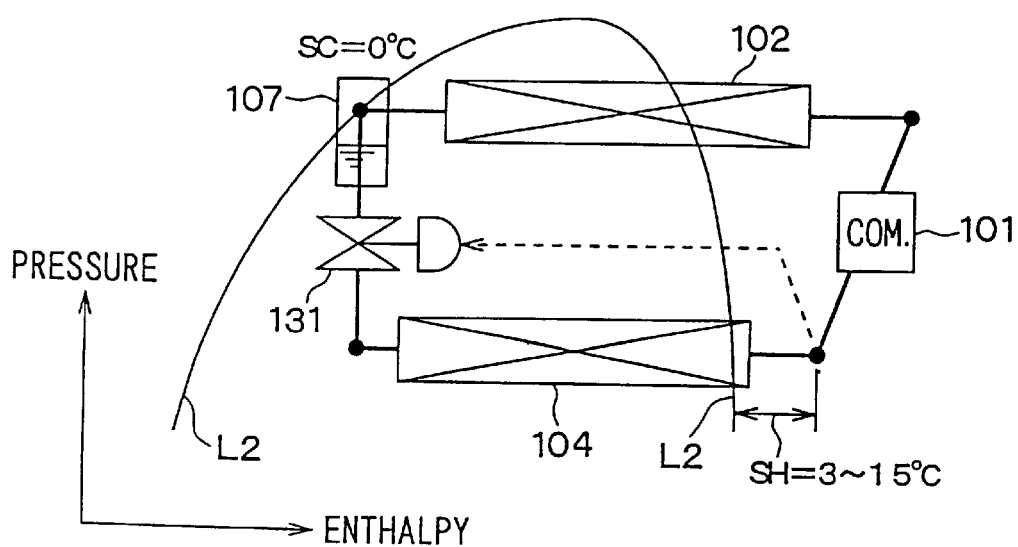

REFRIGERANT CYCLE SYSTEM

CROSS-REFERENCE TO RELATED APPLICATION

This application is related to Japanese Patent Applications No. 2000-126161 filed on Apr. 26, 2000, No. 2000-279956 filed on Sep. 14, 2000, No. 2001-1535 filed on Jan. 9, 2001, No. 2001-43971 filed on Feb. 20, 2001, and No. 2001-50923 filed on Feb. 26, 2001, the contents of which are hereby incorporated by reference.

BACKGROUND OF THE INVENTION

1. Field of the Invention

The present invention relates to a refrigerant cycle system suitable for an air conditioner for a vehicle and the like.

2. Description of Related Art

A conventional basic structure of a refrigerant cycle system is roughly divided into a receiver cycle and an accumulator cycle based on a difference between control of a super-heating degree of refrigerant at an outlet of an evaporator and control of a super-cooling degree of refrigerant at an outlet of a condenser.

As shown in the Mollier diagram of FIG. 52, the receiver cycle cools and condenses refrigerant discharged from a compressor 101 by a condenser 102, the refrigerant from the outlet of the condenser 102 is separated into gas and liquid refrigerant by a receiver 107 provided on the outlet side of the condenser 102. The liquid refrigerant from the receiver 107 is made to be expand and decompressed by a thermal type expansion valve 131, and then the low-pressure refrigerant after this decompression is evaporated by absorbing heat from air in an evaporator 104.

In this receiver cycle, since a gas-liquid interface of the refrigerant is formed within the receiver 107 and the refrigerant within the receiver 107 is maintained above a saturated liquid line L2, the super-cooling degree SC of the refrigerant at outlet of the condenser 102 is controlled to 0° C. On the other hand, the thermal type expansion valve 131 feeds back the super-heating degree SH of the refrigerant at outlet of the evaporator 104 to automatically adjust a valve opening for thereby maintaining the super-heating degree SH of the refrigerant at the outlet of the evaporator 104 within a predetermined range (for example, 3 to 15° C.).

On the other hand, in the accumulator cycle, as shown in the Mollier diagram of FIG. 53, a fixed restrictor 103 (fixed throttle) such as a capillary tube is directly connected to the output of the condenser 102 to directly decompress the refrigerant from the outlet of the condenser 102 in the fixed restrictor 103. Then, the low-pressure refrigerant after the decompression absorbs heat in the evaporator 104 for evaporation, and the refrigerant, which passed through this evaporator 104, is made to be flowed into an accumulator 108. Thereafter, the refrigerant from the outlet of the evaporator is separated into gas refrigerant and liquid refrigerant in the accumulator 108, and gas refrigerant within the accumulator 108 is sucked into a compressor 101.

In the accumulator cycle, since a gas-liquid interface of the refrigerant is formed within the accumulator 108 and the refrigerant within the accumulator 108 is maintained above a saturated gas line L1, the super-heating degree SH of the refrigerant sucked into the compressor 1 is maintained at 0° C. Because the fixed restrictor 103 is used as decompression means, the super-cooling degree SC of the refrigerant at outlet of the condenser 102 is determined depending on flow amount characteristics of the fixed restrictor 103, a cycle high pressure and a cycle refrigerant flow rate, and the super-cooling degree SC normally fluctuates in a range of 0 to about 20° C. because of fluctuations in cycle operating conditions.

However, in the former receiver cycle, since the thermal type expansion valve 131 feeds back the super-heating degree SH of the refrigerant at the outlet of the evaporator 104 to automatically adjust a valve opening, the receiver cycle system needs a complicate and precise valve mechanism, leading to an increase in cost.

In order for the thermal type expansion valve 131 to sense the super-heating degree SH of the refrigerant at outlet of the evaporator 104, there arises the need for setting an installation place for the thermal type expansion valve 131 in the vicinity of the evaporator 104, in other words, in a compartment. As a result, passage noise of the refrigerant, which occurs in a restriction passage of the thermal type expansion valve 131, becomes prone to propagate to an air conditioner user (occupant) within the compartment, and a problem of refrigerant passage noise becomes obvious.

In contrast, in the accumulator cycle, since the fixed restrictor 103 is used as the decompression means, this can be manufactured at exceedingly low cost as compared with the thermal type expansion valve 131. Since it is not necessary to place the fixed restrictor 103 in the vicinity of the evaporator, but the fixed restrictor 103 can be placed on the outside of the compartment (e.g., engine room side of the vehicle), there is an advantage that the refrigerant passage noise to be transmitted into the compartment can be greatly reduced. However, in a refrigerant cycle system for vehicle air conditioning, however, because the compressor 101 is driven by a vehicle engine, the number of revolutions of the compressor 101 also fluctuates greatly with the fluctuation in the speed of the engine. For this reason, if the fixed restrictor 103 is used for the decompression means, a refrigerant flow adjusting operation cannot be correspond sufficiently to the great fluctuation in the number of revolutions of the compressor 101 to greatly fluctuate the super-cooling degree SC of the refrigerant at outlet of the condenser, resulting in excessive fluctuation width. For example, when the compressor 101 is revolving at high speed, the compressor discharging capacity is increased, and the high pressure discharged from the compressor 101 is increased so that the super-cooling degree SC of the refrigerant at outlet of the condenser becomes too great. This occurrence of the excessive super-cooling degree SC causes an increase in a compressor driving power due to the increased high pressure to worsen the cycle efficiency.

In addition, there is another disadvantage that the accumulator 108 has inferior mountability. More specifically, the accumulator 108 is provided at the outlet side of the evaporator 104, that is, in a low-pressure passage, for separating gas-liquid of the low-pressure refrigerant having a large specific volume, it is necessary to make the capacity of the accumulator 8 larger than that of the receiver 107 provided at the high pressure side. Accordingly, when the refrigerant cycle equipments are mounted within such narrow space as the inside of a vehicle engine compartment, the mountability of the accumulator 108 will be more worsen than the receiver 107.

SUMMARY OF THE INVENTION

In view of the foregoing problems, it is an object of the present invention to provide a refrigerant cycle system with an improvement structure, which readily controls a super-heating degree of refrigerant discharged from a compressor and a super-heating degree at a refrigerant outlet side of an evaporator.

It is an another object of the present invention to provide a refrigerant cycle system with a compact structure, which can improve a cycle efficiency.

According to the present invention, in a refrigerant cycle system, a condenser for cooling and condensing refrigerant discharged from a compressor includes a first heat exchange unit, a second heat exchange unit at a downstream side of the first heat exchange unit in a refrigerant flow direction, and a gas liquid separator arranged between the first heat exchange unit and the second heat exchange unit in the refrigerant flow direction in such a manner that refrigerant discharged from a compressor is cooled in the first heat exchange unit and at least gas refrigerant separated in the gas-liquid separator flows into the second heat exchange unit. In the condenser, a refrigerant state flowing from the first heat exchange unit to the gas-liquid separator is changed in accordance with a super-heating degree of refrigerant discharged from the compressor to change a liquid refrigerant amount stored in the gas-liquid separator. The refrigerant state discharged from the compressor is in a super-heating state determined by a heat-exchanging amount of the first heat exchange unit, and a compression process of refrigerant in the compressor is basically an isentropic change due to adiabatic compression. Accordingly, when the super-heating degree of refrigerant discharged from the compressor changes, the refrigerant state from the first heat exchange unit to the gas-liquid separator is changed, and the amount of liquid refrigerant stored in the gas-liquid separator is changed. Thus, the super-heating degree of refrigerant discharged from the compressor can be controlled in a predetermined area, and the super-heating degree of refrigerant at an outlet of an evaporator can be controlled in a predetermined area.

Preferably, a communication path through which liquid refrigerant stored in the gas-liquid separator is introduced into an upstream side of the decompression device in the refrigerant flow direction. Accordingly, it can prevent a refrigerant shortage in the refrigerant cycle system, and an oil shortage in the compressor.

On the other hand, the refrigerant cycle system has an adjustment member for adjusting an amount of liquid refrigerant stored in the gas-liquid separator in accordance with the super-heating degree of refrigerant discharged from the compressor, and adjustment member reduces the amount of liquid refrigerant stored in the gas-liquid separator when the super-heating degree of refrigerant discharged from the compressor increases. Accordingly, when the super-heating degree of refrigerant discharged from the compressor increases, the amount of liquid refrigerant in the gas-liquid separator is reduced by the adjustment member, and the flow amount of refrigerant circulating in the refrigerant cycle system is increased. Therefore, it can restrict an increase of the super-heating degree of refrigerant at the outlet of the evaporator and an increase of the super-heating degree of refrigerant discharged from the compressor. Conversely, when the super-heating degree of refrigerant discharged from the compressor decreases, the amount of liquid refrigerant in the gas-liquid separator is increased by the adjustment member, and the flow amount of refrigerant circulating in the refrigerant cycle system is decreased. Therefore, it can restrict a decrease of the super-heating degree of refrigerant at the outlet of the evaporator and a decrease of the super-heating degree of refrigerant discharged from the compressor.

Preferably, the first heat exchange unit and the second heat exchange unit are disposed integrally to have a plurality of tubes disposed in parallel with each other, through which refrigerant flows. Accordingly, attachment structure of the first heat exchange unit and the second heat exchange unit can be made simple. More preferably, the gas-liquid separator is disposed to be integrated with any one of the first and second header tanks.

Preferably, the adjustment member is a heating unit for adjusting a heating amount of liquid refrigerant in the gas-liquid separator in accordance with the super-heating degree of refrigerant discharged from the compressor. Therefore, the amount of liquid refrigerant stored in the gas-liquid separator can be readily controlled.

In the refrigerant cycle system, refrigerant flows through the compressor, a condenser, a decompression device and the evaporator in this order through a main refrigerant passage. The adjustment member includes a communication path through which liquid refrigerant in the gas-liquid separator returns to the main refrigerant passage, and a valve disposed in the communication path to increase a valve opening degree in accordance with an increase of the super-heating degree of refrigerant discharged from the compressor. Accordingly, the super-heating degree of refrigerant discharged from the compressor can be readily controlled using the adjustment member.

The gas-liquid separator can be disposed to return both gas refrigerant and liquid refrigerant separated from each other in the gas-liquid separator to the main refrigerant passage within the condenser. Therefore, the structure of the condenser including the gas-liquid separator can be made compact. Even in this case, because the amount of liquid refrigerant stored in the gas-liquid separator can be adjusted in accordance with the super-heating degree of refrigerant discharged from the compressor, the cycle efficient can be improved.

The condenser includes an inlet flow path provided between the first header tank and the gas-liquid separator, through which a part of refrigerant in a refrigerant passage of the condenser is introduced into the gas-liquid separator, a gas return passage through which gas refrigerant within the gas-liquid separator is introduced into the refrigerant passage at a downstream side position from the inlet flow path in the refrigerant flow direction, and a liquid return passage through which liquid refrigerant within the gas-liquid separator is introduced into the refrigerant passage at a downstream side position from the inlet flow path in the refrigerant flow direction. Accordingly, a volume of the gas-liquid separator of the condenser can be made smaller, while the super-heating degree of refrigerant discharged from the compressor can be readily controlled.

BRIEF DESCRIPTION OF THE DRAWINGS

Additional objects and advantages of the present invention will be more readily apparent from the following detailed description of preferred embodiment when taken together with the accompanying drawings, in which:

FIG. 7A is a cross-sectional view showing a decompression device according to a fourth preferred embodiment of the present invention, and FIG. 7B is a cross-sectional view showing a valve opening state of a variable throttle valve in FIG. 7A;

FIG. 39 is a schematic sectional view showing a separator-integrated condenser according a twenty-sixth preferred embodiment of the present invention;

FIGS. 48A and 48B are a disassembled perspective view and a sectional view, respectively, showing a main part of the separator-integrated condenser according to the thirtieth embodiment;

FIG. 51 is a schematic diagram showing a refrigerant cycle system according to a thirty-third preferred embodiment of the present invention;

FIG. 52 is a Mollier diagram of a conventional refrigerant cycle system; and

DETAILED DESCRIPTION OF THE PRESENTLY PREFERRED EMBODIMENTS

Preferred embodiments of the present invention will be described hereinafter with reference to the accompanying drawings.

(First Embodiment)

Figure 1:
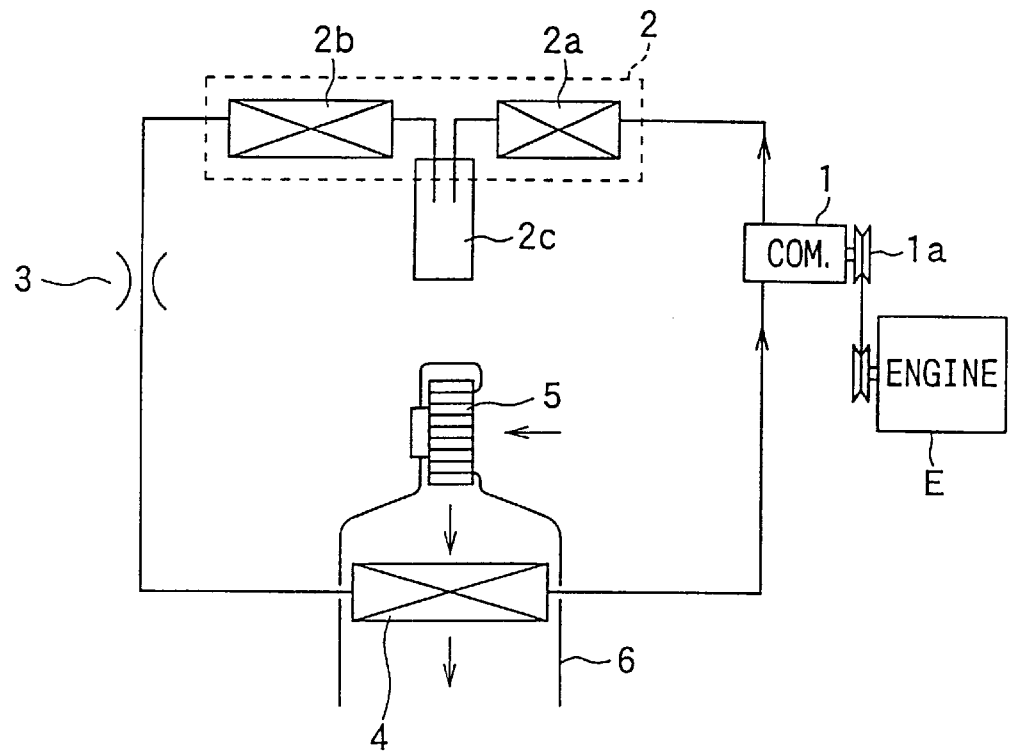
FIG. 1 is a schematic diagram showing a refrigerant cycle system according to a first preferred embodiment of the present invention.

FIG. 1 shows a first embodiment when the present invention is used for a refrigerant cycle system for a vehicle air conditioner. A compressor 1 is belt-driven by a vehicle engine E through an electromagnetic clutch 1a. High-pressure gas refrigerant discharged from the compressor 1 flows into a condenser 2 where the gas refrigerant heat-exchanges with outside air to be cooled and condensed.

The condenser 2 has a first heat exchange unit 2a and a second heat exchange unit 2b which are provided in order of a refrigerant flowing direction. A gas-liquid separator 2c for separating gas-liquid of the refrigerant is disposed between the first heat exchange unit 2a and the second heat exchange unit 2b in the condenser 2.

The gas-liquid separator 2c has a long and narrow tank shape extending in a vertical direction, and separates gas-liquid of the refrigerant through the use of a difference in density between liquid refrigerant and gas refrigerant. The gas-liquid separator 2c has a tank accumulating the liquid refrigerant in the lower part, and supplies the gas refrigerant to the second heat exchange unit 2b.

In this respect, the condenser 2 is disposed in a region to be cooled by receiving a traveling wind caused by traveling of the vehicle, concretely in the front extremity or the like within a vehicle engine room, to be cooled by the traveling wind and air blown from a cooling fan (not shown).

The condenser 2 according to the present embodiment is provided by integrally assembling the first heat exchange unit 2a, the second heat exchange unit 2b and the gas-liquid separator 2c to assemble these three parts into single-piece integrated structure by an aluminum integral brazing method or the like.

However, even if these three parts of the first heat exchange unit 2a, the second heat exchange unit 2b and the gas-liquid separator 2c are constructed individually and these three parts are coupled through the use of appropriate piping or the like, the same functions are provided. That is, in the first embodiment, such an individual type may be used as a matter of course.

A decompression device 3 is used for decompressing the refrigerant passed through the condenser 2 into a low-pressure gas-liquid two-phase state. In the present embodiment, the decompression device 3 is a fixed restrictor (fixed throttle) such as an orifice, a nozzle, and a capillary tube.

An evaporator 4 evaporates the low-pressure refrigerant from the decompression device 3 by absorbing heat from air blown from an air conditioning blower 5. The evaporator 4 is disposed within a case 6 of an interior air conditioner, and cool air cooled by the evaporator 4 is temperature-adjusted in a heater core portion (not shown) and thereafter is blown out into a passenger compartment of the vehicle. The gas refrigerant evaporated in the evaporator 4 is sucked into the compressor 1.

In order to prevent frosting in the evaporator 4, the temperature of the evaporator 4 is controlled to be at a predetermined temperature or higher by on-off control of an operation of the compressor 1, control of discharge capacity of the compressor 1 or the like.

Figure 2:
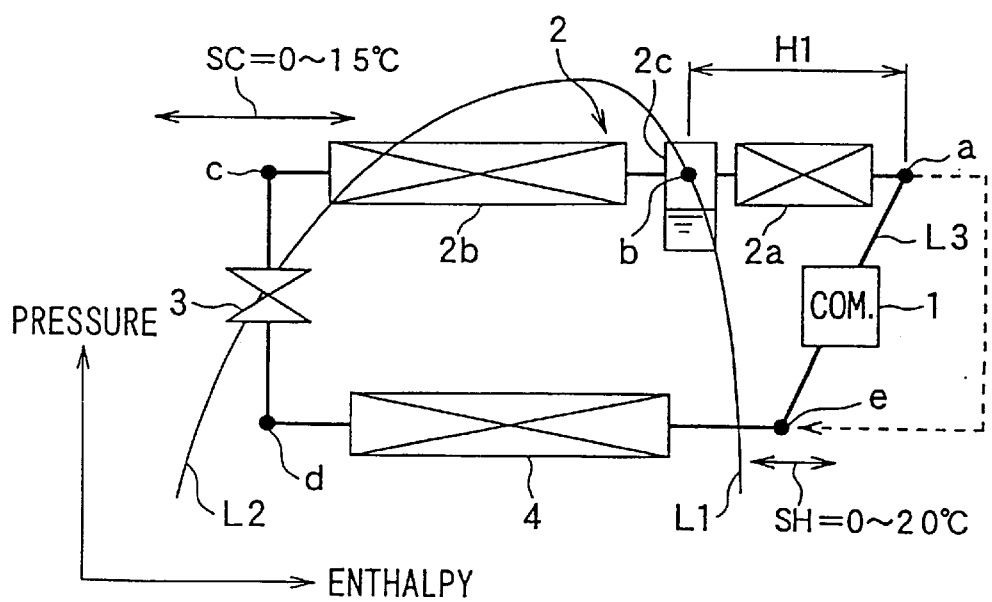
FIG. 2 is a Mollier diagram of the refrigerant cycle system according to the first embodiment.

Next, an operation of the refrigerant cycle system according to the first embodiment will be now described. FIG. 2 is a Mollier diagram based on the refrigerant cycle system according to the first embodiment. When the compressor 1 is driven by the vehicle engine E, gas refrigerant (a) discharged from the compressor 1 is in an overheated gas state. This gas refrigerant (a) from the compressor 1 first flows into the first heat exchange unit 2a of the condenser 2. In the first heat exchange unit 2a, the gas refrigerant is heat-exchanged with cooling air (outside air) to radiate heat, and flows into the gas-liquid separator 2c.

In the refrigerant cycle system according to the first embodiment, liquid refrigerant is always accumulated within the gas-liquid separator 2c to form a gas-liquid interface. In other words, when overheated gas refrigerant flows from the first heat exchange unit 2a into the gas-liquid separator 2c, a port of the accumulated liquid refrigerant within the gas-liquid separator 2c is evaporated. Conversely, when gas-liquid moist gas flows from the first heat exchange unit 2a into the gas-liquid separator 2c, gas and liquid of the refrigerant are separated within the gas-liquid separator 2c, and the liquid refrigerant is accommodated in the gas-liquid separator 2c.

Because the gas-liquid interface of the refrigerant is always formed within the gas-liquid separator 2c as described above, the refrigerant (b) within the gas-liquid separator 2c is positioned on a saturated gas line L1 in the Mollier diagram, and the super-heating degree becomes SH=0° C. Thus, saturated gas refrigerant (b), which has been gas-liquid separated within the gas-liquid separator 2c, flows into the second heat exchange unit 2b of the condenser 2, and exchanges heat with cooling air (outside air) to be condensed.

The super-cooling degree SC of the refrigerant (c) at the outlet of the second heat exchange unit 2b is determined depending on fluctuations in the cycle operating conditions as below. More specifically, because the decompression device 3 is constructed by a fixed restrictor, the super-cooling degree SC is determined depending on the flow amount characteristic, a cycle high pressure and a cycle refrigerant flow amount. The flow amount characteristic is determined based on a type of the fixed restrictor.

The above-described super-cooled refrigerant (c) is next decompressed by the fixed restrictor of the decompression device 3 to become low-pressure gas-liquid refrigerant (d), this low-pressure refrigerant (d) next absorbs heat from air flowing through the case 6 in the evaporator 4 to be evaporated, and becomes overheated gas refrigerant (e) having the super-heating degree SH. This overheated gas refrigerant (e) is sucked into the compressor 1 to be compressed again.

In the refrigerant cycle system according to the first embodiment, refrigerant (b) within the gas-liquid separator 2c located midway in the condenser 2 is maintained in the saturated state on the saturated gas line L1 as described above. Therefore, gas refrigerant (a) discharged from the compressor 1 is set at an overheated state determined by an amount of heat exchange amount (i.e., amount of heat radiation) H1 in the first heat exchange unit 2a of the condenser 2. In other words, the state of the discharged gas refrigerant (a) is determined by an increase or a decrease of the amount of heat exchange H1.

Because a compression process of refrigerant in the compressor 1 is basically an isoentropic change due to adiabatic compression, when the state of the discharged gas refrigerant (a) is determined, the state of the refrigerant (e) at the suction-side of the compressor 1, that is, the super-heating degree SH of the suction-side refrigerant (e) is determined by an isoentropic line L3. Accordingly, even if it is assumed that the super-heating degree SH of the suction-side refrigerant (e) fluctuates depending on fluctuations in the cycle operating conditions, the amount of heat exchange H1 of the first heat exchange unit 2a is suitably set in advance, whereby it becomes possible to control the super-heating degree SH of the suction-side refrigerant (e) within a range of, for example, 0 to 20° C.

More concretely, when the super-heating degree SH of the discharged gas refrigerant (a) increases, the refrigerant, flowing into the gas-liquid separator 2c from the first heat exchange unit 2a, enters a super-heating area state to decrease the amount of liquid refrigerant accumulated within the gas-liquid separator 2c, thereby increasing a circulating refrigerant flow amount within the cycle. As a result, any increase in the super-heating degree SH of the suction-side refrigerant (e) of the compressor 1 is restricted. On the other hand, when the super-heating degree SH of the discharged gas refrigerant (a) of the compressor 1 decreases, the refrigerant, flowing into the gas-liquid separator 2c from the first heat exchange unit 2a, enters a gas-liquid area state to increase the amount of liquid refrigerant accumulated within the gas-liquid separator 2c, thereby decreasing a circulating refrigerant flow amount within the cycle. As a result, any decrease in the super-heating degree SH of the suction-side refrigerant (e) of the compressor 1 is restricted. Accordingly, the refrigerant cycle system adjusts the super-heating degree SH of the discharged gas refrigerant (a) of the compressor 1 and the super-heating degree SH of the suction-side refrigerant (e) to predetermined ranges, respectively.

According to the first embodiment, the state of the discharged gas refrigerant (a) of the compressor is determined by the amount of heat exchange H1 of the first heat exchange unit 2a as described above. In addition, the super-heating degree SH of the suction-side refrigerant (e) of the compressor 1 is controlled in accordance with the refrigerant discharge state of the compressor 1. Therefore, this has the advantage over the conventional accumulator cycle even in terms of control of the super-cooling degree of the refrigerant (c) at outlet of the condenser.

Figure 3:
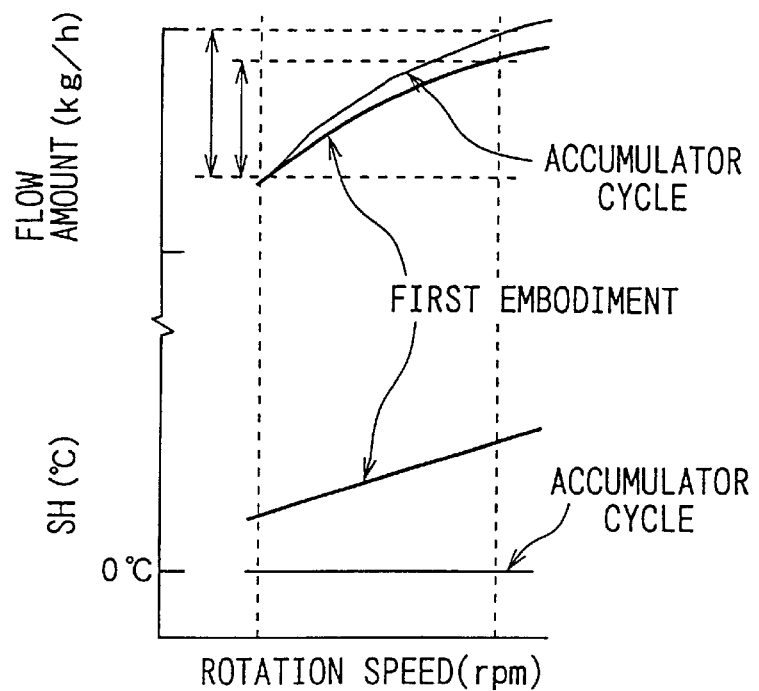
FIG. 3 is a characteristic view for explaining operation of the refrigerant cycle system according to the first embodiment.

More specifically, FIG. 3 is drawn with a rotation number (rotation speed) of the compressor 1 taken on the abscissa and the super-heating degree SH of the suction-side refrigerant (e) and circulating refrigerant flow amount (mass flow amount) within the cycle on the ordinate. As shown in FIG. 3, in an accumulator cycle, the suction-side refrigerant (e) has the super-heating degree SH maintained constant (saturated gas) at 0° C. irrespective of any variations in the number of revolutions (rotation speed) of the compressor.

In contrast, in the refrigerating cycle of the first embodiment, when the number of revolutions of the compressor is increased with the increase in the engine speed, high pressure (high-pressure refrigerant temperature) is increased to increase a difference in temperature between the high-pressure refrigerant and cooling air, whereby the amount of heat exchange H1 of the first heat exchange unit 2a is increased. Therefore, the super-heating degree SH of the suction-side refrigerant (e) of the compressor is increased to increase the specific volume of the refrigerant (e) sucked by the compressor. Accordingly, in the first embodiment, an increasing rate of the refrigerant flow amount resulting from the increase in the number of revolutions of the compressor, becomes smaller than the accumulator cycle.

This means that the increasing rate of the required amount of radiation by the condenser due to the increase in the number of revolutions of the compressor becomes smaller than the accumulator cycle. As a result, the increase in the high pressure (super-cooling degree SC of refrigerant at outlet of the condenser), when the number of revolutions of the compressor is increased, is restricted. Accordingly, it is possible to restrict an increase in the compressor driving power.

(Second Embodiment)

Figure 4:
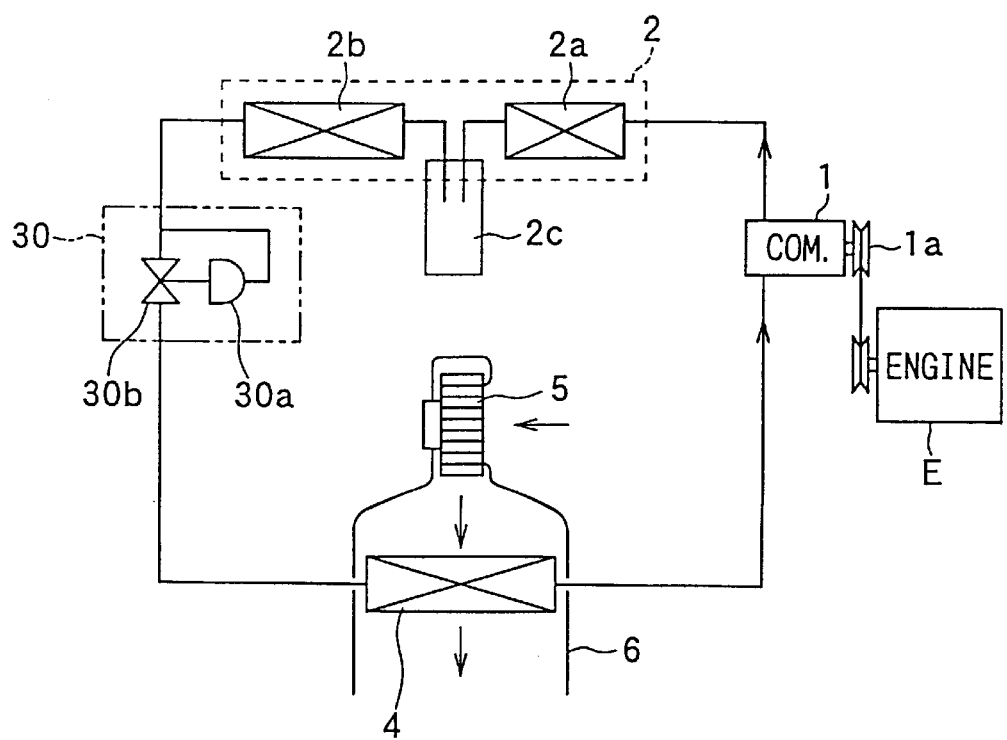
FIG. 4 is a schematic diagram showing a refrigerant cycle system according to a second preferred embodiment of the present invention.

FIG. 4 shows a refrigerant cycle system for a vehicle air conditioner according to the second embodiment, and the refrigerant cycle system of the second embodiment is different from the first embodiment in that a decompression device 30 is constructed by a variable restrictor instead of the fixed restrictor. In this decompression device 30, there is provided a valve driving mechanism 30a for operating in response to the refrigerant state at an upstream side, that is, the high-pressure side refrigerant state (refrigerant temperature and refrigerant pressure) so that a restriction opening degree of a valve element 30b is made to be changed in response to the high-pressure side refrigerant state by the valve driving mechanism 30a.

According to the second embodiment, because the restriction opening degree of the decompression device 30 can be adjusted in response to the high-pressure side refrigerant state to enlarge the adjustment range for the refrigerant flow amount, it is possible to reduce the width of change in the super-cooling degree SC of the refrigerant (c) at the outlet of the condenser 2 more than in the case of the fixed restrictor, and to control the super-cooling degree SC of the refrigerant (c) at the outlet of the condenser 2 within a range desirable for the cycle efficiency. As a result, in the second embodiment, the cycle efficiency can be improved as compared with the fixed restrictor. In the second embodiment, the other part is similar to those of the above-described first embodiment.

(Third Embodiment)

In the third embodiment, in order to prevent frosting in the evaporator 4, the temperature of the evaporator 4 is controlled to exceed a predetermined temperature by on-off control of the operation of the compressor 1.

Figure 5:
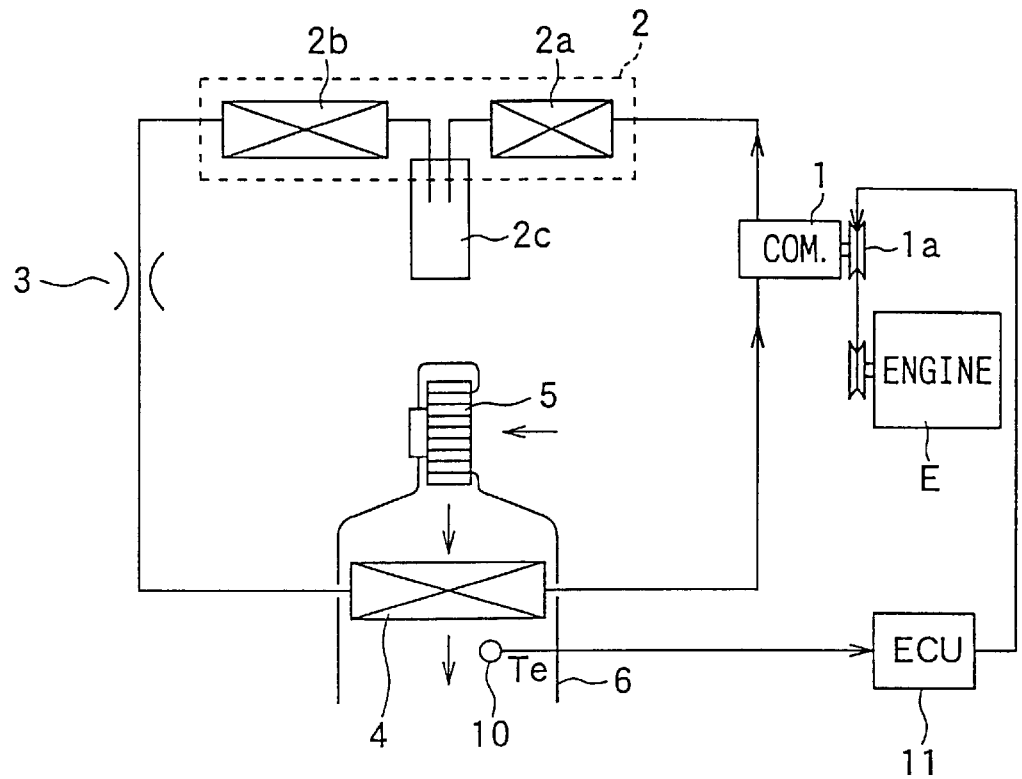
FIG. 5 is a schematic diagram showing a refrigerant cycle system according to a third preferred embodiment of the present invention.

FIG. 5 shows a third embodiment, and a temperature sensor (thermistor) 10 for detecting temperature Te of the evaporator 4 is provided within the case 6. The temperature Te of blown-out air from the evaporator 4 is detected by the temperature sensor 10, and a detection signal from the temperature sensor 10 is inputted into an electronic control unit 11 (ECU). When the actual temperature Te of the evaporator 4 lowers to a predetermined stop-side temperature T1 (for example, 3° C.), this fact is determined by the electronic control unit 11, and an OFF-signal of the electromagnetic clutch 1a is generated from the electronic control unit 11. This signal makes the electromagnetic clutch 1a to a disengaged state, and the compressor 1 is stopped (turned off).

On the other hand, when the actual temperature Te of the evaporator 4 rises to a predetermined operation-side temperature T2 (for example, 4° C.) because of the stop of the compressor 1, this fact is determined by the electronic control unit 11, and an ON-signal of the electromagnetic clutch 1a is generated. This ON-signal makes the electromagnetic clutch 1a to an engaged state, and the compressor 1 returns to an operating (ON) state.

As described above, the operation of the compressor 1 is interrupted in response to the temperature Te of the evaporator 4, whereby the temperature Te of the evaporator 4 is maintained to exceed the predetermined stop-side temperature T1, and it possible to prevent frosting of the evaporator 4. In this respect, the temperature difference (for example, 1° C.) between the predetermined stop-side temperature T1 and the predetermined operation-side temperature T2 is hystresis width for preventing hunting.

Figure 6:
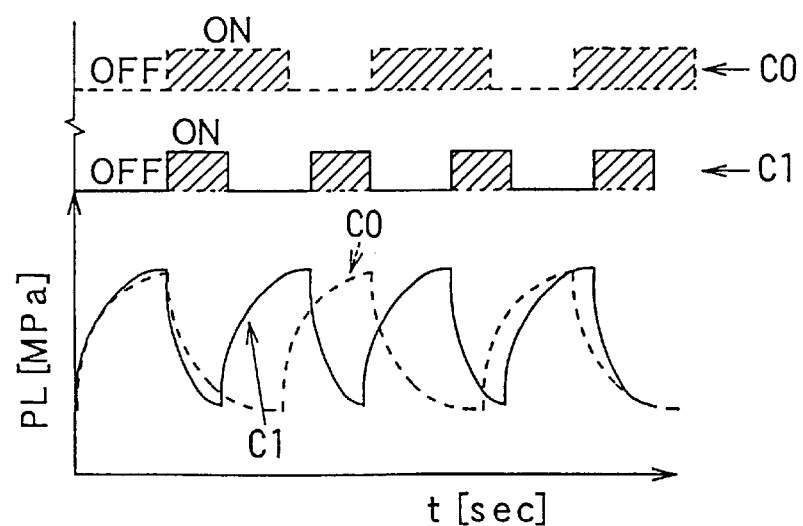
FIG. 6 is a graph showing a relationship between a compressor operation on/off control time and a low pressure in a refrigerant cycle system, according to the third embodiment.

In a case where there is performed such control as to maintain the temperature of the evaporator 4 to exceed a predetermined temperature by the on-off control of the operation of the compressor 1 as described above, in a comparison accumulator cycle C0 shown in FIG. 6, because liquid refrigerant is always accumulated within the accumulator, when the compressor 1 is started again from a stopped state, the liquid refrigerant within the accumulator is evaporated to be sucked into the compressor 1. Therefore, it is difficult to decrease the low-pressure side refrigerant pressure. As a result, after re-start of the compressor 1, it is difficult to lower the temperature Te of the evaporator 4, and the operating (ON) time of the compressor 1 becomes longer to increase the driving power of the compressor 1 in the accumulator refrigerant cycle C0.

In contrast, according to the refrigerating cycle C1 of the first to third embodiments, since there is provided the gas-liquid separator 2c at the high pressure side and there is provided no an accumulator at the refrigerant suction side of the compressor 1, when the on-off control of the operation of the compressor 1 is performed, any extension of the operating (ON) time of the compressor 1 resulting from the evaporation of the liquid refrigerant within the accumulator does not occur, but the driving power of the compressor 1 can be reduced in the refrigerant cycle C1, as compared with the accumulator refrigerant cycle C0.

FIG. 6 shows a low-pressure behavior resulting from the on-off control of the operation of the compressor 1. In FIG. 6, the solid line graph indicates the low-pressure behavior in the refrigerating cycle C1 according to the present invention (first to third embodiments), and the broken line graph indicates the low-pressure behavior in the accumulator refrigerating cycle C0. As shown in FIG. 6, the operating (ON) time of the compressor 1 can be reduced in the refrigerant cycle C1, as compared with the accumulator refrigerant cycle C0.

In the third embodiment, the other parts are similar to those of the above-described first embodiment of the present invention.

(Fourth Embodiment)

The fourth embodiment indicates a concrete example of the decompression device 30 constructed by a variable restrictor for changing the restriction opening degree in response to the state of high-pressure side refrigerant according to the second embodiment (FIG. 4). FIG. 7A exemplifies a decompression device 30 according to the fourth embodiment, and refrigerant piping 300 is arranged between the outlet side of the condenser 2 and the inlet side of the evaporator 4 in FIG. 4. The refrigerant piping 300 is normally formed of metal such as aluminum. Within the refrigerant piping 300, there is incorporated a body member 301 of the decompression device 30. This body member 301 is formed into a substantially cylindrical shape using, for example, resin, and is positioned by a stopper 302 within the refrigerant piping 300.

In a concave groove 303 on an outer peripheral surface of the body member 301, a sealing O-ring 304 is held, and the O-ring 304 is pressed onto an inner wall surface of the refrigerant piping 300, whereby the body member 301 is held at a predetermined position by the stopper 302.

The decompression device 30 is constructed within the body member 301, and roughly has the following three elements. That is, the first element of the decompression device 30 is a differential-type variable throttle valve 305 arranged upstream in a refrigerant flowing direction A, the second element of the decompression device 30 is a fixed restrictor 306 arranged downstream the variable throttle valve 305, and the third element of the decompression device 30 is an intermediate space (entrance space) 307 provided between the variable throttle valve 305 and the fixed restrictor 306.

The variable throttle valve 305 has a fixed valve seat 308, a valve element 309 which can move with respect to the fixed valve seat 308, and a compression coil spring 310 as spring means for exerting a spring force in the direction that closes the valve on this valve element 309.

The fixed valve seat 308 has a cylindrical column-shaped supporting portion 311 at its central portion, and this cylindrical column-shaped supporting portion 311 is, on the outer periphery side, formed with plural communication holes 312. The fixed valve seat 308 is fastened and fixed on the inner peripheral surface of an upstream end portion of the body member 301 by means of screws or the like. In this respect, a position where the fixed valve seat 308 is fastened to the body member 301 is adjusted, whereby the spring force (set load) of the coil spring 310 can be adjusted.

The valve element 309 has a cylindrical shape. At a central portion of the valve element 30, there is formed a restriction passage 313 including a circular hole with a small diameter. An interval between the upstream end portion of the valve element 309 and the cylindrical column-shaped supporting portion 311 of the fixed valve seat 308 is changed, whereby the opening area at an inlet of the restriction passage 313 is adjusted.

Because a difference in pressure between in front of and backside of the valve element 309 acts on the valve element 309 as a force in the direction that opens the valve and the spring force of the coil spring 310 acts on the valve element 309 as a force in the direction that closes the valve, the valve element 309 makes a displacement in the axial direction in such a manner that the difference in pressure between in front of and backside of the valve element 309 is maintained at a predetermined value determined by the spring force of the coil spring 310 to adjust the opening area at the inlet of the restriction passage 313. In other words, the variable throttle valve 305 is used as a constant differential pressure regulating valve. FIG. 7B shows a state in which the valve element 309 makes a displacement toward the coil spring 310 to open the valve.

The fixed restrictor 306 is formed at the extreme downstream end portion of the body member 301, and its restriction shape is a nozzle shape having a gradually-tapered passage shape with a circular arc cross-section. The intermediate space 307 is used to enlarge a refrigerant flow jetted from the restriction passage 313 in the variable throttle valve 305 larger than the cross-sectional area of the passage of the fixed restrictor 306. Accordingly, the velocity of flow of the refrigerant is made uniform by mixing a high velocity portion of the jetted refrigerant flow with a low velocity portion, thereby reliably exhibiting the restriction operation based on the original flow amount characteristics of the fixed restrictor 306.

At the extreme upstream end portion of the body member 301, a filter member 314 is arranged. This filter member 314 is used to prevent the minute restriction passage in the decompression device 30 from being clogged by catching foreign matter such as metallic chips contained in the refrigerant.

According to the decompression device 30 of the fourth embodiment, the variable throttle valve 305 for performing the restriction on the previous stage constitutes the constant differential pressure regulating valve as described above. In addition, because the differential pressure between in front of and backside of the variable throttle valve 305 is reduced when the compressor 1 is stopped (OFF), the valve element 309 in the variable throttle valve 305 is pressed against the cylindrical column-shaped supporting portion 311 of the fixed valve seat 308 by the spring force of the coil spring 310 as shown in FIG. 7A so that the variable throttle valve 305 enters a valve closed state.

For this reason, in the refrigerating cycle, it is possible to prevent the refrigerant from flowing from the high pressure side to the low pressure side by closing the variable throttle valve 305 when the compressor 1 is stopped, whereby a rise in low pressure during the stop of the compressor 1 can be delayed. As a result, the driving power of the compressor 1 can be further reduced as compared with a case where the decompression device 3 is constituted of a fixed restrictor as in the first embodiment, by extending the stop time of the compressor 1.

Figure 8:
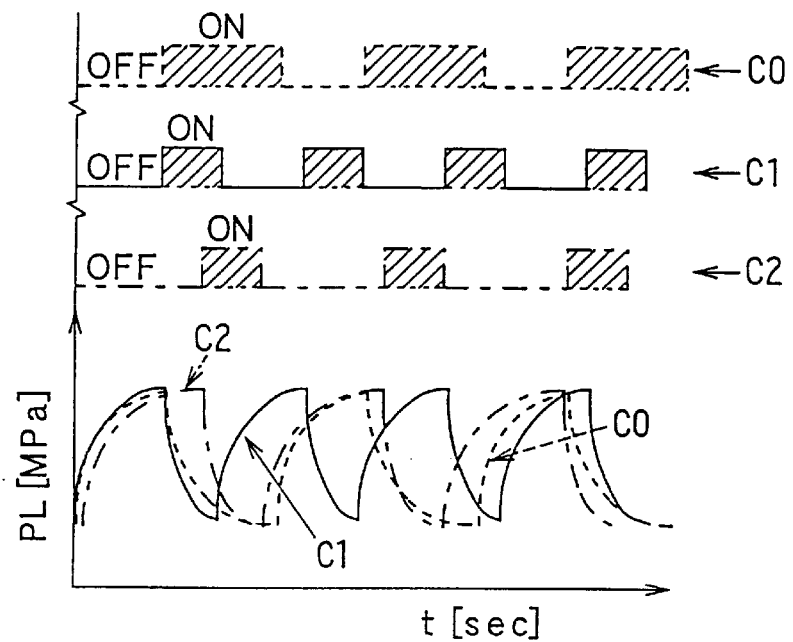
FIG. 8 is a graph showing a relationship between a compressor on/off control time and a low pressure in a refrigerant cycle system, according to the fourth embodiment.

FIG. 8 shows a low-pressure behavior with on-off control of the operation of the compressor 1. In FIG. 8, C2 indicates a case when the decompression device 30 is constituted of the differential variable throttle valve 305 as in the fourth embodiment, C1 indicates a case when the decompression device 3 is constituted of a fixed restrictor as in the first embodiment, and C0 indicates a case of a comparison accumulator refrigerant cycle. As can be seen from FIG. 8, according to the fourth embodiment, in addition to reduce the operating (ON) time of the compressor 1 as compared with the accumulator cycle, the stop time of the compressor 1 can be extended, and therefore, the driving power thereof can be reduced most effectively.

(Fifth Embodiment)

In the fifth embodiment, shortages of refrigerant within cycle is prevented, and oil return property to the compressor 1 is improved.

According to the present inventor's experiment and study, it has been found out that liquid refrigerant is prone to accumulate within the gas-liquid separator 2c for the following reason in a refrigerating cycle system. Firstly, on condition that the cooling heat load is high like in high temperatures in summer, there is distribution of outside air blown to the condenser 2. Especially, if only the cooling effect of the first heat exchange unit 2a is increased, the amount of refrigerant condensation in the first heat exchange unit 2a is increased so that the liquid refrigerant is prone to accumulate within the gas-liquid separator 2c. Secondly, the gas refrigerant within the gas-liquid separator 2c is cooled and condensed by heat exchange with ambient atmosphere, whereby the liquid refrigerant is prone to accumulate within the gas-liquid separator 2c.

As a result, there is a possibility that circulating refrigerant flow amount within the cycle is insufficient (insufficient cooling ability), and the oil return property to the compressor 1 is worsen to adversely affect the lubricity in the compressor 1.

Figure 9:
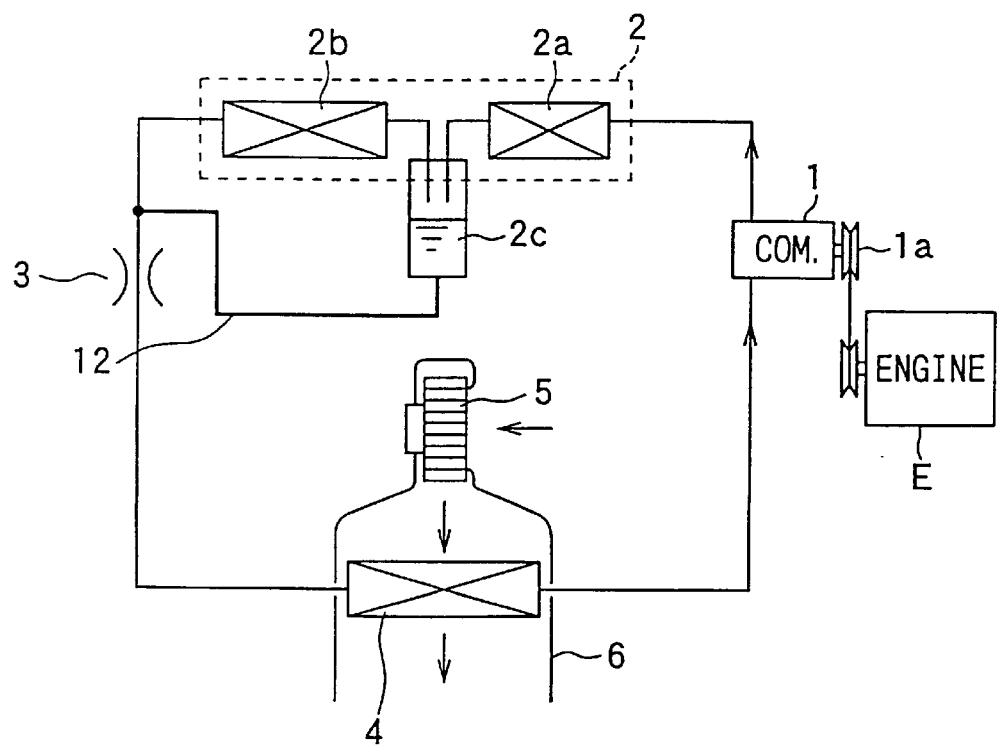
FIG. 9 is a schematic diagram showing a refrigerant cycle system according to a fifth preferred embodiment of the present invention.

Thus, in the fifth embodiment, as shown in FIG. 9, there is provided a liquid returning communication path 12 for communicating between the lower portion (base portion) of the gas-liquid separator 2c and the downstream side of the condenser 2 (upstream of the decompression device 3).

Thereby, the liquid refrigerant and oil within the gas-liquid separator 2c can be directly flowed back within the cycle through the communication path 12, and therefore, the insufficient circulating refrigerant flow amount within the cycle and insufficient oil return to the compressor 1 can be prevented. In the fifth embodiment, the other parts are similar to those of the above-described first embodiment.

(Sixth Embodiment)

Figure 10:
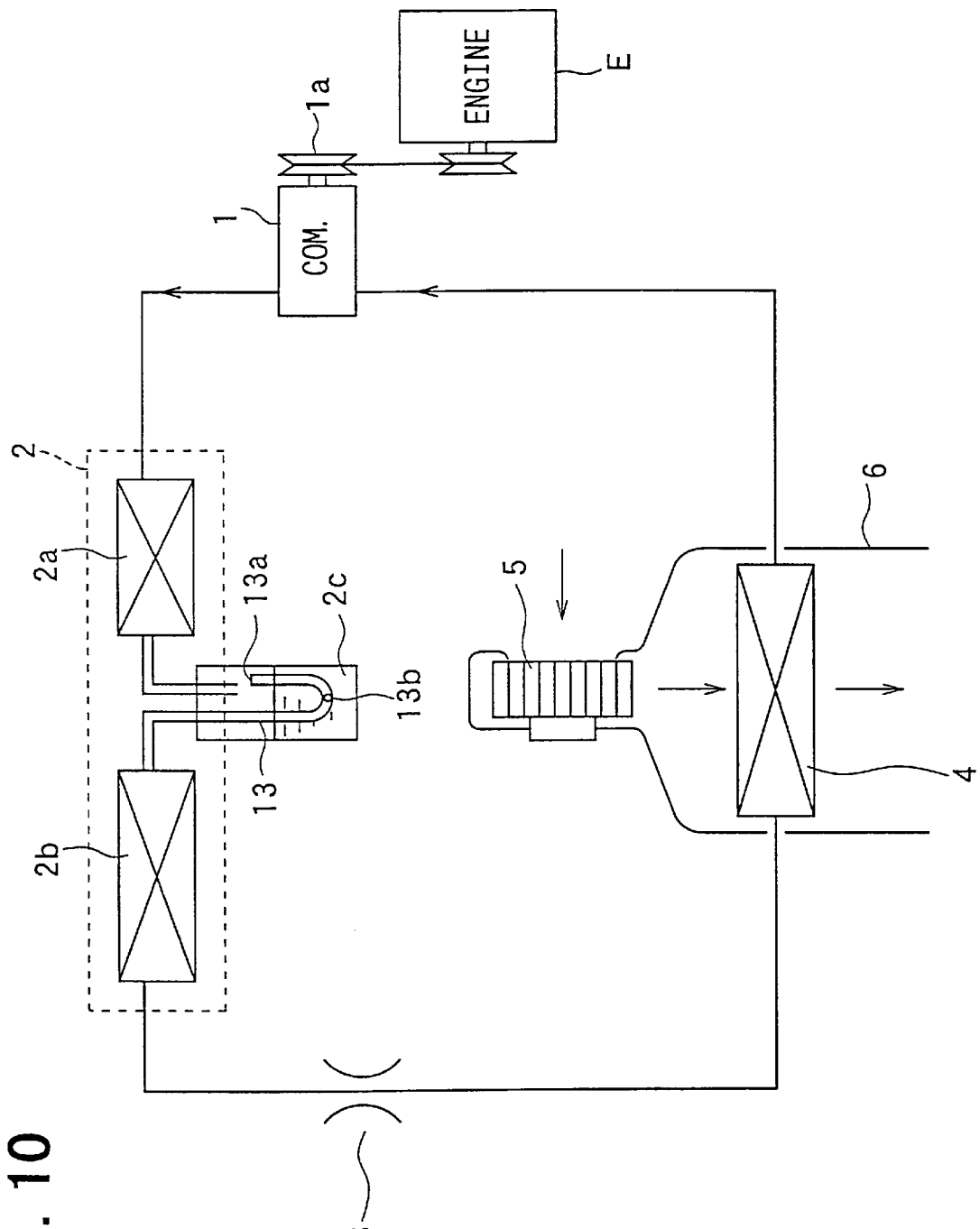
FIG. 10 is a schematic diagram showing a refrigerant cycle system according to a sixth preferred embodiment of the present invention.

The sixth embodiment is a modification of the above-described fifth embodiment. In the sixth embodiment, as shown in FIG. 10, a U-shaped suction tube 13 is provided within the gas-liquid separator 2c, and a tip end opening 13a of the suction tube 13 is arranged in a gas refrigerant area in the upper portion within the gas-liquid separator 2c in such a manner that the gas refrigerant in the upper portion within the gas-liquid separator 2c can be sucked through the tip end opening 13a. In the U-shaped bottom portion of the suction tube 13, a communication hole (oil return hole) 13b for sucking the liquid refrigerant and oil os provided.

Thereby, liquid refrigerant and oil in the lower portion within the gas-liquid separator 2c are sucked through the communication hole 13b, and it is possible to prevent any insufficient circulating refrigerant flow amount within the cycle and insufficient oil returning to the compressor 1. Accordingly, the suction tube 13 also functions as the communication path 12 of the fifth embodiment. As a result, an advantage similar to that of the above-described fifth embodiment can be obtained. In the sixth embodiment, the other parts are similar to those of the above-described first embodiment.

(Seventh Embodiment)

Figure 11:
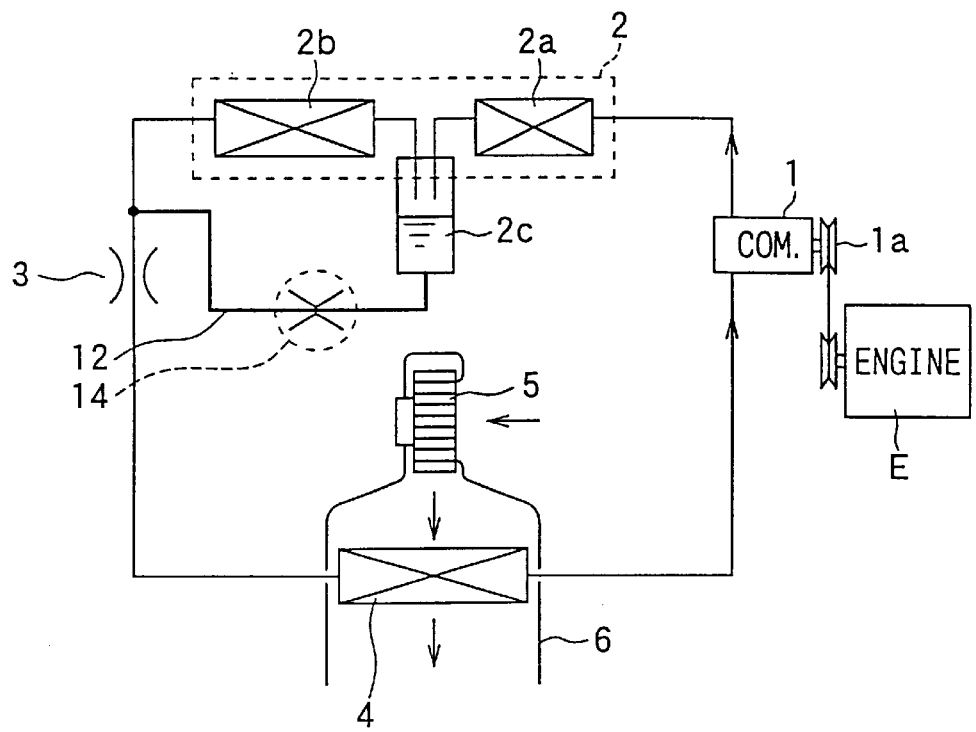
FIG. 11 is a schematic diagram showing a refrigerant cycle system according to a seventh preferred embodiment of the present invention.

The seventh embodiment is also a modification of the fifth embodiment. In the seventh embodiment, as shown in FIG. 11, a restriction portion 14 for setting an amount of liquid refrigerant circulating in the cycle is provided in the liquid returning communication path 12.

More specifically, the amount of liquid refrigerant (oil amount) flowing back from the communication path 12 into the cycle must be normally changed in accordance with size of the cycle (amount of refrigerant filled within the cycle). If the refrigerant passage pressure loss in the heat exchange unit 2b of the condenser 2 is high, the amount of flow-back liquid refrigerant (oil amount) from the communication path 12 becomes great even at the same passage area. Accordingly, it is necessary to change the passage area of the communication path 12 correspondingly to the size of the cycle and the refrigerant passage pressure loss in the second heat exchange unit 2b.

Thus, in the seventh embodiment, the communication path 12 is provided with a restriction portion 14, and the restriction opening area of the restriction portion 14 is appropriately set, whereby an optimum flow-back liquid refrigerant amount (oil amount) can be easily set.

As the restriction portion 14, a fixed restrictor such as an orifice and a capillary tube can be used. In place of the fixed restrictor, a variable restrictor with a restriction opening area capable of being adjusted may be used.

(Eighth Embodiment)

Figure 12:
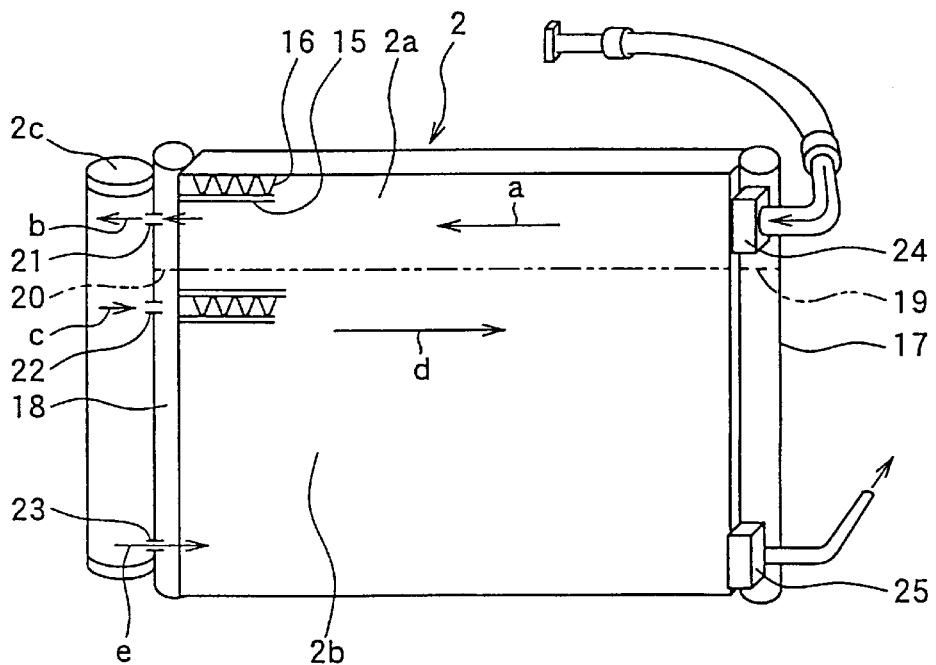
FIG. 12 is a schematic perspective view showing a separator-integrated condenser according an eighth preferred embodiment of the present invention.

The eighth embodiment relates to a separator-integrated condenser where the gas-liquid separator 2c is integrated with the condenser 2. With reference to FIG. 12, the whole structure of a separator-integrated condenser 2 according to the eighth embodiment will be now described. The separator-integrated condenser 2 has a heat exchange portion including a plurality of flat tubes 15 extending in the horizontal direction to define refrigerant passages, and corrugate fins 16 connected to the flat tubes 15. A first heat exchange unit 2a is constructed at the upper side of the heat exchange portion of the separator-integrated condenser 2, and a second heat exchange unit 2b is constructed at the lower side thereof.

On the lateral sides of these both heat exchange units 2a and 2b, header tanks (side tanks) 17 and 18 extending in the vertical direction are disposed. Each internal space of the header tank 17, 18 is partitioned up and down at least by one partition plate 19, 20. The left and right end portions of the flat tubes 15 are communicated to the interiors of the header tanks 17 and 18, respectively.

A gas-liquid separator 2c having a long and narrow tank shape extending in the vertical direction is integrally connected to the header tank 18, and an upper space of the header tank 18 communicates to an upper space of the gas-liquid separator 2c through a first communication path 21. An upper gas refrigerant area within the gas-liquid separator 2c communicates to an upper portion of lower space of the header tank 18 through a second communication path 22. Further, a liquid-refrigerant accumulating area within the gas-liquid separator 2c communicates with a lower portion within a lower space of the header tank 18 through a third communication path 23.

Refrigerant discharged from the compressor 1 passes through the flat tubes 15 of the first heat exchange unit 2a in the horizontal direction as indicated by an arrow (a) via the upper space of the header tank 17 from an inlet joint 24, and flows into the upper space of the header tank 18. Thus, refrigerant passes through the first communication path 21 from the upper space of the header tank 18 as indicated by an arrow (b), and flows into the upper space within the gas-liquid separator 2c. Gas and liquid of the refrigerant are separated because of a difference in density within the gas-liquid separator 2c, the liquid refrigerant accumulates at the lower side within the gas-liquid separator 2c, and the gas refrigerant is collected at the upper side of the gas-liquid separator 2c.

The gas refrigerant within the gas-liquid separator 2c passes through the second communication path 22 as indicated by an arrow (c) to flow into the lower space of the header tank 18, and thereafter, passes through the flat tubes 15 of the second heat exchange unit 2b as indicated by an arrow (d) to flow into the lower space of the header tank 17. In addition, the liquid refrigerant, which accumulates on the lower side within the gas-liquid separator 2c, passes through the third communication path 23 as indicated by an arrow (e) to flow into the lower space of the header tank 18, further passes through the flat tubes 15 of the second heat exchange unit 2b as indicated by an arrow (d) to flow into the lower space of the header tank 17. The refrigerant in the lower space of the header tank 17 is discharged from the condenser 2 through an outlet joint 25 toward the decompression device 3.

According to the eighth embodiment, the first and second heat exchange units 2a and 2b, and the gas-liquid separator 2c can be integrated to form the separator-integrated condenser 2, and the first and second heat exchange units 2a and 2b, and the gas-liquid separator 2c can be effectively assembled in low cost by means of integral brazing method of aluminum or the like.

Moreover, in addition, with such exceedingly simple structure that there are only provided the gas-liquid separator 2c and the third communication path 23 penetrating through the wall surface of the header tank 18, the liquid refrigerant within the gas-liquid separator 2c can be returned to the second heat exchange unit 2b.

(Ninth Embodiment)

In the ninth embodiment, a separator-integrated condenser 2 as in the eighth embodiment is described. The ninth embodiment facilitates an adjustment of the passage opening area in the third communication path 23 used as the communication path for returning the liquid refrigerant.

Figure 13:
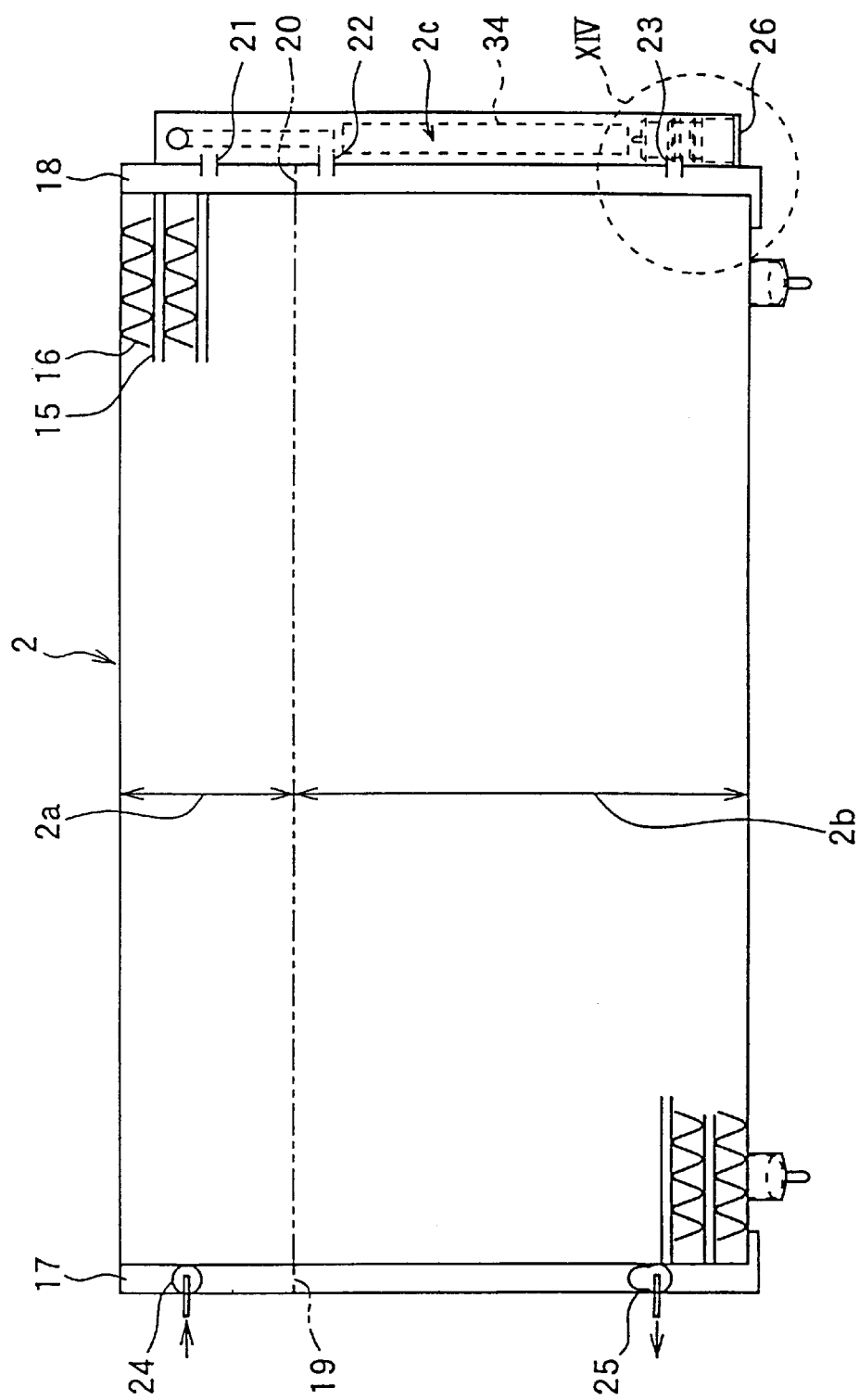
FIG. 13 is a schematic front view showing a separator-integrated condenser according a ninth preferred embodiment of the present invention.
Figure 14:
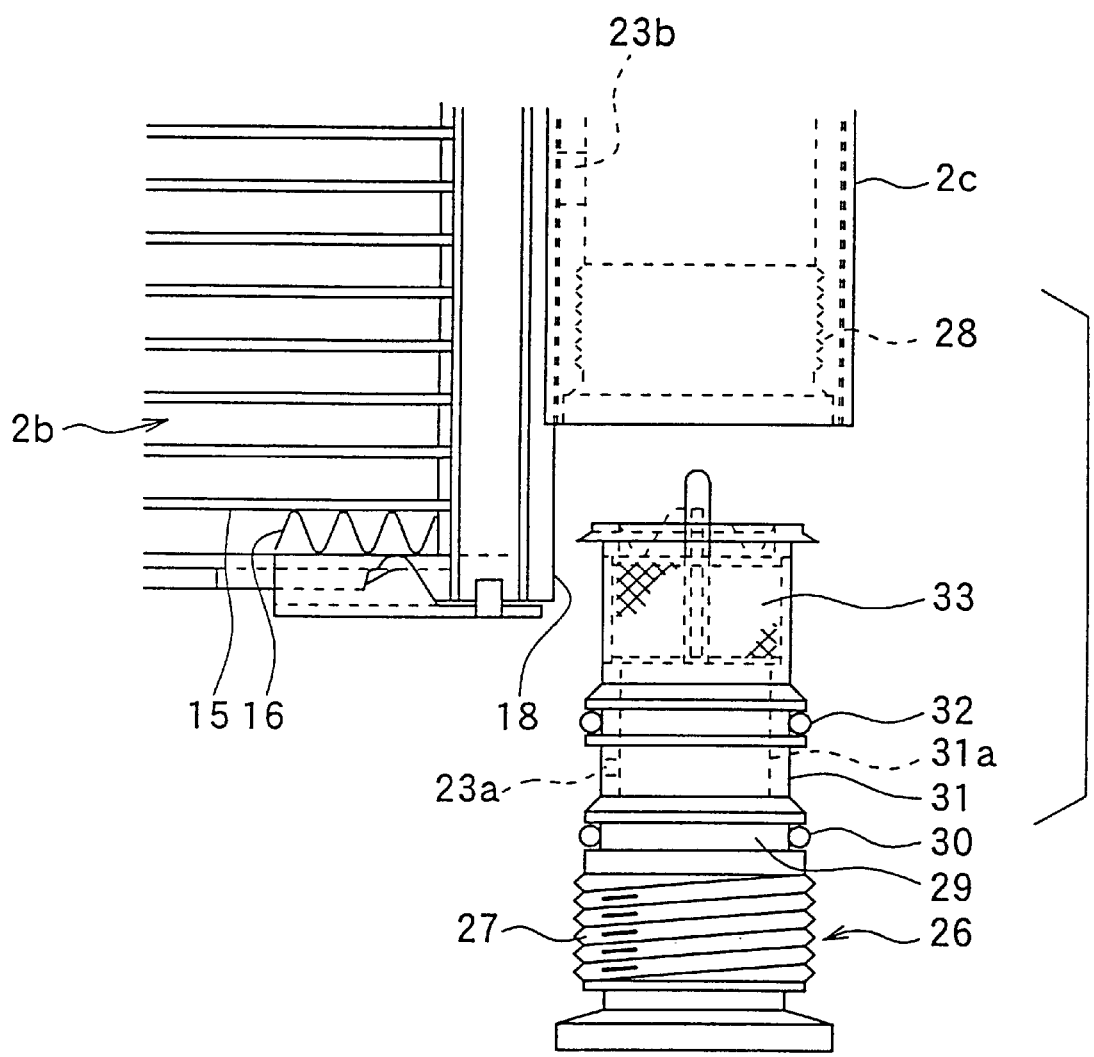
FIG. 14 is an enlarged view of the part indicated by XIV in FIG. 13, when a cap member is removed.
Figure 15:
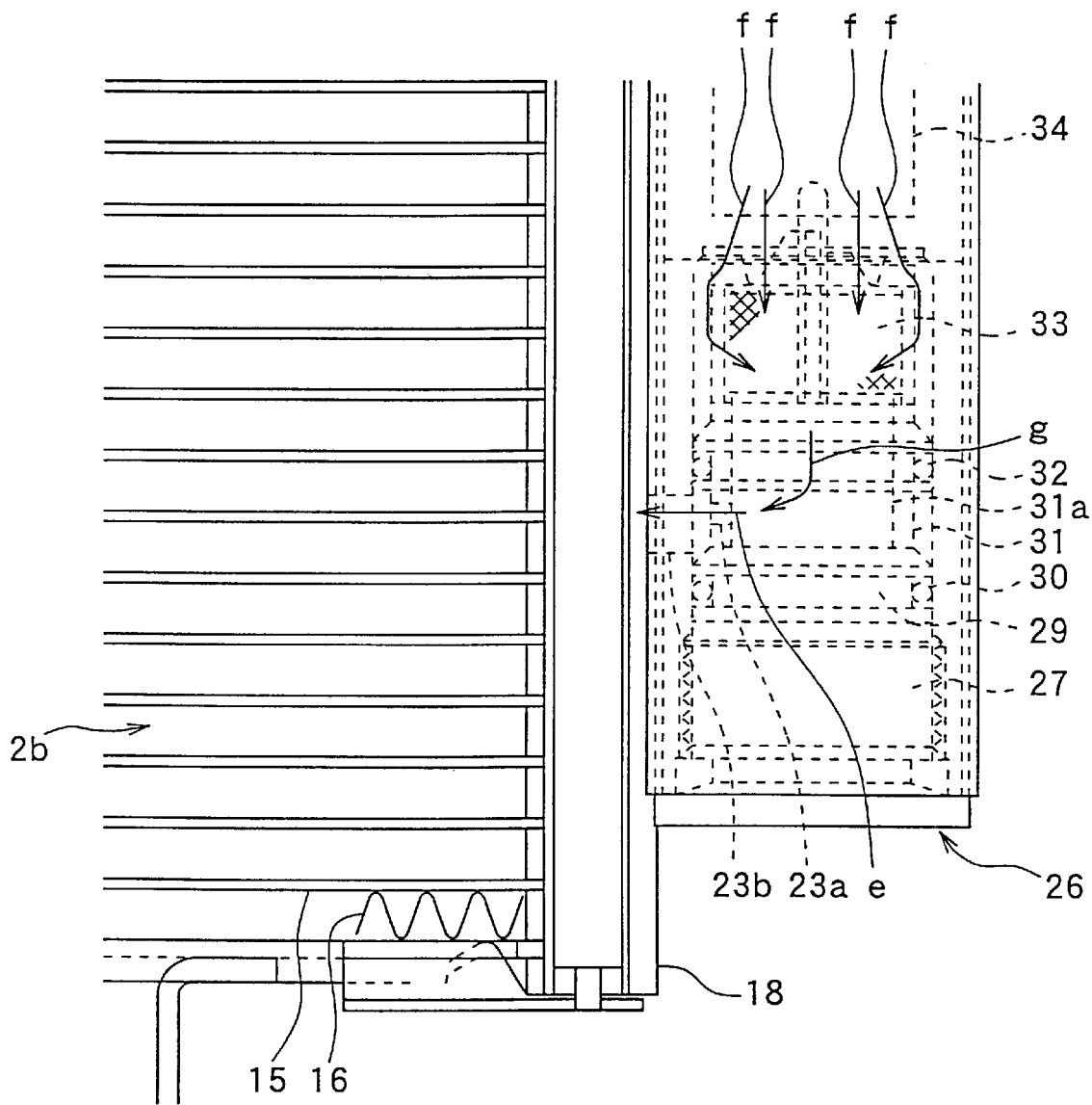
FIG. 15 is an enlarged view corresponding to FIG. 14, when the cap member is attached.

FIGS. 13 to 15 show the ninth embodiment, and FIG. 14 is an enlarged view of the XIV portion of FIG. 13 showing a removal state of a cap member 26. FIG. 15 is an enlarged view corresponding to FIG. 14 when the cap member 26 is mounted. Since the entire structure (structure of refrigerant passage) of the separator-integrated condenser 2 of the ninth embodiment is the same as in the eighth embodiment, the description will be omitted.

In the ninth embodiment, at the lower end portion of the gas-liquid separator 2c, a detachable cap (lid) member 26 is provided. This cap member 26 has a male screw portion 27, and the male screw portion 27 is disposed to be fastened and fixed to a female screw portion 28 provided on the inner peripheral wall surface of the lower end portion of the gas-liquid separator 2c.

In the cap member 26, on the outer peripheral surface of a cylindrical column portion 29 immediately above the male screw portion 27, a sealing O-ring 30 is fitted in and mounted. Further, a cylindrical portion 31 is provided immediately above this cylindrical column portion 29, and a sealing O-ring 32 is also fitted in and mounted on the outer peripheral surface of this cylindrical portion 31. These both O-rings 30 and 32 are elastically pressed against the inner peripheral surface at the lower end of the gas-liquid separator 2c, whereby sealing between the inner peripheral wall surface at the lower end of the gas-liquid separator 2c and the cap member 26 is maintained.

At the upper end portion of the cylindrical portion 31, a filter 33 for removing foreign matter is integrally provided. The filter 33 is constructed of, for example, a cylindrical reticulate member, and the liquid refrigerant, which accumulates at the lower side within the gas-liquid separator 2c, passes through a net portion at the upper end of the filter 33 and a net portion having a cylindrical surface as indicated by arrows (f) in FIG. 15, whereby foreign matter in the liquid refrigerant can be removed.

The liquid refrigerant passed through the filter 33 flows downward in an inside passage 31a of the cylindrical portion 31 as indicated by an arrow (g) of FIG. 15. On the wall surface of the cylindrical portion 31, a communication path (hole) 23a facing the header tank 18 is formed. On the other hand, on the lower wall surface between the gas-liquid separator 2c and the header tank 18, there is formed a communication path (hole) 23b at regions opposite to this communication path 23a. Through these both communication paths 23a and 23b, the inside passage 31a of the cylindrical portion 31 is communicated to the lower portion within the header tank 18.

Accordingly, the liquid refrigerant in the inside passage 31a of the cylindrical portion 31 passes through both communication paths 23a and 23b as indicated by an arrow (e) to flow into the lower portion within the header tank 18. In other words, both communication paths 23a and 23b of the ninth embodiment construct the communication path 23 of FIG. 12 described in the eighth embodiment.

In this case, because a passage area of the communication path 23a at the side of the cap member 26 is made sufficiently smaller than a passage area of the communication path 23b at the side of the gas-liquid separator 2c and the header tank 18, an amount of the liquid refrigerant, which flows back from the gas-liquid separator 2c to the header tank 18, can be set by the passage area of the communication path 23a substantially at the side of the cap member 26.

Because the cap member 26 is a separate component which is attachable to or detachable from the gas-liquid separator 2c, the passage area of the communication path 23a is changed by replacing only the cap member 26, whereby it is possible to easily set an optimum amount of flow-back liquid refrigerant for each refrigerating cycle. Moreover, because the filter 33 is also integrally provided to the cap member 26, the filter structure and the structure of a passage for flowing back the liquid refrigerant can be made integrally in one cap member 26, making it possible to simplify the structure, and assembly of the filter 33 to the gas-liquid separator 2c can be simply performed. Further, it is possible to easily inspect and replace the filter 33.

In this respect, at the upper part of the filter 33 of the cap member 26, there is arranged a desiccant 34 for water absorption. This desiccant 34 can be removed out of the gas-liquid separator 2c by removing the cap member 26.

(Tenth Embodiment)

Figure 16:
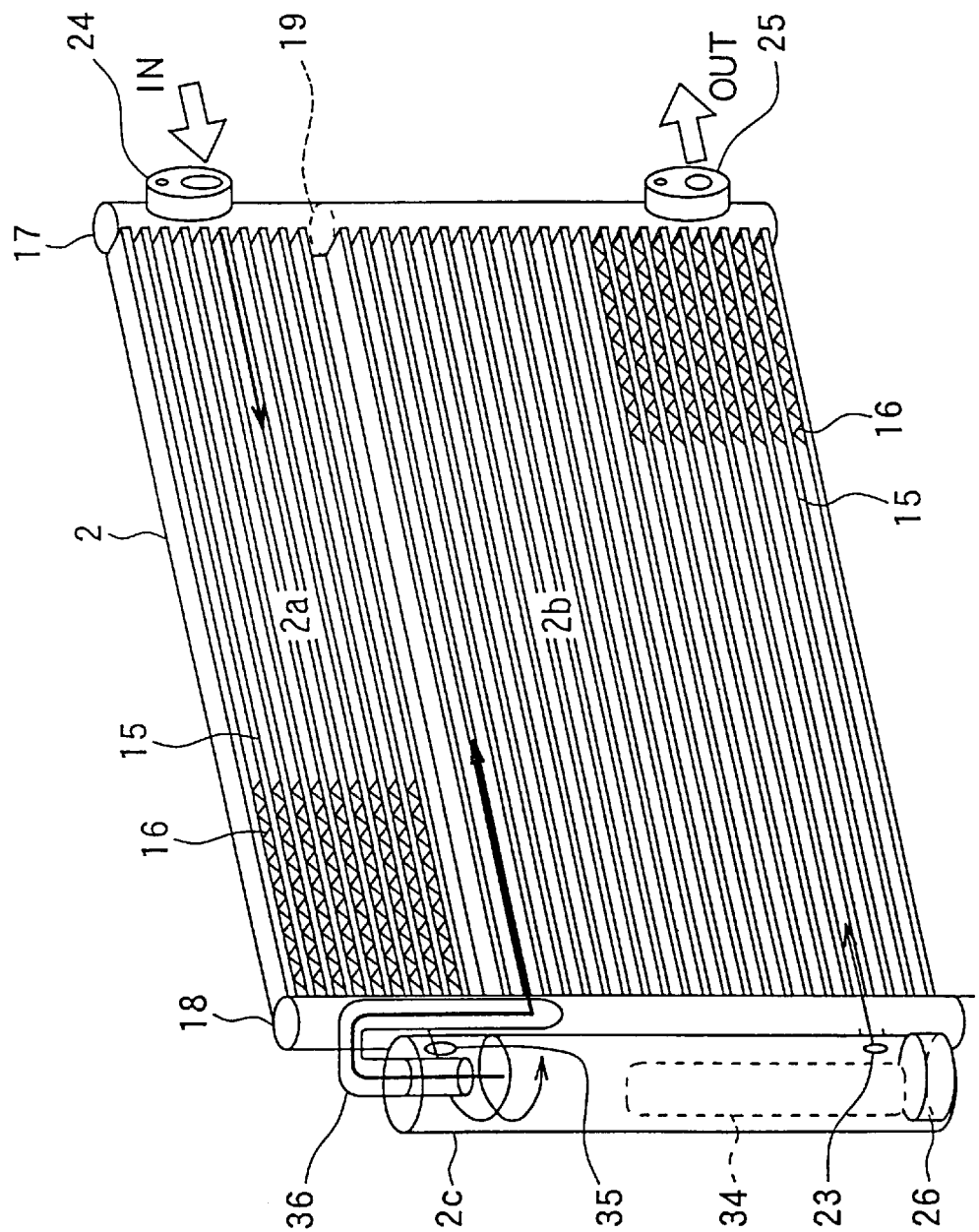
FIG. 16 is a schematic perspective view showing a separator-integrated condenser according a tenth preferred embodiment of the present invention.
Figure 17:
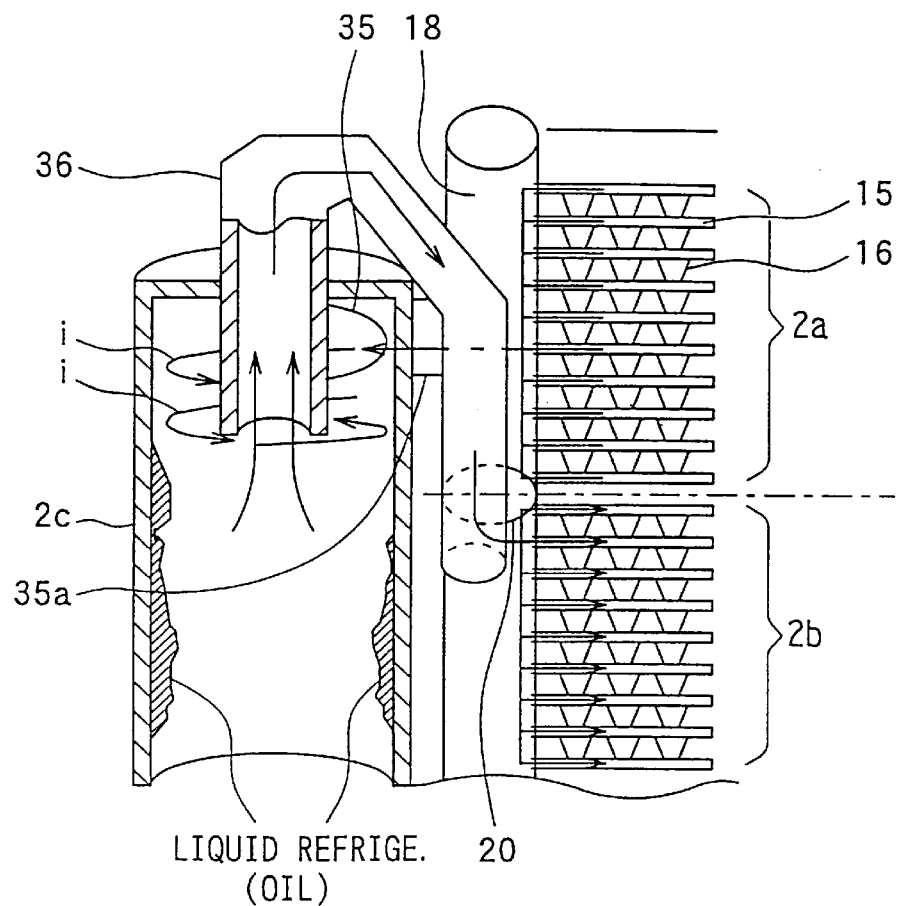
FIG. 17 is a schematic sectional view showing a main part of the separator-integrated condenser in FIG. 16.
Figure 18:
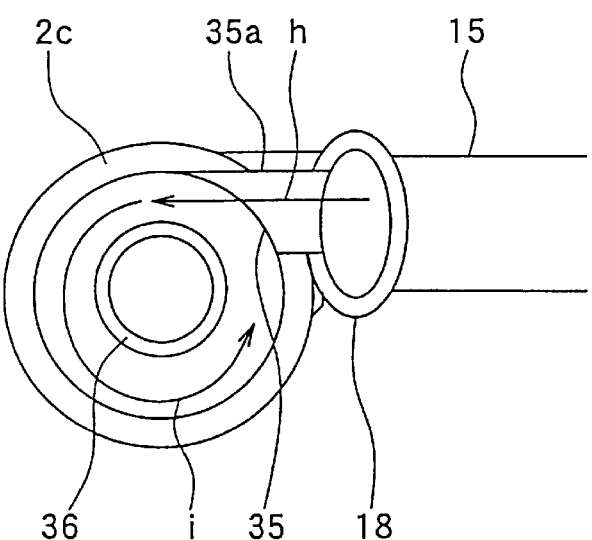
FIG. 18 is a top view showing a main part of the separator-integrated condenser in FIG. 16.

The tenth embodiment relates to a structure for improving a gas-liquid separating operation in the gas-liquid separator 2c. FIGS. 16 to 18 show the tenth embodiment of the present invention. In the tenth embodiment, the parts of the separator-integrated condenser, similar to those in the eighth and ninth embodiments, are designated by the identical reference numerals and the description thereof will be omitted.

In the tenth embodiment, an inlet port 35, through which the refrigerant within the space above a partition plate 20 (FIG. 17) of the header tank 18 flows into the gas-liquid separator 2c, is decentered (shifted) from the center of the gas-liquid separator 2c as shown in FIG. 18 in such a manner that the refrigerant flows into the gas-liquid separator 2c from a tangential direction (h) of the cylindrical inner peripheral surface. Thereby, in the upper part within the gas-liquid separator 2c, the refrigerant forms a gyrating flow (i) along the cylindrical inner peripheral surface.

In this respect, FIGS. 17 and 18 show a connecting tube 35a, through which the refrigerant within space above the partition plate 20 (FIG. 17) of the header tank 18 is introduced to an inlet port 35. However, this connecting tube 35a is only shown simply in order to facilitate understanding the structure of FIGS. 17 and 18. In fact, it is possible to adopt an integrated structure (See FIGS. 12 to 15) of the separator-integrated condenser 2 by directly joining the outer peripheral wall surface of the gas-liquid separator 2c with that of the header tank 18. In this case, it is needed to provide the gas-liquid separator 2c with the inlet port 35, and to provide the header tank 18 with a communication hole communicating to the inlet port 35.

On the other hand, in the upper part within the gas-liquid separator 2c, a gas return tube 36 is arranged to extend in the vertical direction in the central portion of the gyrating flow i. A lower end portion of the gas return tube 36 is opened at the central portion of the gas-liquid separator 2c in the cross section. The upper portion of the gas return tube 36 penetrates through the upper surface portion of the gas-liquid separator 2c to be positioned to the outside, and the gas return tube 36 positioned to the outside is bent downward and communicates to the interior of the header tank 18 at a position (See FIG. 17) lower than the partition plate 20.

Accordingly, in the tenth embodiment, the portion of the inlet port 35 can be used as the first communication path 21 of FIG. 12, and the gas return tube 36 is used as the second communication path 22 of FIG. 12. In the vicinity of the bottom portion of the gas-liquid separator 2c, the third communication path 23 for returning the liquid refrigerant, similar to the third communication path 23 of FIG. 12, is provided.

According to the tenth embodiment, the refrigerant, which has passed through the first heat exchange unit 2a in the upper part of the separator-integrated condenser 2 to be cooled, passes through the upper space of the header tank 18 to flow into the gas-liquid separator 2c from the tangential direction h (FIG. 18) of the cylindrical inner peripheral surface through the inlet port 35. Thereby, in the upper part within the gas-liquid separator 2c, the refrigerant flowing therein forms the gyrating flow (i) along the cylindrical inner peripheral surface of the gas-liquid separator 2c.

This gyrating flow (i) makes a centrifugal force act on the refrigerant flow, the liquid refrigerant and oil having high density are pressed against the inner peripheral surface of the gas-liquid separator 2c, and fall down along the inner peripheral surface thereof as shown in FIG. 17. In contrast, the gas refrigerant having low density collects to the central portion of the gas-liquid separator 2c, and therefore, only the gas refrigerant can be sucked through the opening at the lower end of the gas return tube 36.

Because the gas and liquid of the refrigerant flowing through the inlet port 35 are forcibly separated using the centrifugal force of the gyrating flow I as described above, it is possible to reliably separate the gas and liquid of the refrigerant flowing into the gas-liquid separator 2c even if the tank capacity of the gas-liquid separator 2c is small.

Thus, the gas refrigerant in the gas return tube 36 flows into the second heat exchange unit 2b via the lower space of the header tank 18, and is condensed and cooled again. Here, a part of the liquid refrigerant, which accumulates in the lower part within the gas-liquid separator 2c, passes through the third communication path 23 to flow into the lower space of the header tank 18. In the lower space of the header tank 18, liquid refrigerant mixes with the gas refrigerant, and thereafter, the mixed refrigerant flows into the second heat exchange unit 2b. The refrigerant, which has condensed in the second heat exchange unit 2b, goes out of the condenser 2 from an outlet joint 25 through the lower space of the header tank 17, toward the side of the decompression device 3.

(Eleventh Embodiment)

In a refrigerant cycle system, when a large quantity of the liquid refrigerant accumulates within the gas-liquid separator 2c and the shortage of the refrigerant circulating in the cycle occur, the super-heating degree of the refrigerant at the outlet of the evaporator 4 becomes excessive, and the super-heating degree of the refrigerant discharged from the compressor 1 also becomes excessive. Thus, in the eleventh embodiment, the super-heating degree of the refrigerant discharged from the compressor 1 is directly introduced into the gas-liquid separator 2c to adjust the amount of the liquid refrigerant accumulating within the gas-liquid separator 2c, whereby the super-heating degree of the refrigerant discharged from the compressor 1 is controlled.

Figure 19A:
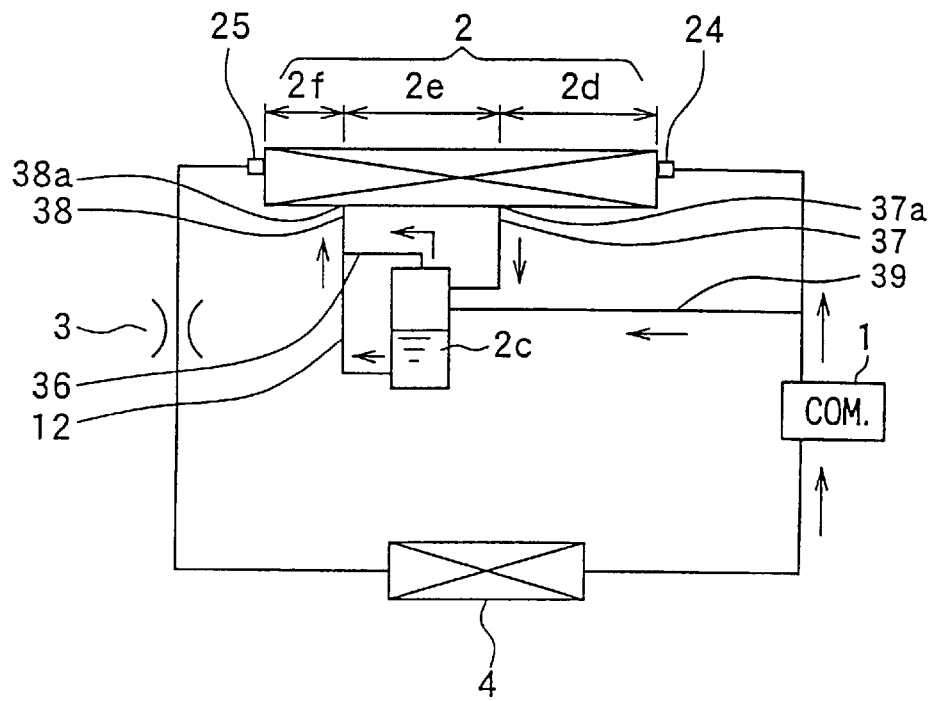
FIG. 19A is a schematic diagram showing a refrigerant cycle system. according to an eleventh preferred embodiment of the present invention.

FIG. 19A shows a refrigerating cycle of the eleventh embodiment, and changes the structure of refrigerant passage to the gas-liquid separator 2c as below. There is provided an inlet flow path 37 through which a part of the refrigerant at a point in the refrigerant passage (cycle main passage) of the condenser 2 flows (bypasses) into the upper part within the gas-liquid separator 2c. A position 37a, where this inlet flow path 37 is taken out, is set to a position where gas-liquid refrigerant in a predetermined dryness area midway in the refrigerant passage of the condenser 2 flows during a steady operation of the refrigerating cycle. A refrigerant flow amount to be branched into the inlet flow path 37 is as small a quantity as, for example, about 10% to the entire flow amount.

The gas return passage 36 corresponds to the gas return tube 36 of FIGS. 16 to 18, and is used to take out the gas refrigerant in the upper part within the gas-liquid separator 2c to return it to a downstream refrigerant passage (to be described later) of the condenser 2. The liquid returning communication path 12 corresponds to the communication path 12 of FIGS. 9 and 11 and the third communication path 23 of FIG. 16 and the like, and is used to take out the liquid refrigerant in the lower part within the gas-liquid separator 2c to an outside of the gas-liquid separator to return it to a downstream refrigerant passage of the condenser 2.

The gas return passage 36 and the liquid-returning liquid communication path 12 are joined into one passage 38, and this passage 38 is connected to a refrigerant passage of the condenser 2 at a predetermined position 38a downstream by a predetermined distance from the taken-out position 37a. However, the gas return passage 36 and the liquid returning communication path 12 do not join, but can be connected to the refrigerant passage of the condenser 2, individually.

Because there is provided a refrigerant passage having predetermined length between the predetermined position 38a and the refrigerant passage outlet of the condenser 2, the refrigerant, which has flowed into the refrigerant passage of the condenser 2 from the passage 38, is cooled again.

Therefore, in the present embodiment, a heat exchange portion of the condenser 2 is partitioned into a first heat exchange unit 2d between an inlet joint 24 and a position 37a, a second heat exchange unit 2e between the position 37a and a position 38a, and a third heat exchange unit 2f between the position 38a and an outlet joint 25. Of course, if the condenser structure is arrange such that a predetermined pressure loss can be secured between the position 37a and the position 38a, there can be adopted the structure in which the second heat exchange unit 2e between the position 37a and the position 38a is not provided.

Further, as a special feature of the eleventh embodiment, a discharged refrigerant bypass passage 39 through which a part of the refrigerant (overheated gas refrigerant) discharged from the compressor 1 is branched and is directly introduced into the upper part within the gas-liquid separator 2c is provided. A refrigerant flow amount to be branched to the discharged refrigerant bypass passage 39 is also as small a quantity as, for example, about 10% to the entire flow amount, similarly to the branched flow amount to the inlet flow path 37.

Next, the description will be made of an operation of the refrigerating cycle system of the eleventh embodiment. When a transitional state immediately after starting of the refrigerating cycle is completed to shift to a steady state, a ratio of a flow amount of gas-liquid refrigerant in a predetermined dryness area from the inlet flow path 37 to a flow amount of the refrigerant from the discharged refrigerant bypass passage 39, and a ratio of a flow amount of gas refrigerant from the gas return passage 36 to a flow amount of liquid refrigerant from the communication path 12 are set to appropriate values, respectively, and a stable liquid surface is formed within the gas-liquid separator 2c.

In this case, when such a phenomenon as that the first heat exchange unit 2d is partially cooled occurs, the amount of refrigerant condensation in the first heat exchange unit 2d increases to increase the amount of liquid refrigerant accumulating within the gas-liquid separator 2c. Then, at the time of such a high cooling load as in summer, the refrigerant amount circulating in the cycle becomes insufficient so that the super-heating degree of refrigerant at outlet of the evaporator 4 becomes high. As a result, the super-heating degree of the refrigerant discharged from the compressor 1 becomes high so that the refrigerant having high super-heating degree flows into the gas-liquid separator 2c from the bypass passage 39.

This flow of the high-temperature refrigerant having high super-heating degree promotes the evaporation of the liquid refrigerant within the gas-liquid separator 2c to reduce the amount of liquid refrigerant within the gas-liquid separator 2c, so that the amount of refrigerant returned from the gas-liquid separator 2c to the condenser 2 via the gas return passage 36 can be increased. Therefore, it is possible to increase the circulating refrigerant amount within the cycle. Thereby, it is possible to reduce the super-heating degree of the refrigerant at outlet of the evaporator, and the liquid level of the liquid refrigerant within the gas-liquid separator 2c can be also maintained at the stable level during a steady operation.

On the other hand, on condition that the heat load is low in a cooling operation, the super-heating degree of the refrigerant at outlet of the evaporator is about 0, or the liquid refrigerant returns into the compressor 1. In this case, the super-heating degree of the refrigerant discharged from the compressor 1 becomes also low. Therefore, an evaporating operation of the liquid refrigerant due to bypassed discharged refrigerant introduced into the gas-liquid separator 2c lowers. For this reason, in the gas-liquid separator 2, the storage amount of the liquid refrigerant due to gas-liquid separation of the gas-liquid refrigerant from the inlet flow path 37 increases, on the contrary.

Thus, if there occurs such a situation that the circulating refrigerant amount within the cycle is insufficient again due to an increase in the liquid refrigerant amount within the gas-liquid separator 2c, the super-heating degree of refrigerant discharged from the compressor 1 is changed in accordance with the refrigerant state within the gas-liquid separator 2c, and the liquid level of the liquid refrigerant within the gas-liquid separator 2c can be maintained at the stable level during the steady operation.

As described above, according to the eleventh embodiment, the refrigerant discharged from the compressor 1 is directly introduced into the gas-liquid separator 2c, whereby a change in the super-heating degree of the refrigerant discharged from the compressor 1 can be effectively fed back to adjust the liquid refrigerant amount within the gas-liquid separator 2c. Thus, through this adjusting operation of the liquid refrigerant amount, the circulating refrigerant amount within the cycle is adjusted to control the super-heating degree of the refrigerant discharged from the compressor 1. Since the compression process in the compressor 1 is basically an isentropic change, if the super-heating degree of the refrigerant discharged from the compressor 1 can be controlled, the super-heating degree of the refrigerant at the outlet of the evaporator 4 can be controlled.

Figure 19B:
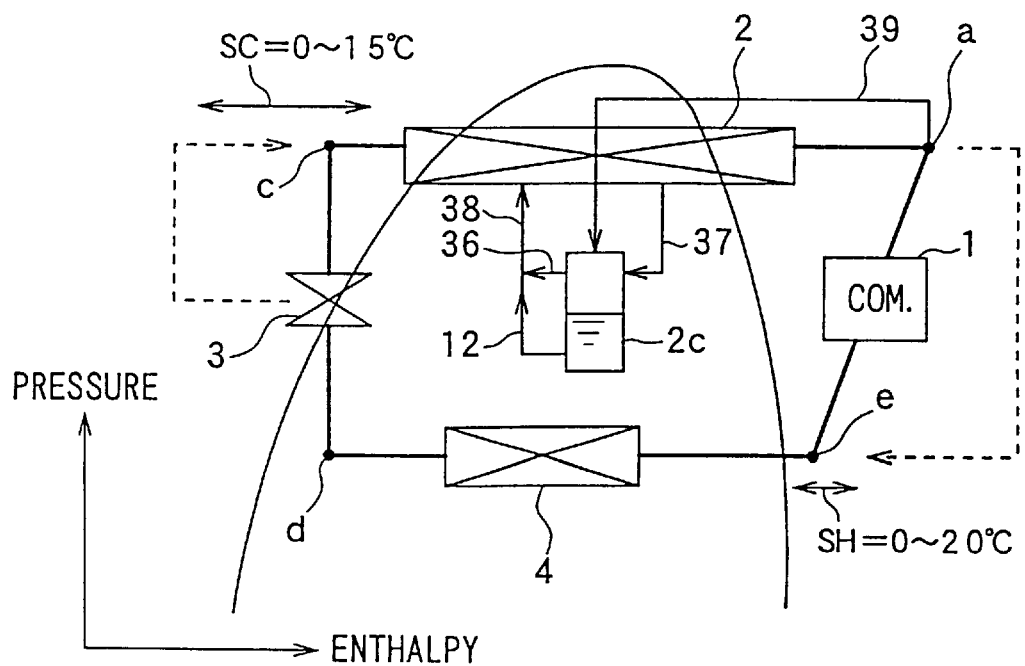
FIG. 19B is a Mollier diagram of the refrigerant cycle system according to the eleventh embodiment.

FIG. 19B is a Mollier diagram showing the operation of the refrigerant cycle system of the eleventh embodiment. In FIG. 19B, the gas-liquid separator 2c is indicated as a state lower in pressure than the condenser 2 for convenience sake in making the drawing, but it is of course that the gas-liquid separator 2c is located between the discharge side of the compressor 1 and the upstream side of the decompression device 3, and is at the substantially same pressure as the condenser 2.

In the eleventh embodiment, any increase in the super-heating degree of the refrigerant at the outlet of the evaporator 4 can be restricted by the adjustment of the liquid refrigerant amount within the gas-liquid separator 2c. Therefore, it becomes possible to restrict an upper limit of the super-heating degree of the refrigerant at the outlet of the evaporator 4 to, for example, about 15° C. According to the eleventh embodiment, shortages of the circulating refrigerant amount within the refrigerant cycle system are more reliably prevented, whereby it is possible to prevent shortages of cooling ability and insufficient return of oil to the compressor 1, due to the shortages of the circulating refrigerant amount.

(Twelfth Embodiment)

Figure 20:
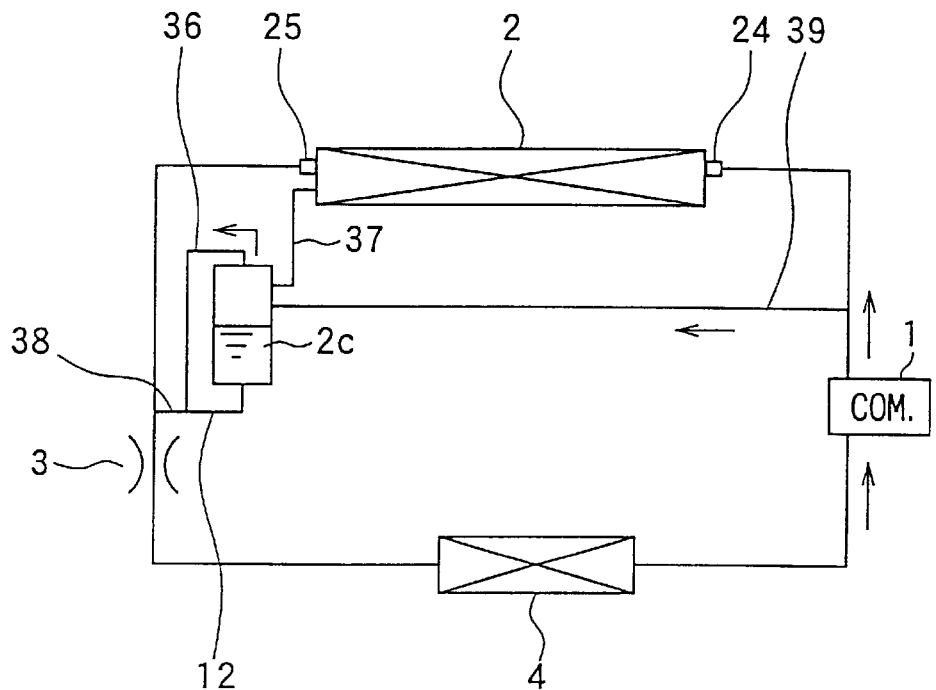
FIG. 20 is a schematic diagram showing a refrigerant cycle system according to a twelfth preferred embodiment of the present invention.

In the above-described eleventh embodiment, the gas-liquid separator 2c is provided within the refrigerant passage of the condenser 2. However, in the twelfth embodiment, there is provided a gas-liquid separator 2c at the refrigerant passage outlet side of the condenser 2 as shown in FIG. 20. Even in the structure of FIG. 20, by the introduction of the refrigerant discharged from the compressor 1 to the gas-liquid separator 2c, the liquid refrigerant amount within the gas-liquid separator 2c can be adjusted,. Accordingly, in the twelfth embodiment, the similar operating effect to the eleventh embodiment can be obtained.

(Thirteenth Embodiment)

Figure 21:
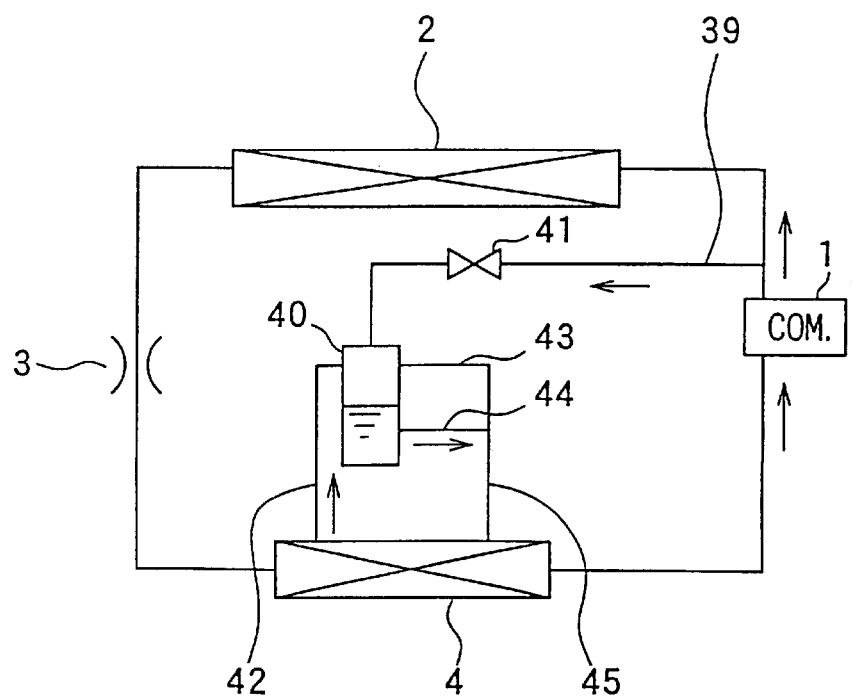
FIG. 21 is a schematic diagram showing a refrigerant cycle system according to a thirteenth preferred embodiment of the present invention.

In each of the above-described embodiments, the gas-liquid separator 2c is provided at the cycle high-pressure side around the condenser 2 to separate the refrigerant into gas refrigerant and liquid refrigerant. However, in the thirteenth embodiment, a gas-liquid separator 40 is provided at a cycle low-pressure side as shown in FIG. 21 to separate low-pressure refrigerant at the side of the evaporator 4 into gas refrigerant and liquid refrigerant.

For this reason, in the thirteenth embodiment, in a refrigerant bypass passage 39, there is provided a decompression device 41 for reducing the pressure of refrigerant discharged from the compressor 1 to a low pressure. The decompression device 41 can be constructed by a fixed restrictor such as a capillary tube and an orifice. There is provided an inlet passage 42, through which a part of the gas-liquid refrigerant in a predetermined dryness area is bypassed from midway in the refrigerant passage of the evaporator 4 to flow into the upper part within the gas-liquid separator 40. Further, there are provided a gas return passage 43, through which gas refrigerant obtained by separating from liquid within the gas-liquid separator 40 flows from the upper part of the gas-liquid separator 40 to the outside, and a liquid return passage 44, through which liquid refrigerant obtained by separating from gas and accumulated in the lower part within the gas-liquid separator 40 is taken out to the outside. These both passages 43 and 44 are joined into one passage 45, and this passage 45 is connected to the evaporator 4 at a predetermined position downstream by a predetermined distance from the taken-out position of the inlet passage 42. However, in the thirteenth embodiment, the gas return passage 43 and the liquid return passage 44 may not be joined, but be connected to refrigerant passages of the evaporator 4, individually.

In the thirteenth embodiment, the gas-liquid separator 40 is provided at the cycle low-pressure side to separate the refrigerant of the evaporator 4 into gas refrigerant and liquid refrigerant. The present embodiment is the same as the case, where the high-pressure side gas-liquid separator 2c is provided, in that a part of the refrigerant discharged from the compressor 1 is bypassed for being introduced into the gas-liquid separator 40. Accordingly, in the thirteenth embodiment, a change in the super-heating degree of the refrigerant discharged from the compressor 1 can be fed back for the adjustment of the liquid refrigerant amount within the gas-liquid separator 40, and an operating effect similar to the eleventh embodiment can be obtained.

In this respect, the low-pressure side gas-liquid separator 40 according to the thirteenth embodiment may be provided at the outlet side or the inlet side of the refrigerant passage of the evaporator 4, and not midway in the refrigerant passage of the evaporator 4.

(Fourteenth Embodiment)

Either the eleventh embodiment (FIG. 19) or the twelfth embodiment (FIG. 20) has adopted a system in which a part of the refrigerant discharged from the compressor 1 is bypassed for introducing into the cycle high-pressure side gas-liquid separator 2c. However, in the fourteenth embodiment, the operating effect of the eleventh or twelfth embodiment is obtained through the use of an electric mechanism.

Figure 22:
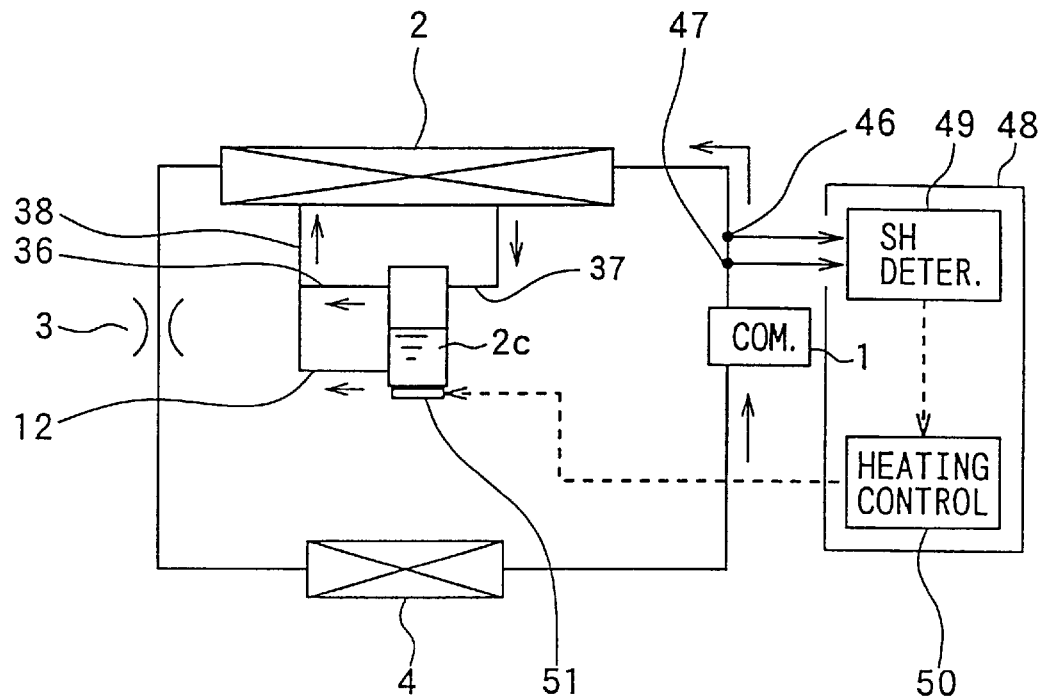
FIG. 22 is a schematic diagram showing a refrigerant cycle system according to a fourteenth preferred embodiment of the present invention.

In the fourteenth embodiment, as shown in FIG. 22, at the refrigerant discharge side of the compressor 1, there are provided a refrigerant temperature sensor 46 and a refrigerant pressure sensor 47, and detection signals from these both sensors 46 and 47 are inputted into super-heating degree (SH) determining means 49 of an electronic control unit 48 to determine the super-heating degree of the refrigerant discharged from the compressor 1 by this determining means 49. Thus, the signal of the super-heating degree determined by the super-heating degree determining means 49 is input to heating amount control means 50. On the other hand, in a lower part of the gas-liquid separator 2c, an electric heater 51 for heating the liquid refrigerant is provided in advance.

As the super-heating degree of the refrigerant discharged from the compressor 1 becomes higher, energization of the electric heater 51 is controlled so as to increase a heating amount of the electric heater 1 by the heating amount control means 50.

According to the fourteenth embodiment, since evaporation amount of the liquid refrigerant within the gas-liquid separator 2c can be increased by increasing the heating amount of the electric heater 51 in response to the increase in the super-heating degree of the discharged refrigerant, the similar operating effect to the eleventh and twelfth embodiments can be obtained.

(Fifteenth Embodiment)

Figure 23:
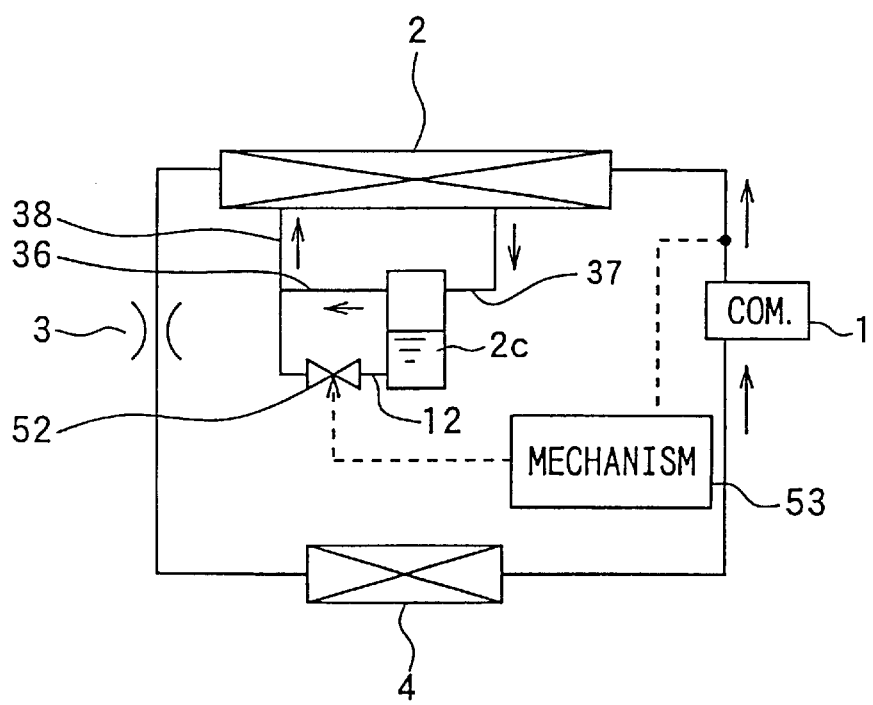
FIG. 23 is a schematic diagram showing a refrigerant cycle system according to a fifteenth preferred embodiment of the present invention.

In the fifteenth embodiment, as shown in FIG. 23, a valve 52 is provided in the communication path 12 of the gas-liquid separator 2c in such a manner that an opening degree of the valve 52 is adjusted by a valve driving mechanism 53 for operating in response to the super-heating degree of the refrigerant discharged from the compressor 1.

The valve driving mechanism 53 for operating the valve 52 in response to the super-heating degree can be constructed by a mechanical mechanism which makes a displacement in response to the temperature and pressure of the refrigerant discharged from the compressor 1 similarly to a diaphragm mechanism in the thermal expansion valve. In response to the increase in the super-heating degree of the refrigerant discharged from the compressor 1, the opening degree of the valve 52 is increased by the valve driving mechanism 53. Thereby, the flow amount of the liquid refrigerant from the communication path 12 can be increased in response to the increase in the super-heating degree of the discharged refrigerant, and the operating effect similar to the eleventh and twelfth embodiments can be obtained.

In this respect, in place of the valve driving mechanism 53 for mechanically operating in response to the super-heating degree according to the fifteenth embodiment, the super-heating degree of the refrigerant discharged from the compressor 1 can be electrically determined through the use of the refrigerant temperature sensor 46, the refrigerant pressure sensor 47 and the super-heating degree determining means 49 according to the fourteenth embodiment. On the other hand, the opening degree of the valve 52 may be electrically adjusted in response to the output from the super-heating degree determining means 49 so that the valve 52 is driven by an electric actuator such as a motor.

In the fifteenth embodiment, the flow amount of the liquid refrigerant from the communication path 12 is adjusted depending on a change in the opening of the valve 52, whereby the circulating refrigerant flow amount within the refrigerant cycle system can be adjusted, and therefore, it is also possible to omit the gas return passage 36.

(Sixteenth Embodiment)

Figure 24:
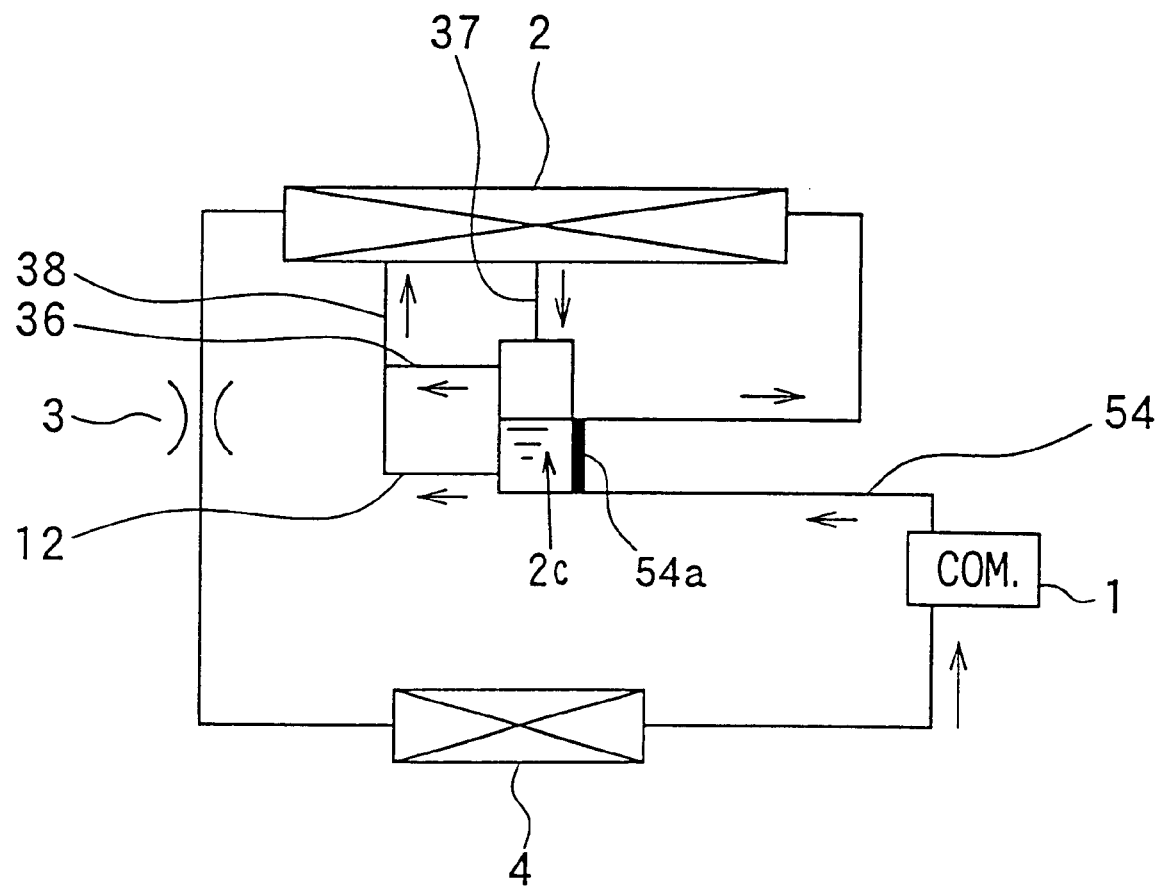
FIG. 24 is a schematic diagram showing a refrigerant cycle system according to a sixteenth preferred embodiment of the present invention.

In the sixteenth embodiment, as shown in FIG. 24, a refrigerant pipe 54 through which refrigerant discharged from the compressor 1 is introduced into the gas-liquid separator 2c is provided with a heat conduction portion 54a adhered to the outer surface of the gas-liquid separator 2c. In this case, when the super-heating degree of the refrigerant discharged from the compressor 1 becomes higher, the heating amount of the liquid refrigerant within the gas-liquid separator 2c caused by the heat conduction portion 54a increases to promote evaporation of the liquid refrigerant.

Accordingly, the operating effect similar to the eleventh and twelfth embodiments can be obtained.

(Seventeenth Embodiment)

Figure 25:
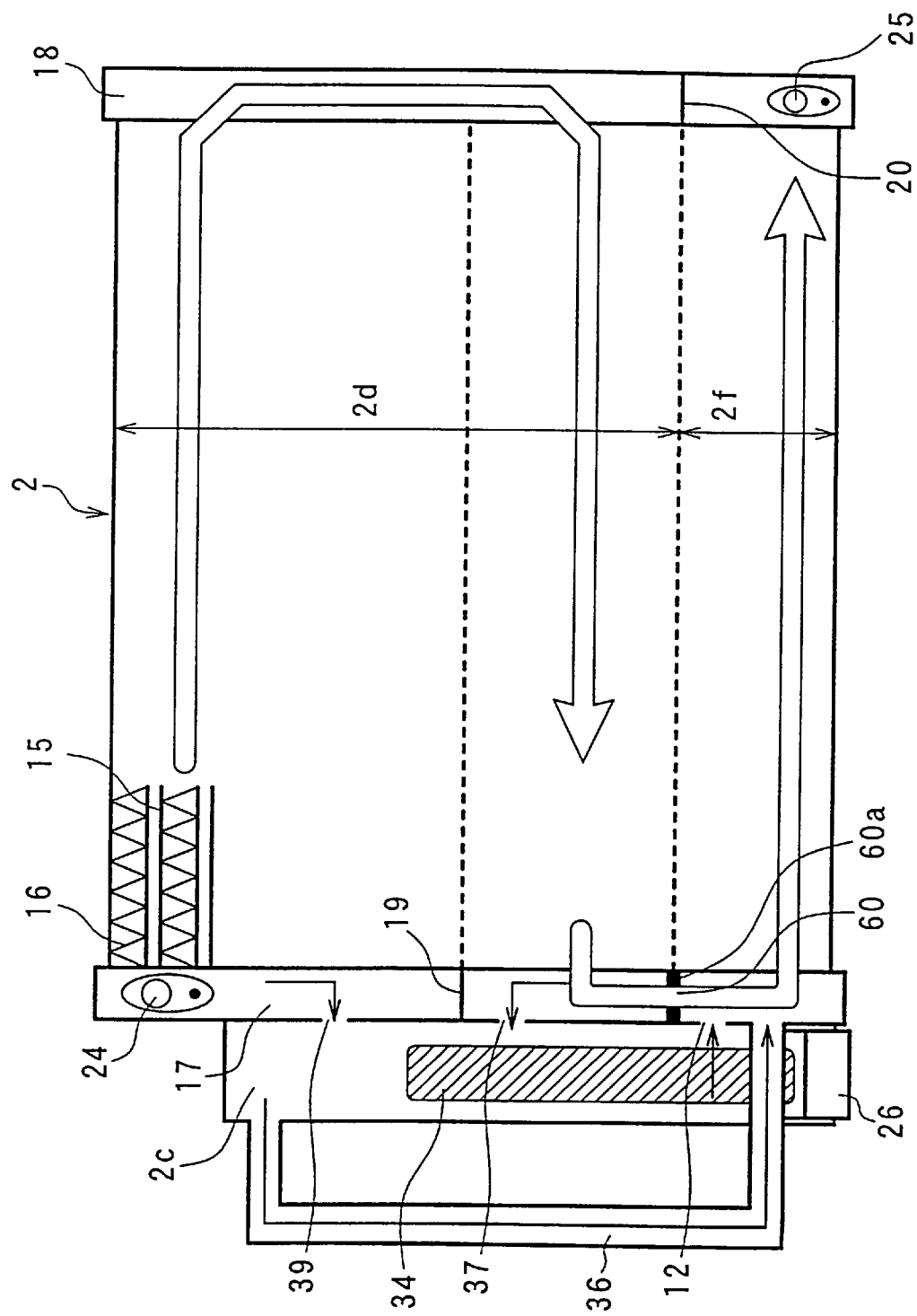
FIG. 25 is a schematic sectional view showing a separator-integrated condenser according a seventeenth preferred embodiment of the present invention.

FIG. 25 shows the seventeenth embodiment, which relates to a concrete example for a separator-integrated condenser 2 integrated with a gas-liquid separator for realizing the same effect as the eleventh embodiment (FIG. 19). In FIG. 25, portions having functions similar to those in FIG. 19 are indicated by the same reference numerals.

The basic structure of the separator-integrated condenser 2 according to the seventeenth embodiment is similar to that shown in FIGS. 12 to 18. That is, between both left and right header tanks 17 and 18, there is arranged a heat exchange unit consisting of a multiplicity of flat tubes 15 for extending in the horizontal direction, and corrugate fins 16 to be joined to them.

In the structure of the condenser shown in FIGS. 12 to 18, however, both the inlet joint 24 and the outlet joint 25 are arranged in one header tank 17, and the gas-liquid separator 2c is arranged to the other header tank 18. In contrast, in the seventeenth embodiment, the gas-liquid separator 2c is arranged in one header tank 17, in which the inlet joint 24 is arranged, and the outlet joint 25 is arranged in the other header tank 18.

In the seventeenth embodiment, a partition plate 19 is provided on the upper side within the one header tank 17, and a plate member 60a having a restrictor 60 is provided on the lower side within the header tank 17. Within the other header tank 18, a partition plate 20 is arranged at the same height position as the plate member 60a having the restrictor 60.

In the header tank 17, space above the partition plate 19, into which the refrigerant discharged from the compressor 1 flows from the inlet joint 24, directly communicates to the upper portion side within the gas-liquid separator 2c through a discharged refrigerant bypass passage 39.

In the heat exchange unit of the separator-integrated condenser 2, the upper part side of the plate member 60a having the restrictor 60 and the partition plate 20 constructs a first heat exchange unit 2d (corresponds to the first heat exchange unit 2d of FIG. 19), and the lower part side constructs a second heat exchange unit 2f (corresponds to the third heat exchange unit 2f of FIG. 19).

Refrigerant, which has passed through the first heat exchange unit 2d to be cooled and condense, is normally gas-liquid refrigerant in a predetermined dryness area, and this refrigerant flows into an intermediate space between the upper partition plate 19 and the lower plate member 60a with the restrictor 60 in the header tank 17. Thereafter, the main stream of refrigerant passes through the restrictor 60 from this intermediate space to flow into the lowest space within the header tank 17. At the same time, a part of the refrigerant in the intermediate space flows into the gas-liquid separator 2c from the inlet flow path 37.

The liquid refrigerant including oil in the lower part within the gas-liquid separator 2c flows into the lowest space within the header tank 17 through the communication path 12 for returning liquid refrigerant to be circulated in the refrigerant cycle system. In this embodiment, between the intermediate space and the lowest space within the header tank 17, a desired pressure difference can be set by means of pressure loss caused by the restrictor 60 of the plate member 60a. Accordingly, it is possible to reliably flow a part of the refrigerant in the intermediate space into the gas-liquid separator 2c from the inlet flow path 37, and to reliably flow the liquid refrigerant within the gas-liquid separator 2c into the lowest space within the header tank 17 through the communication path 12.

In this embodiment, any of the above-described discharged refrigerant bypass passage 39, the inlet flow path 37 and the communication path 12 for returning liquid refrigerant can be simply formed by a communication hole for penetrating a wall surface between the header tank 17 and the gas-liquid separator 2c. Therefore, there is no need to particularly install any pipe for forming any discharged refrigerant bypass passage 39 and the like. In this respect, the communication path 12 for returning the liquid refrigerant corresponds to the communication path 12 for returning the liquid refrigerant of FIG. 19, and the communication path 23 of FIG. 12 and the like.

Further, there is provided a gas refrigerant taking-out tube 36 for introducing the gas refrigerant in the upper part within the gas-liquid separator 2c into the lowest space within the header tank. This gas refrigerant taking-out tube 36 can be simultaneously joined to the gas-liquid separator 2c and the header tank 17 when the separator-integrated condenser 2 is integrally brazed.

With such structure as described above, even in the seventeenth embodiment, a refrigerant flow similar to the eleventh embodiment is formed and an operating effect similar to the eleventh embodiment can be obtained. More specifically, the refrigerant discharged from the compressor 1 passes through the first heat exchange unit 2d from the inlet joint 24 to be cooled and condensed to become gas-liquid refrigerant with a predetermined dryness area, and a part of this gas-liquid refrigerant passes through the intermediate space within the header tank 17 and the inlet flow path 37 to flow into the gas-liquid separator 2c. At the same time, a part of the refrigerant from the inlet joint 24 directly flows into the gas-liquid separator 2c through the bypass passage 39, to heat-exchange with the liquid refrigerant within the gas-liquid separator 2c. Therefore, the super-heating degree of the refrigerant discharged from the compressor is fed back to within the gas-liquid separator 2c, making it possible to adjust the amount of liquid refrigerant which accumulates within the gas-liquid separator 2c. The refrigerant flow amount circulating in the refrigerant cycle system is adjusted to adjust the super-heating degree of the refrigerant discharged from the compressor 1.

Since the liquid refrigerant within the gas-liquid separator 2c can be reliably flowed into the lowest space within the header tank 17 through the communication path 12 for returning the liquid refrigerant, it is possible to effectively prevent insufficient of the oil returning to the compressor 1 and shortages of the refrigerant flow amount circulating in the refrigerant cycle system.

(Eighteenth Embodiment)

Figure 26:
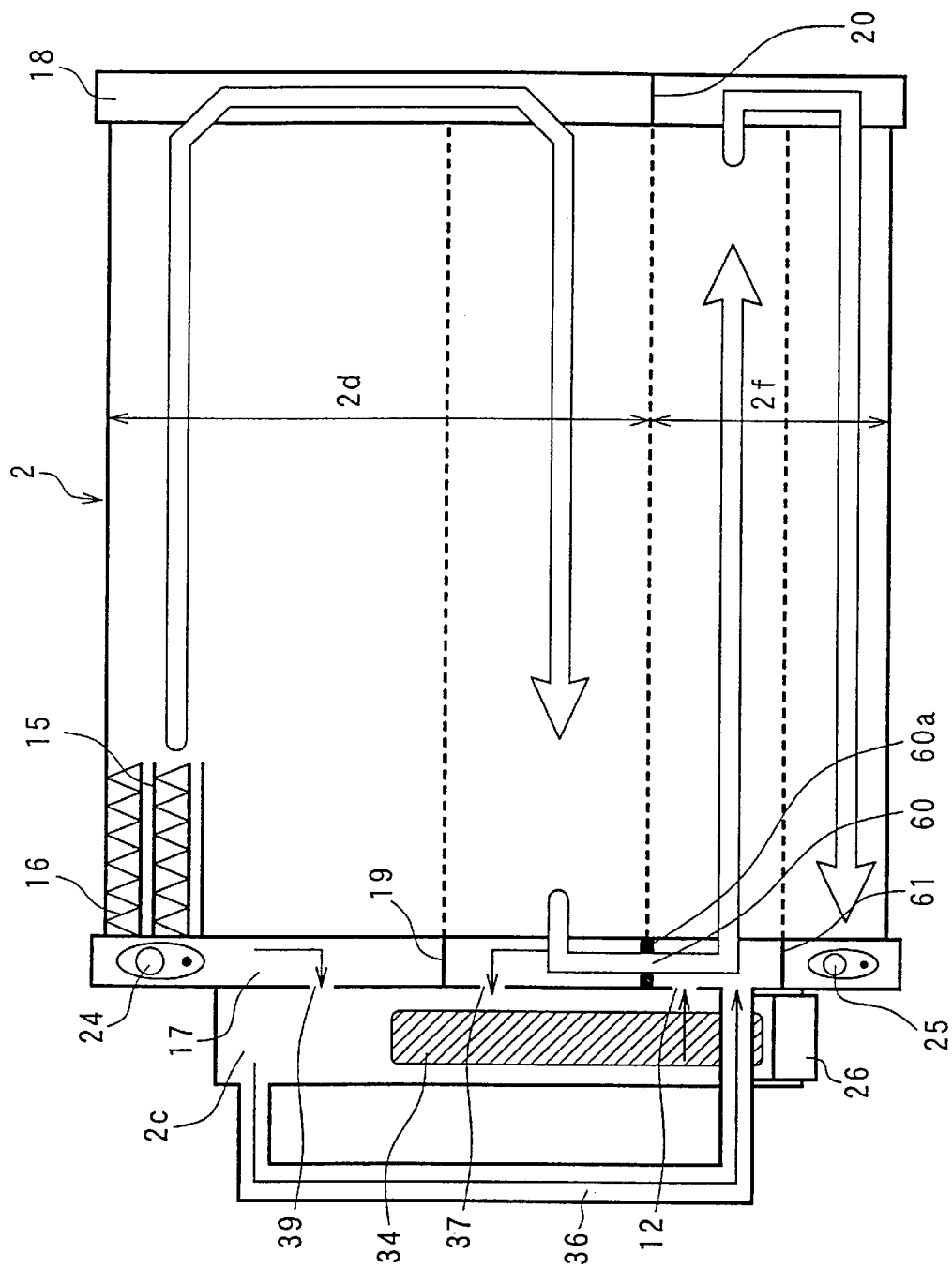
FIG. 26 is a schematic sectional view showing a separator-integrated condenser according an eighteenth preferred embodiment of the present invention.

In the above-described seventeenth embodiment, the refrigerant flow in the condenser 2 is made to have a S-turn flow, so that the refrigerant flow makes a U-turn once at the side of the header tank 17 and at the side of the header tank 18, respectively. However, in the eighteenth embodiment, a W-turn flow is adopted as shown in FIG. 26, so that the refrigerant flow makes a U-turn once at the side of one header tank 17 and makes a U-turn twice at the side of the other header tank 18.

For this reason, in the eighteenth embodiment, within the one header tank 17, a partition plate 61 is additionally provided at the lower side of a restrictor 60, and an outlet joint 25 is provided in space in the lowest part lower than this partition plate 61, as compared with the structure of FIG. 25. Thereby, in a second heat exchange unit 2f on the lower side of the condenser 2, a refrigerant flow, which makes a U-turn, is formed in the lower space within the other header tank 18, so that the W-turn flow can be formed. In the eighteenth, the other parts are similar to those of the seventeenth embodiment.

According to the eighteenth embodiment, it is possible to arrange both the inlet joint 24 and the outlet joint 25 collectively in the one header tank 17, and to perform a refrigerant pipe connecting operation on a vehicle collectively at the side of the one header tank 17.

(Nineteenth Embodiment)

Figure 27:
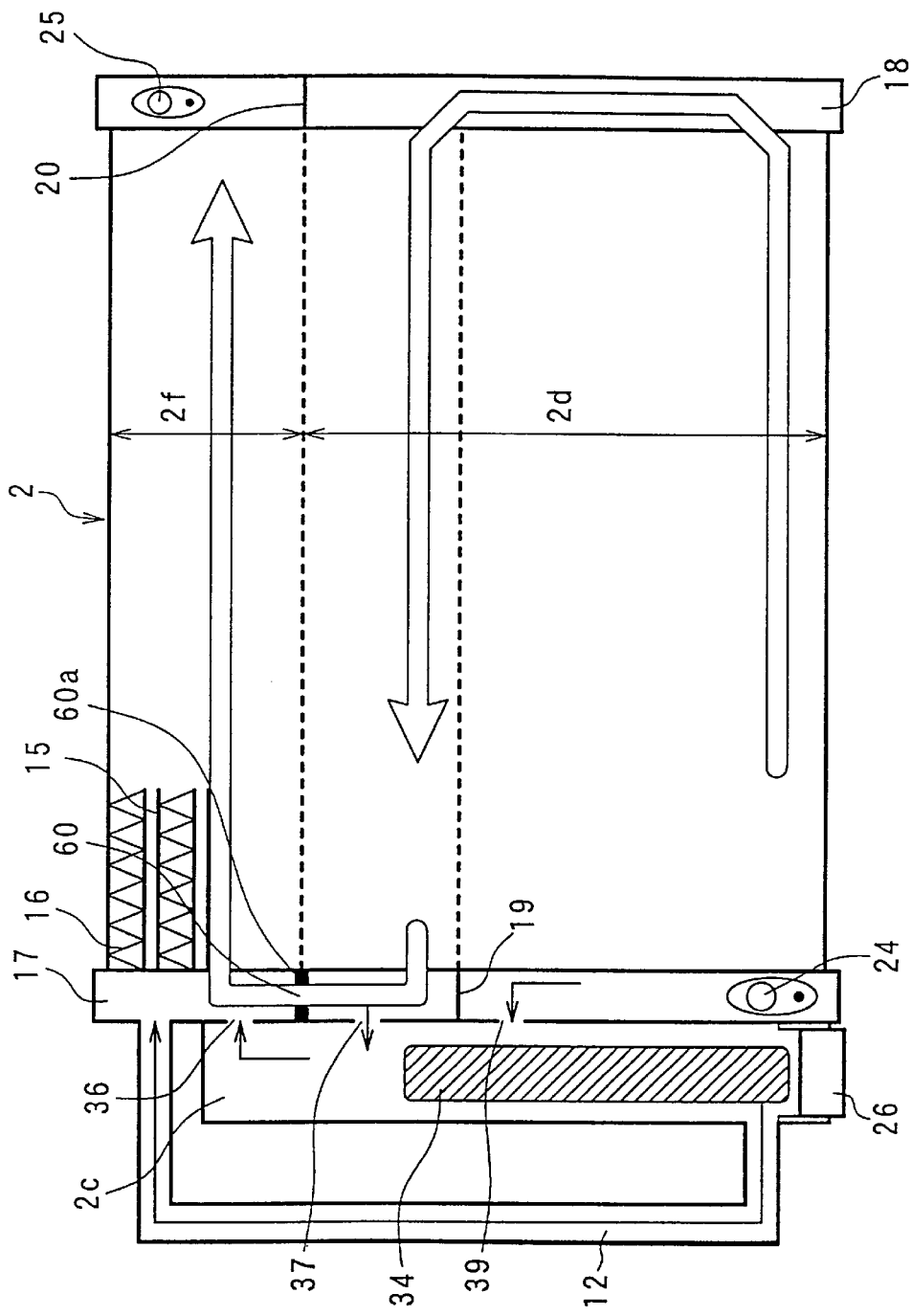
FIG. 27 is a schematic sectional view showing a separator-integrated condenser according a nineteenth preferred embodiment of the present invention.

In the above-described seventeenth and eighteenth embodiments, the first heat exchange unit 2d for cooling the refrigerant discharged from the compressor 1 through the inlet joint 24 is arranged on the upper side of the condenser 2, and the second heat exchange unit 2f for cooling the refrigerant from the first heat exchange unit 2d and for cooling the mixed refrigerant consisting of gas refrigerant and liquid refrigerant from the gas-liquid separator 2c is arranged on the lower side of the condenser 2. However, in the nineteenth embodiment, as shown in FIG. 27, the first heat exchange unit 2d for cooling the refrigerant discharged from the compressor is arranged on the lower side of a condenser 2, and the second heat exchange unit 2f for cooling the refrigerant from the first heat exchange unit 2d and for cooling mixed refrigerant consisting of gas refrigerant and liquid refrigerant from the gas-liquid separator 2c is arranged on the upper side of the condenser 2.

Accordingly, in the nineteenth embodiment, in the interior of the header tank 17, on the upper side of the partition plate 19, there is arranged the plate member 60a with the restrictor 60, and the inlet joint 24 is arranged in space in the lowest part of the header tank 17. Since upper space of the restrictor 60 within the header tank 17 is adjacent to gas refrigerant space in the upper part within the gas-liquid separator 2c, the gas return passage 36 constituted of a communication path is formed in wall surfaces of the gas-liquid separator 2c and the header tank 17 in such a manner that gas refrigerant in the upper part within the gas-liquid separator 2c can be directly introduced into the upper space of the restrictor 60 within the header tank 17.

Because a storage portion of the liquid refrigerant in the lower part within the gas-liquid separator 2c is spaced apart from the upper space of the restrictor 60 within the header tank 17, these two are connected together through a communication path 12 for returning the liquid, constituted of a pipe member in such a manner that the liquid refrigerant in the lower part within the gas-liquid separator 2c can be introduced into the upper space of the restrictor 60 within the header tank 17.

On the other hand, in the other header tank 18, the partition plate 20 is arranged at the same height position (position near the upper part within the tank 18) as the restrictor 60, and an output joint 25 is arranged in upper space of the partition plate 20 within the other header tank 18.

According to the refrigerant cycle system of the nineteenth embodiment, the inlet flow path 37, through which refrigerant from the first heat exchange unit 2d flows into the gas-liquid separator 2c, is located at the upper side of the partition plate 19, and a bypass passage 39 of refrigerant discharged from the compressor 1 is located at the lower side of the partition plate 19. Therefore, the gas refrigerant from the bypass passage 39 goes upward because of a difference in density between gas refrigerant and liquid refrigerant within the gas-liquid separator 2c. In contrast, because the refrigerant, which has passed through the first heat exchange unit 2d, is gas-liquid refrigerant in a predetermined dryness area, the liquid refrigerant falls from the position of opening of the inlet flow path 37 within the gas-liquid separator 2c by gravitation.

Accordingly, the gas refrigerant from the bypass passage 39 can be favorably mixed with the liquid refrigerant from the inlet flow path 37, and heat exchange between both can be favorably performed. As a result, the super-heating degree of the refrigerant discharged from the compressor 27 is properly fed back (responded) to the liquid refrigerant within the gas-liquid separator 2c, whereby it is possible to accurately adjust the amount of liquid refrigerant which accumulates within the gas-liquid separator 2c.

Accordingly to the refrigerant cycle system of the nineteenth embodiment, since the inlet joint 24 is arranged on the lower part side and the outlet joint 25 is arranged on the upper part side, it is suitable for a mounting layout in which a compressor discharge side pipe on the vehicle side is located on the lower side of the condenser 2, and a high-pressure liquid refrigerant pipe on the vehicle side is located on the upper side of the condenser 2.

(Twentieth Embodiment)

Figure 28:
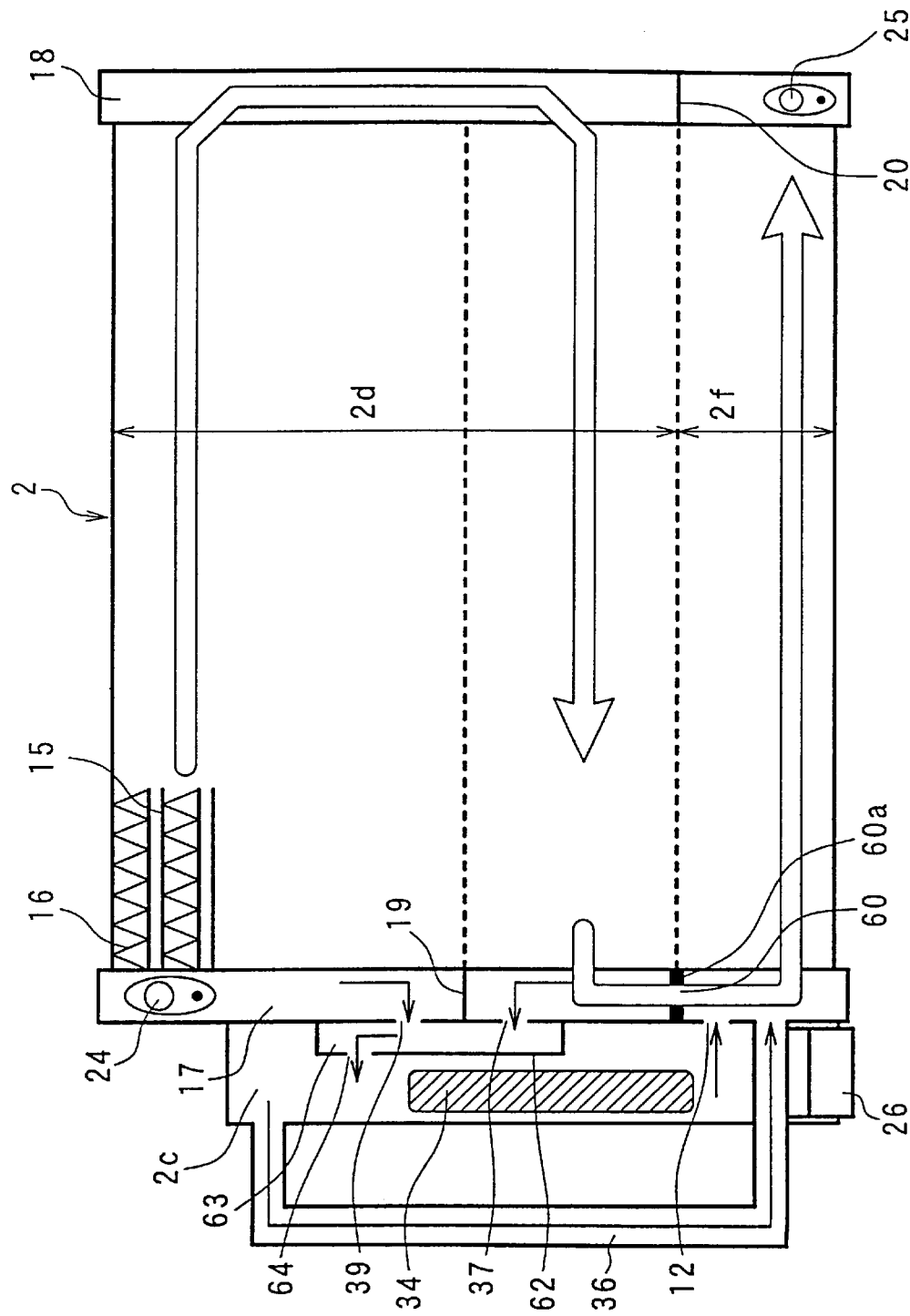
FIG. 28 is a schematic sectional view showing a separator-integrated condenser according a twentieth preferred embodiment of the present invention.

The twentieth embodiment is a modification of the seventeenth embodiment of FIG. 25. In the twentieth embodiment, as shown in FIG. 28, within the gas-liquid separator 2c, there is formed a mixing chamber 63 partitioned by a partition plate 62 extending in the vertical direction, so that the bypass passage 39 and the inlet flow path 37 are communicated to this mixing chamber 63.

Accordingly, the gas refrigerant discharged from the compressor 1 flows into the mixing chamber 63 from the bypass passage 39, and at the same time, the gas-liquid refrigerant having passed through the first heat exchange unit 2*d* flows into the mixing chamber 63 from the inlet flow path 37. Thus, after the gas-liquid refrigerant and the gas refrigerant discharged from the compressor 1 are mixed and are heat-exchanged within the mixing chamber 63, the mixed refrigerant flows into the gas-liquid separator 2*c* from an outlet communication path 64 in the upper part of the mixing chamber 63.

According to the twentieth embodiment, since the mixing chamber 63 is formed into a longitudinal space having a small cross-sectional area and extending in the vertical direction, the gas-liquid refrigerant from the inlet flow path 37 and the compressor-discharged refrigerant from the inlet joint 24 can be favorably mixed and heat-exchanged within the mixing chamber 63. Therefore, the amount of the liquid refrigerant, which accumulates within the gas-liquid separator 2*c*, can be properly adjusted in response to the degree of overheat of the compressor-discharged refrigerant.

(Twenty-first Embodiment)

Figure 29:
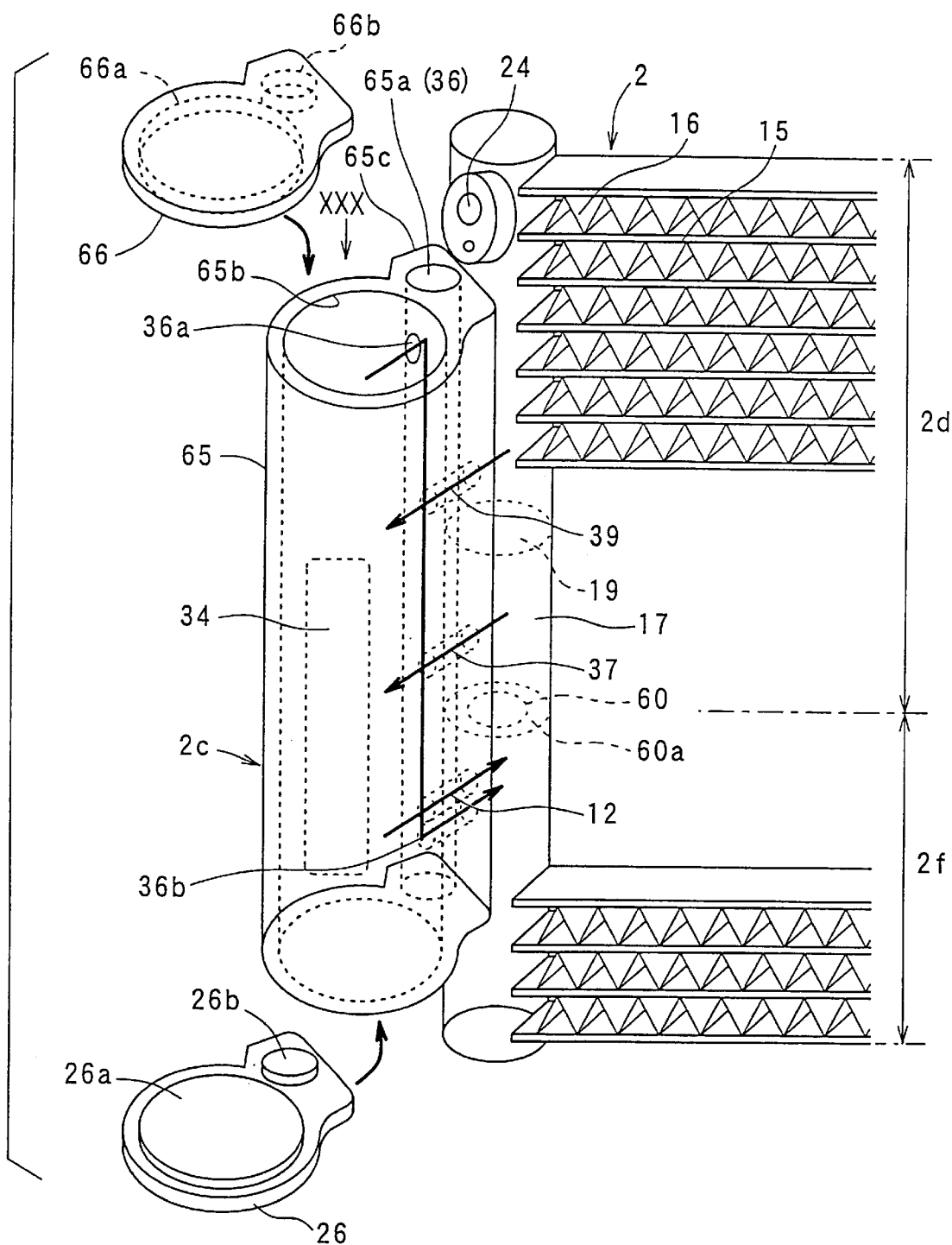
FIG. 29 is a perspective view showing a main part of a separator-integrated condenser in a disassembled state of a cap member, according a twenty-first preferred embodiment of the present invention.
Figure 30:
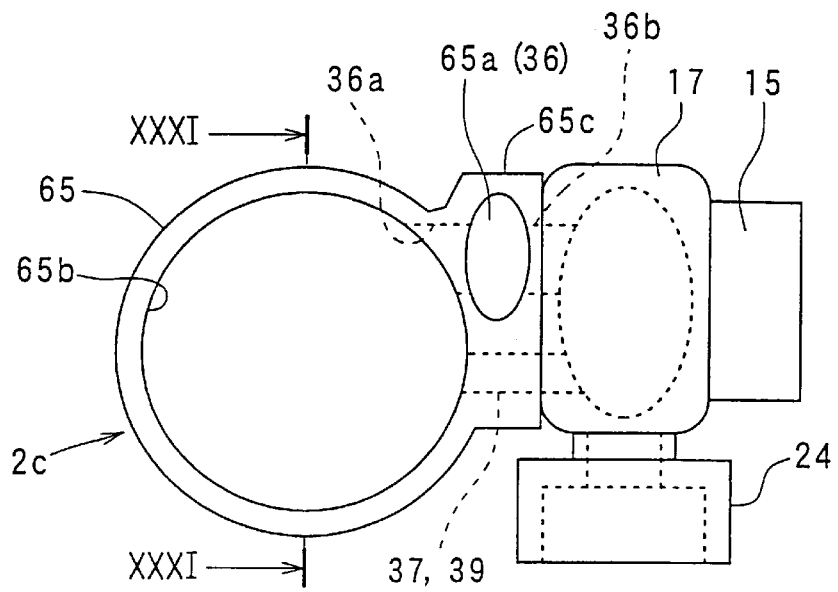
FIG. 30 is a top view when being viewed from arrow XXX in FIG. 29.
Figure 31:
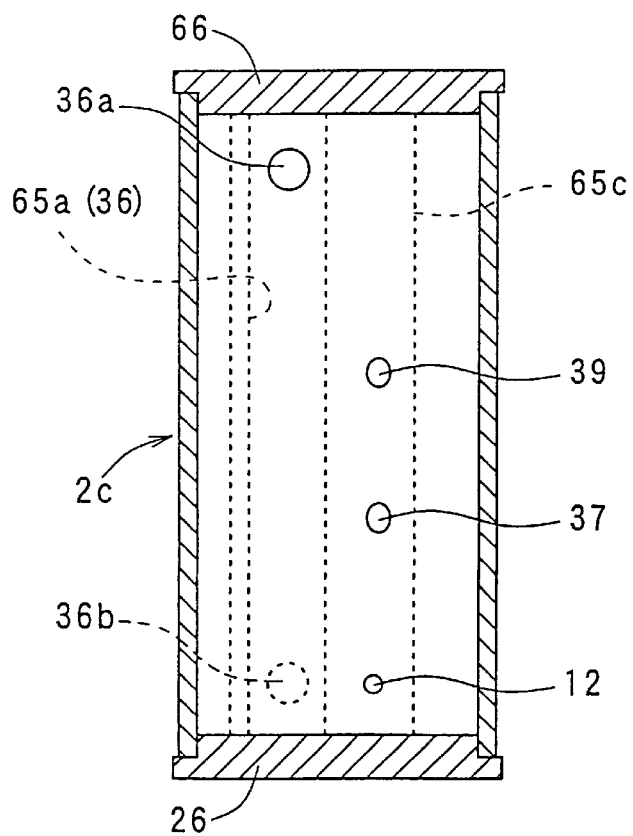
FIG. 31 is a cross-sectional view taken along line XXXI—XXXI in FIG. 30.

The twenty-first embodiment improves a method for forming a gas-liquid separator 2*c* of a separator-integrated condenser 2. In FIGS. 29 to 31, the gas-liquid separator 2*c* has a tubular body portion 65 extending in the vertical direction, a lower cap member 26 for blocking (closing) a lower end opening of this tubular body portion 65 and an upper cap member 66 for blocking (closing) an upper end opening thereof.

The tubular body portion 65 and both cap members 26 and 66 are all formed from aluminum, and the tubular body portion 65 is formed with an auxiliary passage 65*a* throughout its length in the longitudinal direction (vertical direction). This auxiliary passage 65*a* has an oblong cross-sectional shape shown in FIG. 30, for example, and is formed in parallel with tank space 65*b* having a circular cross-section of the gas-liquid separator 2*c*.

Accordingly, the tank space 65*b* having the circular cross-section of the gas-liquid separator 2*c* and the auxiliary passage 65 having the oblong cross-section can be integrally formed by extrusion or the like. In this respect, the tubular body portion 65 is formed with a projection 65*c* projecting toward the header tank 17 throughout its length in the longitudinal direction (vertical direction), and the projection 65*c* is provided with the auxiliary passage 65*a*. Further, the side portion of the projection 65*c* is adapted to be joined (brazed) to the header tank 17.

The auxiliary passage 65*a* is formed to define a gas return passage 36 through which the gas refrigerant in the upper part within the tank space 65*b* in the gas-liquid separator 2*c* is introduced into the lower space of the restrictor 60 within the header tank 17. For this reason, the vicinity of the upper end portion of the auxiliary passage 65*a* communicates to the upper part within the tank space 65*b* through an inlet communication hole 36*a* formed in the projection 65*c* of the tubular body portion 65. The vicinity of the lower end of the auxiliary passage 65*a* communicates to the lower space of the restrictor 60 within the header tank 17 through an outlet communication hole 36*b* formed in the projector 65*c* of the tubular body portion 65.

Both upper and lower cap members 26 and 66 are provided with protruded portions 26*a* and 66*a* each having a larger area corresponding to the lower-end opening and the upper-end opening of the tank space 65*b* of the tubular body portion 65 respectively, and with protruded portions 26*b* and 66*b* each having a smaller area corresponding to the lower-end opening and the upper-end opening of the auxiliary passage 65*a*, respectively, by molding. Thus, the protruded portions 26*a* and 66*a* each having a larger area are fitted in and joined to the lower-end opening and the upper-end opening of the tank space 65*b* respectively, and the protruded portions 26*b* and 66*b* each having a smaller area are fitted in and joined to the lower-end opening and the upper-end opening of the auxiliary passage 65*a* respectively, whereby the both upper and lower openings of the tank space 65*b* and the auxiliary passage 65*a* can be blocked at the same time.

In the projection 65*c* of the tubular body portion 65, on the side portion (lower portion in FIG. 30) of the auxiliary passage 65*a*, there are provided three communication paths 39, 37 and 12 arranged in the vertical direction. Among those communication paths 39, 37, 12, the upper communication path is a bypass passage 39 through which the refrigerant discharged from the compressor 1 and flowing into the upper space of the partition plate 19 within the header tank 17 flows into the tank space 65*b* of the gas-liquid separator 2*c*. This bypass passage 39 is provided below the inlet communication hole 36*a*, as shown in FIG. 31.

The intermediate communication path is an inlet flow path 37 through which the gas-liquid refrigerant having passed through the first heat exchange unit 2*d* flows into the tank space 65*b* of the gas-liquid separator 2*c* via intermediate space between the partition plate 19 and the restrictor 60 within the header tank 17.

The lower communication path is a communication path 12 through which the liquid refrigerant in the lower part within the tank space 65*b* of the gas-liquid separator 2*c* flows into the lower space of the restrictor 60 within the header tank 17.

According to the twenty-first embodiment, the auxiliary passage 65*a* for constituting the gas return passage 36, through which the gas refrigerant in the upper part within the tank space 65*b* of the gas-liquid separator 2*c* is introduced into the lower space of the restrictor 60 within the header tank 17, can be integrally molded with the tubular body portion 65 of the gas-liquid separator 2*c*. Therefore, it is no need to arrange a gas return passage 36 constituted of a pipe member in the outside of the gas-liquid separator 2*c* as shown in FIGS. 25, 26 and 28. Accordingly, it is possible to save the space and reduce the cost.

In the twenty-first embodiment, as in the nineteenth embodiment of FIG. 27, the communication path 12 for returning the liquid, constituted from a pipe member, may be arranged in the outside of the gas-liquid separator 2*c*. In this case, the communication path 12 for returning the liquid refrigerant may be constituted by the auxiliary passage 65*a* of the tubular body portion 65.

(Twenty-Second Embodiment)

Figure 32:
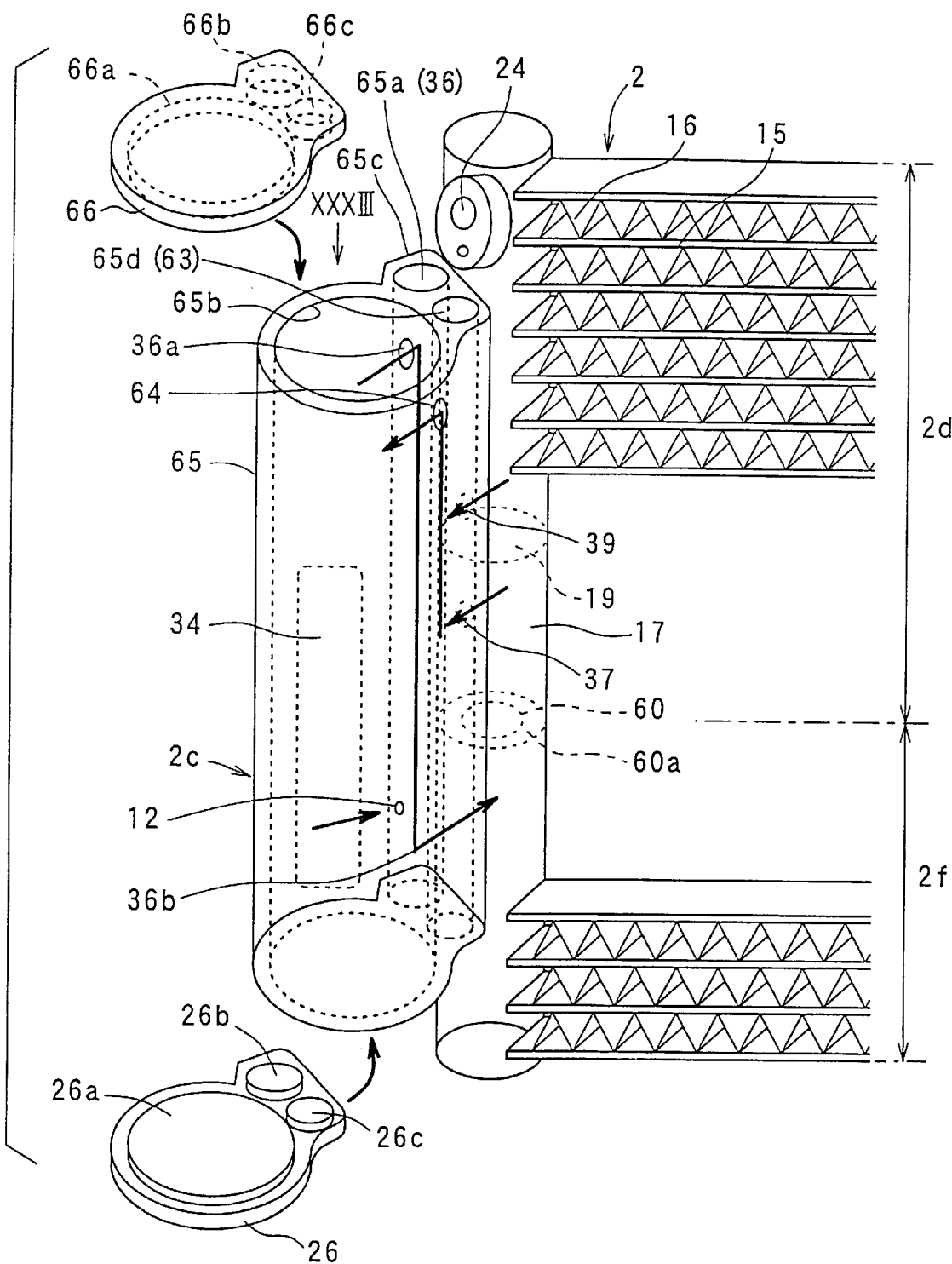
FIG. 32 is a perspective view showing a main part of a separator-integrated condenser in a disassembled state of a cap member, according a twenty-second preferred embodiment of the present invention.
Figure 33:
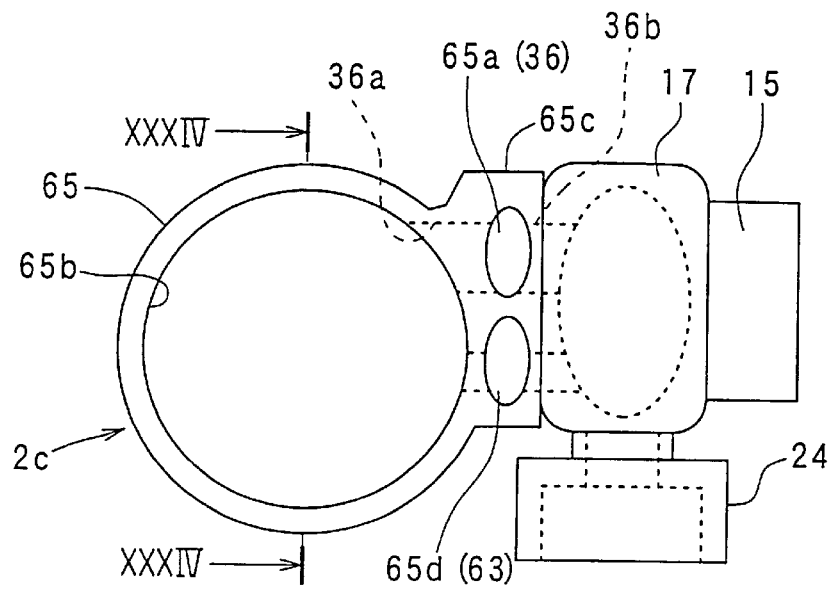
FIG. 33 is a top view. when being viewed from arrow XXXIII in FIG. 32.
Figure 34:
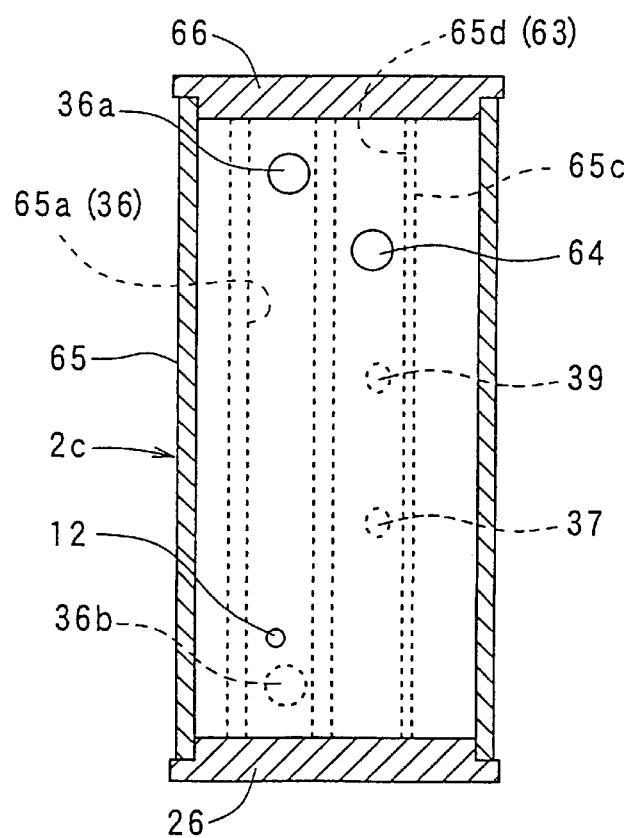
FIG. 34 is a cross-sectional view taken along line XXXIV—XXXIV in FIG. 33.

The twenty-second embodiment is a modification of the twenty-first embodiment. As shown in FIGS. 32 to 34, in the twenty-second embodiment, the projection 65*c* in the tubular body portion 65 of the gas-liquid separator 2*c* is provided with another auxiliary passage 65*d* in parallel with the auxiliary passage 65*a*. The tubular body portion 65 including these both auxiliary passages 65*a* and 65*d* can be integrally molded by extrusion or the like.

The present embodiment is the same as the twenty-first embodiment in that the first auxiliary passage 65*a* constitutes the gas return passage 36. However, in the present embodiment, the communication path 12 for returning the liquid refrigerant is communicated in the vicinity of the lower end portion of the first auxiliary passage 65*a*, so that the liquid refrigerant in the lower part within the tank space 65*b* of the gas-liquid separator 2*c* is introduced into the vicinity of the lower end portion of the first auxiliary passage 65*a* through the communication path 12. Accordingly, at the lower end portion of the first auxiliary passage 65a, the liquid refrigerant and the gas refrigerant are mixed and introduced into the lower space of the restrictor 60 within the header tank 17 from an outlet communication hole 36b provided in the vicinity of the lower end portion of the first auxiliary passage 65a. Therefore, the vicinity of the lower end portion of the first auxiliary passage 65a according to the present embodiment is also used as a liquid return passage.

In addition, a second auxiliary passage 65d constitutes the mixing chamber 63 of the twentieth embodiment of FIG. 28. That is, the second auxiliary passage 65d communicates with the upper space of the partition plate 19 within the header tank 17 through a bypass passage (communication hole) 39 of the compressor-discharged refrigerant. The second auxiliary passage 65d communicates with the intermediate space between the partition plate 19 and the restrictor 60 within the header tank 17 through an inlet passage (communication hole) 37.

Further, in the second auxiliary passage 65d, at an upper position of the bypass passage 39, there is provided an outlet communication path 64 through which the upper part of the second auxiliary passage 65d communicates to the upper part within the tank space 65b of the gas-liquid separator 2c. Thereby, the refrigerant discharged from the compressor 1 flows into the second auxiliary passage 65d (mixing chamber 63) from the bypass passage 39, and at the same time, the gas-liquid refrigerant having passed through the first heat exchange unit 2d flows into the second auxiliary passage 65d (mixing chamber 63) from the inlet flow path 37. Thus, after the gas-liquid refrigerant and the compressor-discharged gas refrigerant are mixed and heat-exchanged within the second auxiliary passage 65d (mixing chamber 63), the mixed refrigerant flows into the tank space 65b of the gas-liquid separator 2c from the outlet communication path 64 in the upper part of the second auxiliary passage 65d (mixing chamber 63).

As described above, according to the twenty-second embodiment, because the first auxiliary passage 65a constituting the gas return passage 36 and the second auxiliary passage 65d constituting the mixing chamber 63 are integrally molded with the tubular body portion 65 of the gas-liquid separator 2c, a number of components to be joined by brazing or the like is reduced, whereby a simple condenser capable of being manufactured in low cost can be constituted.

In the twenty-second embodiment, because the tubular body portion 65 is provided with two auxiliary passages 65a and 65d, protruded portions 26c and 66c each having a smaller area for blocking the second auxiliary passage 65d are added to the lower cap member 26 and the upper cap member 66, respectively, as compared with the twenty-first embodiment.

(Twenty-third Embodiment)

Figure 35:
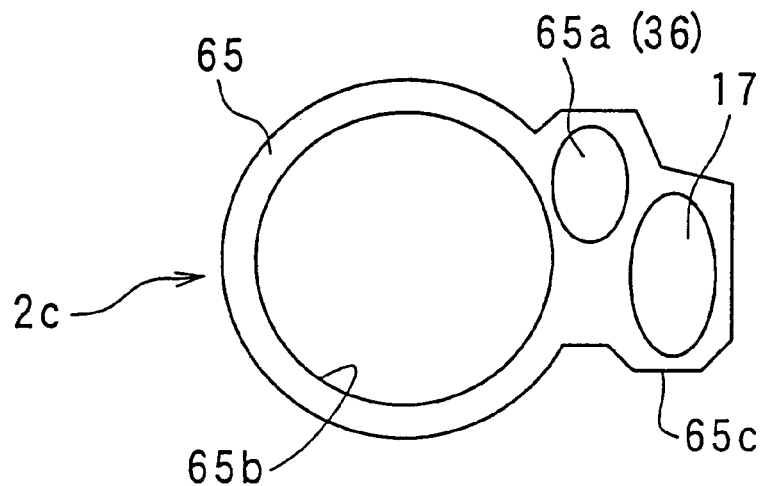
FIG. 35 is a top view showing an integrated structure of a tubular body portion of a gas-liquid separator and a header tank, according to a twenty-third embodiment of the present invention.

In the twenty-first and twenty-second embodiments, the structure have been arranged such that the tubular body portion 65 of the gas-liquid separator 2c and the header tank 17 are separately molded respectively, and the header tank 17 and the tubular body portion 65 are joined together by brazing or the like. However, in the twenty-third embodiment, the header tank 17 and the tubular body portion 65 are integrally molded by extrusion or the like, as shown in FIG. 35.

More concretely, in the twenty-third embodiment, the cross-sectional area of the projection 65c of the tubular body portion 65 is enlarged larger than in the twenty-first and twenty-second embodiments, and the auxiliary passage 65a constituting the gas return passage 36 and the header tank 17 are integrally molded together with this projection 65c. FIG. 35 is a top view corresponding to FIGS. 30 and 33. As shown in FIG. 35, because hollow shapes extending in parallel in the longitudinal direction (vertical direction) of the tubular body portion 65 are provided, the tank space 65b of the tubular body portion 65, the auxiliary passage 65a and the header tank 17 can be easily integrally molded by extrusion.

(Twenty-Fourth Embodiment)

Figure 36:
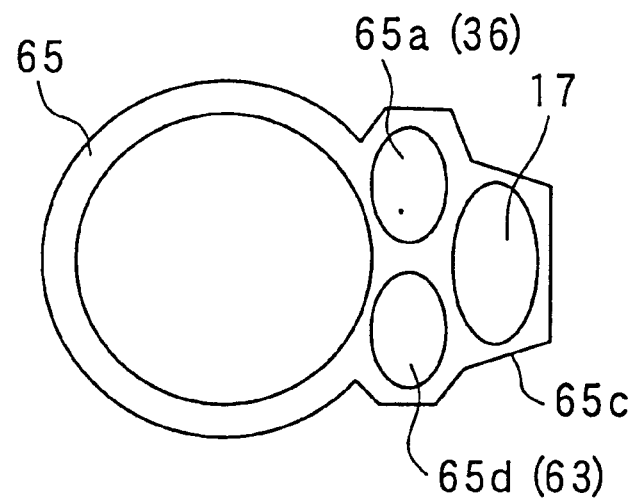
FIG. 36 is a top view showing an integrated structure of a tubular body portion of a gas-liquid separator and a header tank, according to a twenty-fourth embodiment of the present invention.

The twenty-fourth embodiment shown in FIG. 36 is different from the twenty-third embodiment in that the second auxiliary passage 65d constituting the mixing chamber 63 is also integrally molded.

According to the twenty-fourth embodiments, since the auxiliary passages 65a and 65d and the header tank 17 can be integrally molded with the tubular body portion 65 of the gas-liquid separator 2c, there is no need for a process in which these components are separately molded respectively to be integrally joined, but the cost can be further reduced. At the time of blazing, any occurrence of such defect that molten brazing material enters the communication path portion between the tubular body portion 65 and the header tank 17 to block the communication path portion, can be eliminated.

(Twenty-fifth Embodiment)

Figure 37:
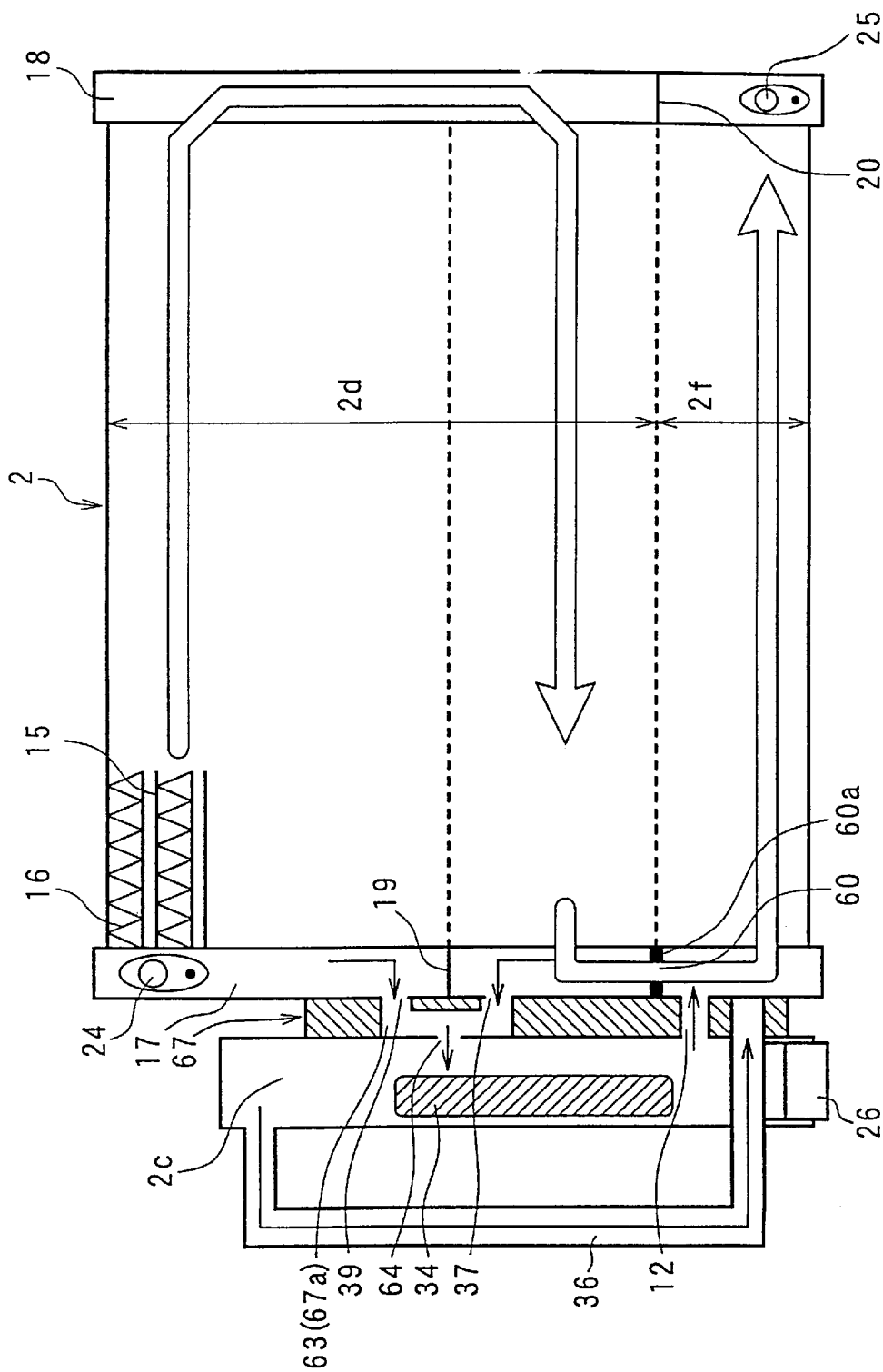
FIG. 37 is a schematic sectional view showing a separator-integrated condenser according a twenty-fifth preferred embodiment of the present invention.

FIGS. 37 and 38 show the twenty-fifth embodiment, which is deformation of the twentieth embodiment of FIG. 28. In the above-described twentieth embodiment, there is formed the mixing chamber 63 partitioned by the partition plate 62 within the gas-liquid separator 2c and extending in the vertical direction, so that the compressor-discharge refrigerant from the inlet joint 24 flows into the mixing chamber 63 through the bypass passage 39, and the gas-liquid refrigerant having passed through the first heat exchange unit 2d flows into the mixing chamber 63 through the inlet flow path 37.

However, according to the twenty-fifth embodiment, as shown in FIG. 37, between an outer wall surface of the gas-liquid separator 2c extending in the vertical direction and an outer wall surface of the header tank 17 extending in the vertical direction, a thick-walled plate member 67 is disposed, and a mixing chamber 63 is defined in this plate member 67.

Figures 38A, 38B:
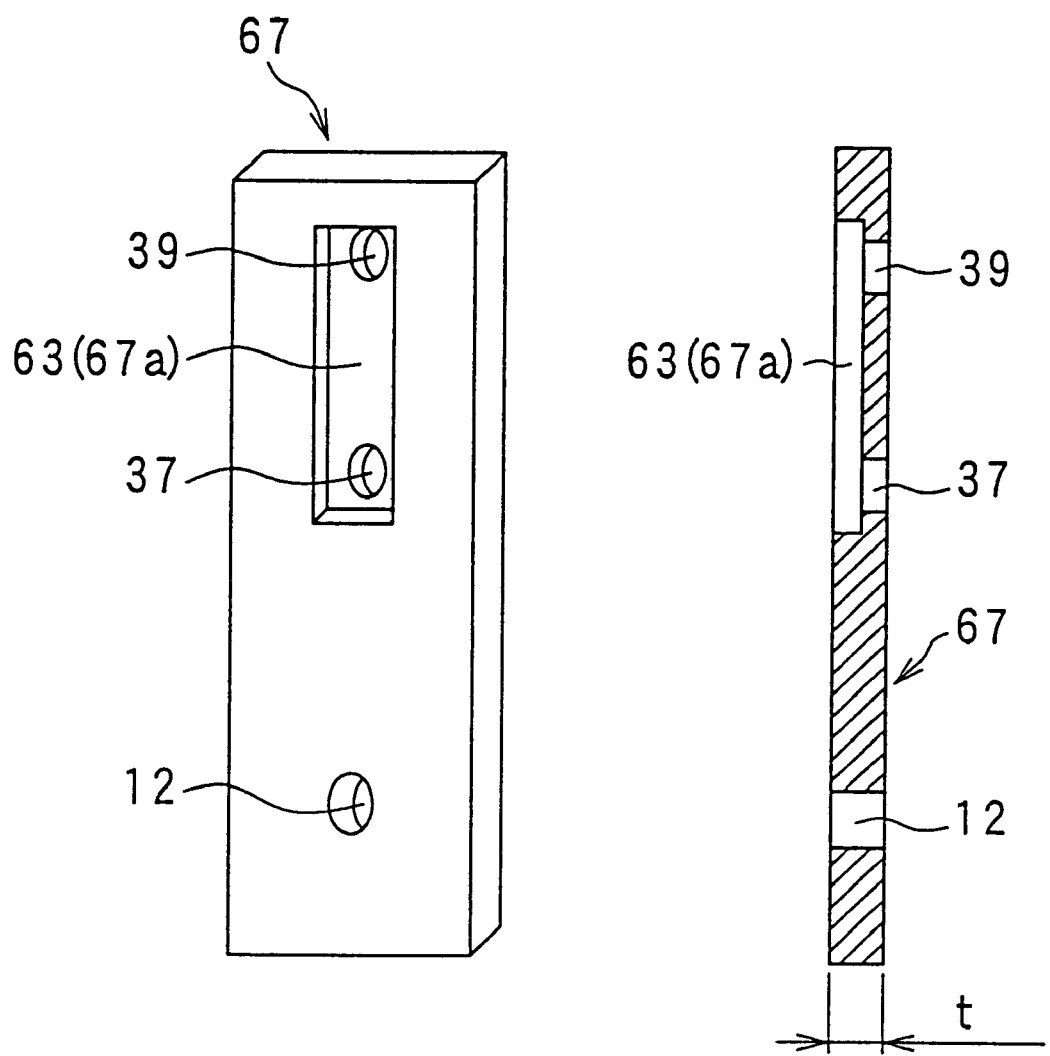
FIGS. 38A and 38B are a perspective view and a sectional view, respectively, showing a plate member used for the separator-integrated condenser in the twenty-fifth preferred embodiment.

Further, explaining concretely, FIGS. 38A and 38B show a concrete example of the plate member 67. As shown in FIGS. 38A and 38B, the plate member 67 of the present embodiment is formed into a longitudinal plate shape extending in the vertical direction using thick-walled material having a plate thickness "t" sufficiently larger than that of each of the gas-liquid separator 2c and the header tank 17, for example, about 5 mm. As material for forming the plate member 67, aluminum is used, similarly to that the gas-liquid separator 2c and the header tank 17. A surface of the plate member 67, on the side of the gas-liquid separator 2c, is provided with a longitudinal concave portion 67a having a rectangle shape to form the mixing chamber 63.

In this plate member 67, on the rear portion of the concave portion 67a, there are provided two upper and lower through-holes. The upper through-hole forms the bypass passage 39, and the lower through-hole forms the inlet flow path 37. The mixing chamber 63 communicates with the gas-liquid separator 2c through an outlet communication path 64 penetrating through a wall surface of the gas-liquid separator 2c. Further, in the plate member 67, at the lower part of the concave portion 67a, a through-hole penetrating through the plate thickness "t" of the plate member 67 is provided to form the liquid returning communication path 12.

Thus, the plate member 67 with each of the above-described portions is installed between the outer wall surface of the gas-liquid separator 2c and the outer wall surface of the header tank 17 to bond the plate member 67 to the outer wall surfaces of the gas-liquid separator 2c and the header tank 17 by brazing of aluminum. Thereby, between the gas-liquid separator 2c and the plate member 67, the mixing chamber 63 using the concave portion 67a can be formed.

The compressor-discharged refrigerant flows into the upper space of the partition plate 19 within the header tank 17 from the inlet joint 24 to flow into the upper part within the mixing chamber 63 through the bypass passage 39 from this upper space. Further, the gas-liquid refrigerant having passed through the first heat exchange unit 2d, flows into lower space of the partition plate 19, and this gas-liquid refrigerant flows into the lower part within the mixing chamber 63 through the inlet flow path 37.

Thus, after the refrigerant from the bypass passage and the refrigerant from the inlet flow path 37 are mixed within the mixing chamber 63, the mixed refrigerant flows into the gas-liquid separator 2c from the outlet communication path 64. The liquid refrigerant, which accumulates within the gas-liquid separator 2c, flows into the lowest space (lower space of the restrictor 60) within the header tank 17 through the communication path 12.

According to the twenty-fifth embodiment, since the mixing chamber 63 is formed by the plate member 67 installed between the outer wall surface of the gas-liquid separator 2c and the outer wall surface of the header tank 17, there is an advantage that the size and position of the mixing chamber 63 can be freely selected by the shape of the plate member 67.

In the twenty-fifth embodiment, the plate member 67 formed into the thick-walled plate having sufficiently larger plate thickness "t" than the plate thickness of the gas-liquid separator 2c and the header tank 17 is used, and the plate member 67 is provided with the concave portion 67a, whereby the mixing chamber 63 is formed. However, the plate member 67 formed into a thin-walled plate having the same plate thickness as the gas-liquid separator 2c and the header tank 17 may be used. In this case, it may be possible to press mold the plate member 67 to make a shape corresponding to the concave portion 67a for thereby forming the mixing chamber 63.

(Twenty-sixth Embodiment)

Figure 40:
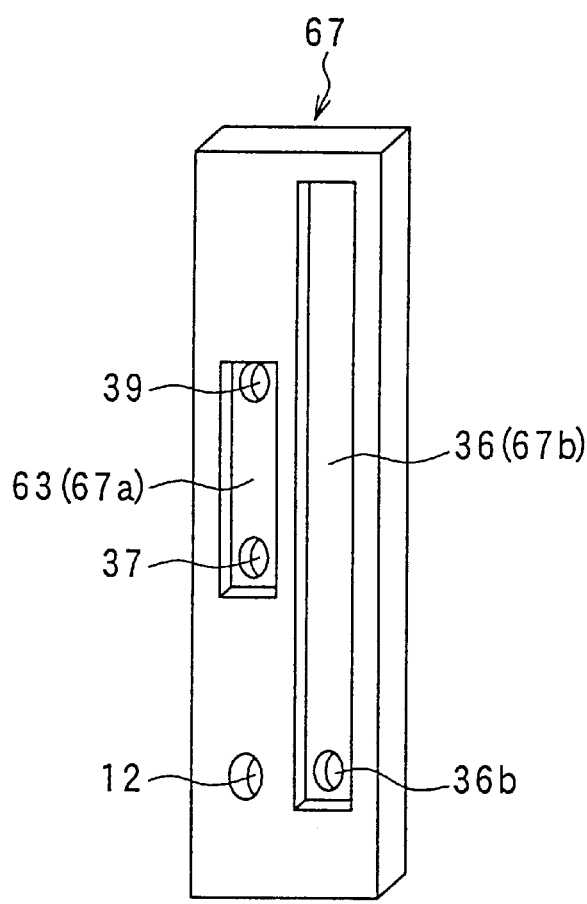
FIG. 40 is a perspective view showing a plate member used for the separator-integrated condenser according to the twenty-sixth embodiment.

FIGS. 39 and 40 show a twenty-sixth embodiment, which is a deformation of the twenty-fifth embodiment. In the above-described twenty-fifth embodiment, the gas return passage 36 through which the gas refrigerant in the upper part within the gas-liquid separator 2c is introduced into the lowest space (lower space of the restrictor 60) within the header tank 17 is formed by a pipe (pipe material). However, in the twenty-sixth embodiment, the gas return passage 36 is formed using a plate member 67 between the gas-liquid separator 2c and the header tank 17.

More concretely, the plate member 67 according to the twenty-sixth embodiment is provided with a first concave portion 67a on a surface thereof on the side of the gas-liquid separator 2c as shown in FIG. 40 in order to form a mixing chamber 63. On the other hand, on a side of this first concave portion 67a, there is formed a second concave portion 67b extending in the vertical direction in parallel with the first concave portion 67a.

This second concave portion 67b is provided to form a gas return passage 36, and therefore, is formed substantially along the length of the plate member 67 in the vertical direction. In the vicinity of the upper end portion of the gas-liquid separator 2c, there is opened an inlet communication hole 36a through which the vicinity of the upper end portion within the gas-liquid separator 2c communicates to the vicinity of the upper end portion of the second concave portion 67b. In the plate member 67, an outlet communication hole 36b is opened in the vicinity of the lower end portion of the second concave portion 67b, so that the vicinity of the lower end portion of the second concave portion 67b communicates to the lower space of the restrictor 60 within the header tank 17 through the outlet communication hole 36b.

According to the twenty-sixth embodiment, the gas refrigerant in the upper part within the gas-liquid separator 2c flows into the upper part of the gas return passage 36 (second concave portion 67b) of the plate member 67 through the inlet communication hole 36a, and the gas refrigerant flows downward through this gas return passage 36. Thereafter, the gas refrigerant flows into the lower space of the restrictor 60 within the header tank 17 through the outlet communication hole 36b located in the lower part of the gas return passage 36.

Therefore, not only the mixing chamber 63, but also the gas return passage 36 can be integrally molded with the plate member 67. In this case, there is no need to provide a pipe for forming the gas return passage 36, but a space for providing the pipe becomes unnecessary, and therefore, the mountability of the condenser 2 on a vehicle can be further improved.

In the twenty-sixth embodiment, since the mixing chamber 63 due to the first concave portion 67a, the bypass passage 39, the inlet flow path 37, the liquid returning communication path 12 and the like have the same structure as in the twenty-fifth embodiment, the illustration is omitted in FIG. 39.

(Twenty-seventh Embodiment)

Figure 42:
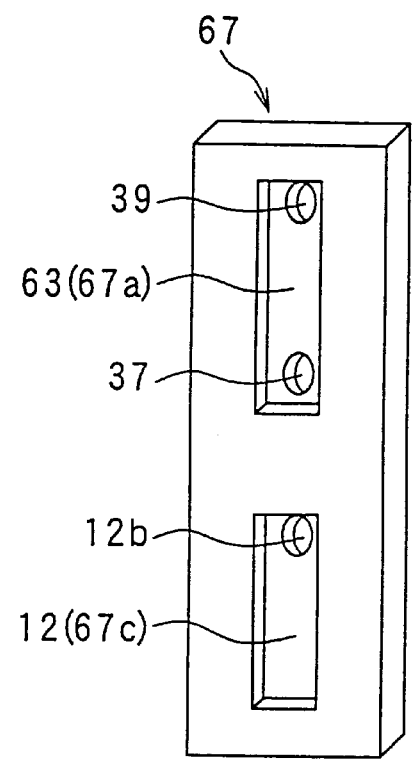
FIG. 42 is a perspective view showing a plate member used for the separator-integrated condenser according to the twenty-seventh embodiment.
Figure 41:
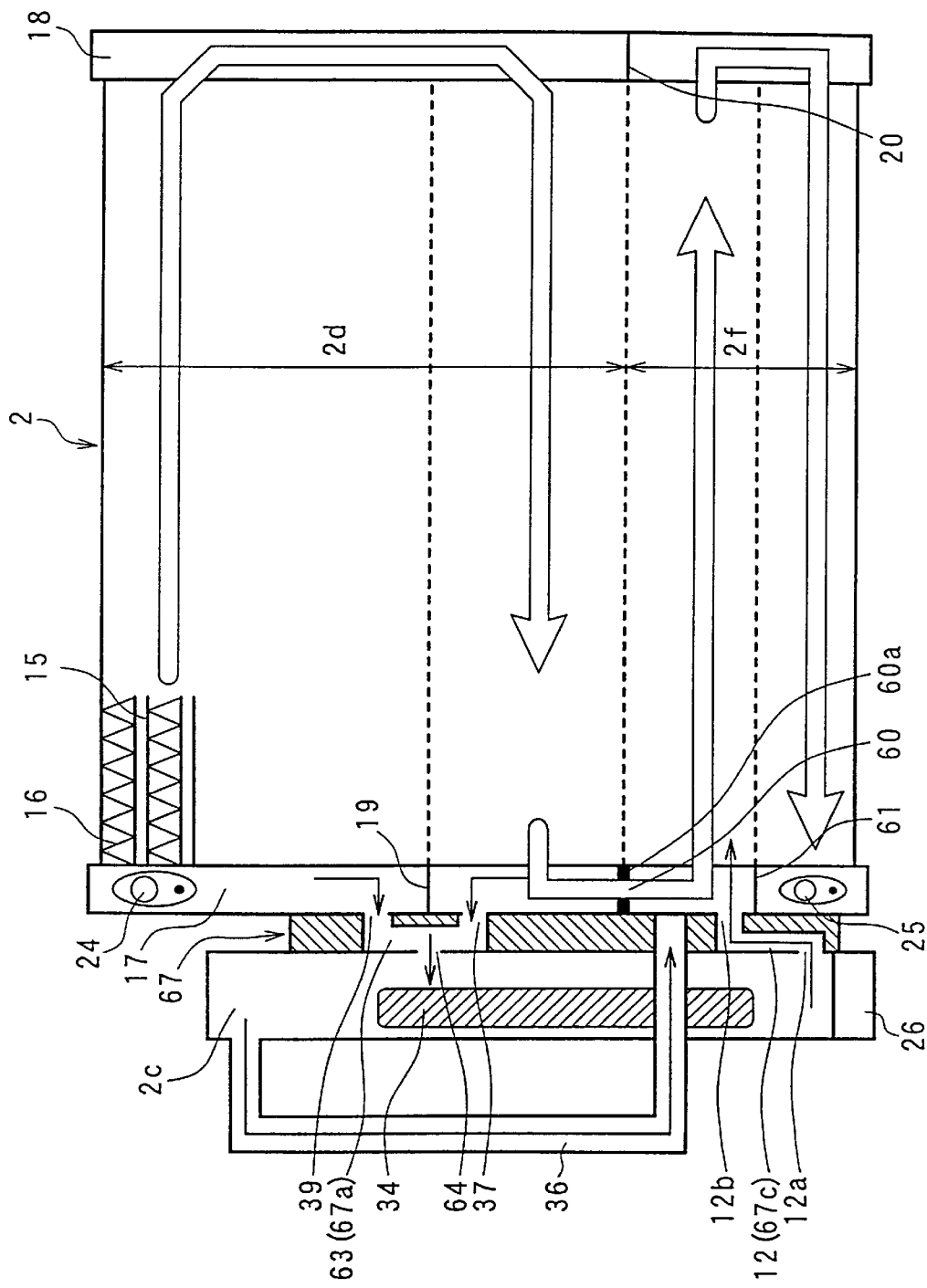
FIG. 41 is a schematic sectional view showing a separator-integrated condenser according a twenty-seventh preferred embodiment of the present invention.

FIGS. 41 and 42 show a twenty-seventh embodiment, which is a deformation of the above-described twenty-fifth embodiment. In the above-described twenty-fifth embodiment, the liquid returning communication path 12 is formed by opening a circular through-hole in the lower part of the plate member 67. However, in the twenty-seventh embodiment, the liquid returning communication path 12 is formed as shown in FIGS. 41 and 42.

More specifically, according to the twenty-seventh embodiment, the plate member 67 is provided with a second concave portion 67c for forming the liquid returning communication path 12 at a predetermined interval at an underside of a first concave portion 67a for forming the mixing chamber 63. Each of the first and second concave portions 67a and 67c has a longitudinal and rectangular shape.

In the vicinity of the bottom portion of the gas-liquid separator 2c, there is opened an inlet communication hole 12a, so that the vicinity of the lower end portion of the second concave portion 67c communicates to the vicinity of the bottom portion within the gas-liquid separator 2c through the inlet communication hole 12a. In the vicinity of the upper end portion of the rear portion of the second concave portion 67c, there is opened an outlet communication hole 12b, so that the vicinity of the upper end portion of the second concave portion 67c communicates to the lower space of the restrictor 60 within the header tank 17 through the outlet communication hole 12b.

According to the twenty-seventh embodiment, similarly to the above-described eighteenth embodiment of FIG. 26, a partition plate 61 is additionally provided in the underside of the restrictor 60. Further, in the lowest space below the partition plate 61 within the header tank 17, there is provided an outlet joint 25. Thereby, in the second heat exchange unit 2f on the underside of the condenser 2, there is formed a refrigerant flow which makes a U-turn in the lower space within the other header tank 18. Accordingly, in the condenser 2, it possible for the refrigerant flow to form a W-turn flow.

According to the twenty-seventh embodiment, because the outlet joint 25 is provided in the lowest space below the partition plate 61 in the header tank 17, the outlet communication hole 12b of the liquid returning communication path 12 is communicated to the space above the partition plate 61 in the header tank 17. In other words, the outlet communication hole 12b is positioned at the upper side of the partition plate 61.

On the other hand, in order to reliably take out the liquid refrigerant and the oil within the gas-liquid separator 2c, the inlet communication hole 12a of the liquid returning communication path 12 is requested to be arranged in proximity to the bottom portion within the gas-liquid separator 2c as far as possible. Accordingly, the inlet communication hole 12a of the liquid returning communication path 12 and the outlet communication hole 12b thereof are arranged to be offset from each other in the vertical direction.

In the twenty-seventh embodiment, because the plate member 67 is provided with the second concave portion 67c to form the liquid returning communication path 12, the inlet communication hole 12a and the outlet communication hole 12b can easily correspond to each other through the mediation of the second concave portion 67c even if they are deviated in the vertical direction.

In the above-described twenty-fifth to twenty-seventh embodiments, on the surface of the plate member 67 at a side of the gas-liquid separator 2c, the first concave portion 67a and the second concave portion 67b, 67c are provided. However, on the surface of the plate member 67 at the side of the header tank 17, there may be formed the first concave portion 67a (mixing chamber 63), the second concave portion 67b (gas return passage 36) and the second concave portion 67c (liquid returning communication path 12).

(Twenty-eighth Embodiment)

A twenty-eighth embodiment relates to improvement for restraining worsened refrigerant flow caused by a desiccant 34 for water absorption, arranged within the gas-liquid separator 2c. The entire structure of the condenser 2 according to the twenty-eighth embodiment may be similar to, for example, FIG. 25 of the seventeenth embodiment, and therefore, the whole schematic diagram of the condenser is omitted.

The desiccant 34 for water absorption is formed in a longitudinal shape (See FIG. 25) along the longitudinal shape of the gas-liquid separator 2c, and is arranged on the cap member 26 at the bottom portion of the gas-liquid separator 2c. Thus, the bottom portion of the desiccant 34 for water absorption is mounted on the top portion of the cap member 26 for being supported.

In this structure, when vibration and the like during traveling of the vehicle are applied to the desiccant 34, there occurs a phenomenon that the desiccant 34 moves to make the opening areas of the inlet flow path 37 and the liquid returning communication path 12, which oppose to the desiccant 34, narrower. As a result, a flow of the refrigerant from the inlet flow path 37 into the gas-liquid separator 2c and a flow of the refrigerant from the gas-liquid separator 2c into the communication path 12 may be inhibited.

Figure 43:
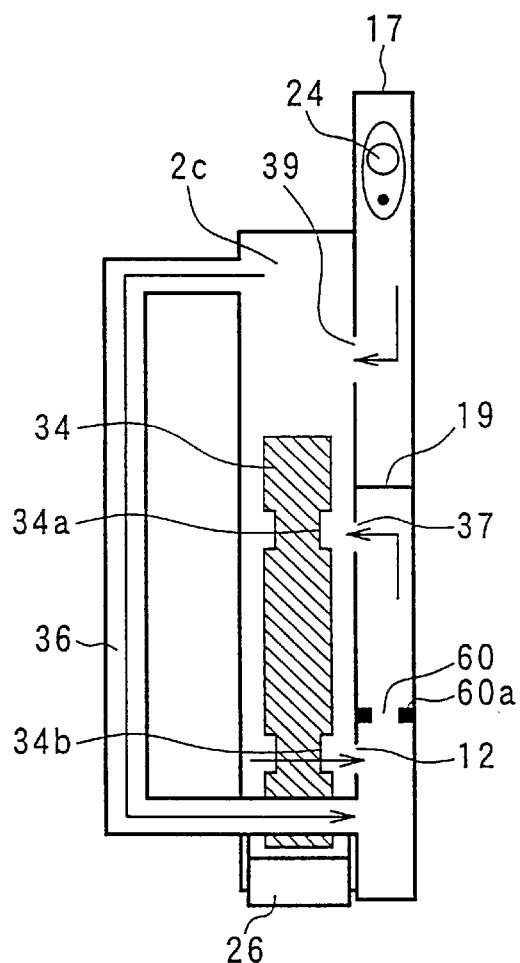
FIG. 43 is a schematic sectional view showing a main part of a separator-integrated condenser according a twenty-eighth preferred embodiment of the present invention.

Thus, in the twenty-eighth embodiment, in the light of the above-described points, as shown in FIG. 43, the desiccant 34 having a longitudinal shape is provided with constriction portions 34a and 34b (recess) at positions corresponding to the openings of the inlet flow path 37 and the liquid returning communication path 12, respectively.

More concretely, the desiccant 34 is normally constructed by containing granulated zeolite excellent in water absorbency within a bag-shaped member for holding. This bag-shaped member is made of a material such as felt, for allowing the refrigerant to circulate, and size of this bag-shaped member in the peripheral direction is partially made smaller at positions opposite to the openings of the inlet flow path 37 and liquid returning communication path 12, whereby the constriction portions 34a and 34b can be formed.

Accordingly, even if the desiccant 34 moves in a direction to approach the openings of the inlet flow path 37 and the liquid returning communication path 12 due to vibration or the like of the vehicle, the existence of the constriction portions 34a and 34b is capable of providing refrigerant passages in the vicinity of the openings of the inlet flow path 37 and the liquid returning communication path 12. Therefore, irrespective of the movement of the desiccant 34, inflow and outflow of the refrigerant between the gas-liquid separator 2c and the inlet flow path 37 or the liquid returning communication path 12 can be always performed favorably.

Figure 44:
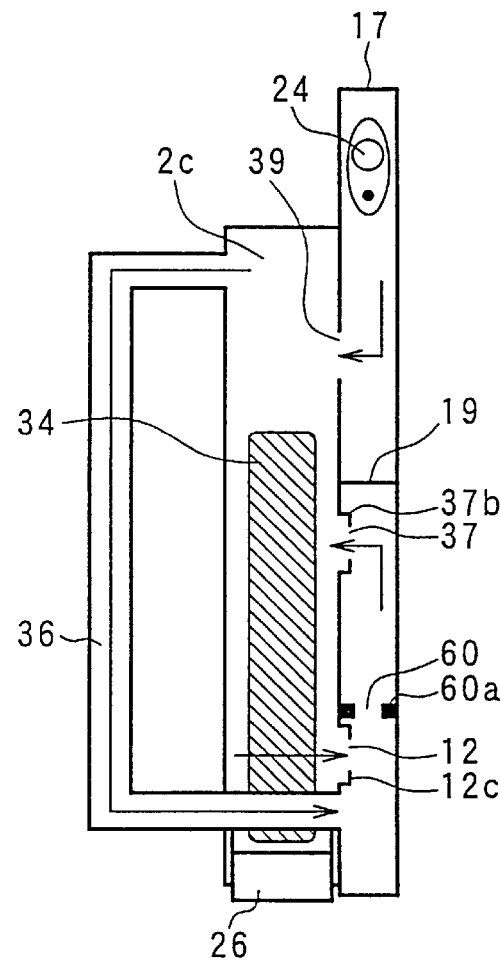
FIG. 44 is a schematic sectional view showing a main part of a separator-integrated condenser according a modification of the twenty-eighth embodiment of the present invention.

In the embodiment of FIG. 43, the desiccant 34 is provided with constriction portions 34a and 34b. However, as shown in FIG. 44, concave portions 37b and 12c, which are recessed to the side of the header tank 17, may be formed in the vicinity of the openings of the inlet flow path 37 and the liquid returning communication path 12. In this case, since the area of the passage opening opposing to the desiccant 34 can be enlarged due to the concave portions 37b and 12c, irrespective of the movement of the desiccant 34, inflow and outflow of the refrigerant in the inlet flow path 37 and the liquid returning communication path 12 can be always performed favorably, similarly to the case of FIG. 43.

(Twenty-ninth Embodiment)

Figure 45:
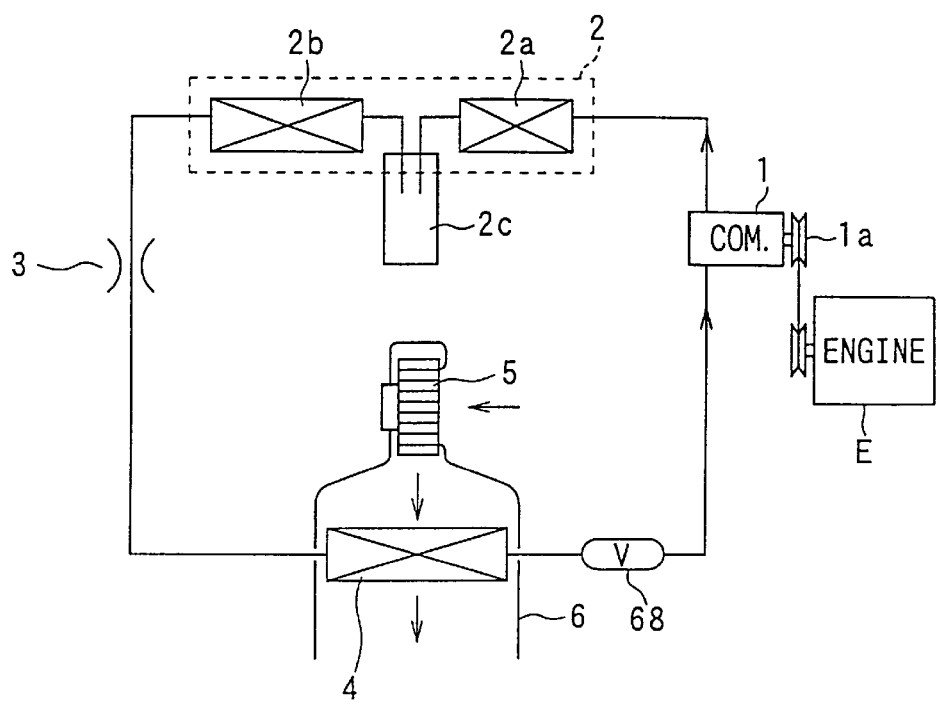
FIG. 45 is a schematic diagram showing a refrigerant cycle system according to a twenty-ninth preferred embodiment of the present invention.

In the twenty-ninth embodiment, as shown in FIG. 45, a volume chamber 68 having a volume, which allows a flow of the refrigerant sucked into the compressor 1 to be rapidly expanded, is disposed between the outlet side of the evaporator 4 and the suction side of the compressor 1. In FIG. 45, the volume chamber 68 is added to the refrigerant cycle system of FIG. 1. In the twenty-ninth embodiment, the other parts are similar to those of the above-described first embodiment.

The volume chamber 68 rapidly expands and rapidly shrinks the flow of the refrigerant sucked into the compressor 1 to reduce a pulsating noise of the sucked refrigerant by means of a loss due to this rapid expansion and rapid shrinkage. In other words, the volume chamber 68 constitutes an expansion muffler. Thereby, propagation, into the vehicle room, of the pulsating noise of the sucked refrigerant can be reduced.

According to the present invention, the super-heating degree of the refrigerant at outlet of the evaporator 4 is not directly controlled. Therefore, at a low flow amount where the circulating refrigerant flow amount within the cycle becomes low, that is, when the cooling thermal load is low like during idling of the engine at a low outside air temperature and the number of revolutions of the compressor 1 is low, the refrigerant at outlet of the evaporator 4 shifts from the super-heating area to the gas-liquid area so that return of the liquid refrigerant to the compressor 1 may occur.

Figure 46:
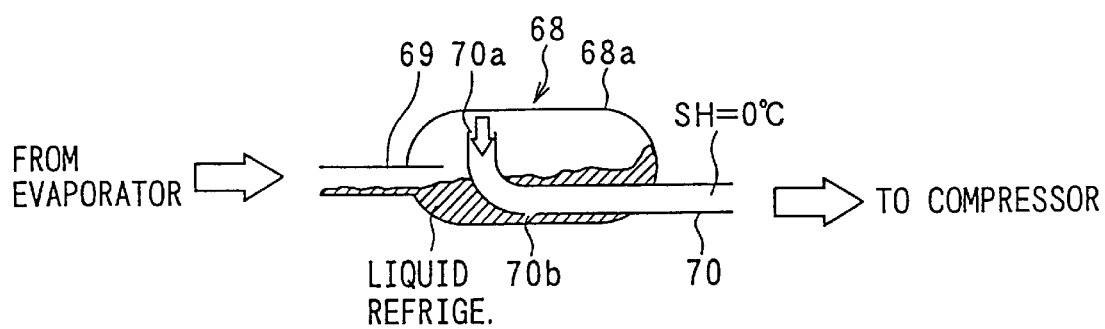
FIG. 46 is a schematic sectional view showing a volume chamber of the refrigerant cycle system according to the twenty-ninth embodiment.

Thus, in the twenty-ninth embodiment, a gas-liquid separating function of the refrigerant (compressor sucked refrigerant) at the outlet of the evaporator 4 is added to the volume chamber 68. Concretely, as shown in FIG. 46, the volume chamber 68 is formed by an oblong tank body 68a. Further, at one end side of the tank body 68a in the oblong direction (horizontal direction), a refrigerant inlet 69 communicating with the evaporator 4 is provided, while on the other end side, there is provided a suction pipe 70 of the compressor 1.

An inlet 70a of the suction pipe 70 is arranged at the upper part within the tank body 68a so as to suck the gas refrigerant in the upper part within the tank body 68a. Thereby, return of the liquid refrigerant into the compressor 1 at the low flow amount can be prevented.

A downstream portion of the inlet 70a of the suction pipe 70 is arranged in the vicinity of the bottom surface within the tank body 68a. In the suction pipe 70, a communication hole (oil return hole) 70b for sucking the liquid refrigerant and the oil is provided at a position which approaches the bottom surface within the tank body 68a. Therefore, the liquid refrigerant and the oil are sucked from the communication hole 70b, whereby the oil return property to the compressor 1 can be secured.

In addition, in the twenty-ninth embodiment, as the compressor 1, a variable capacity compressor capable of changing its discharge capacity is used. This variable capacity compressor 1 is adapted to reduce the discharge capacity at the low load, whereby the compressor power at the low load can be effectively reduced.

On the other hand, the variable capacity compressor 1 operates with a small capacity in the low load, whereby reduction of the circulating refrigerant flow amount within the cycle in the low load can be promoted. According to the twenty-ninth embodiment, it is possible to prevent the liquid refrigerant from returning to the compressor 1 by the gas-liquid separating function of the volume chamber 68 used as the expansion muffler. That is, in the twenty-ninth embodiment, it is possible to make the exhibition of power-saving effect using the variable capacity compressor 1, and the prevention of the liquid refrigerant return, compatible.

In this embodiment, the volume chamber 68 can have originally a capacity sufficient to exhibit the muffler effect, and can exhibit the gas-liquid separating function only in the low flow amount. Therefore, the volume chamber 68 can have much smaller capacity as compared with a conventional accumulator.

(Thirtieth Embodiment)

In the thirtieth embodiment, the structure (forming method) of the mixing chamber 63 according to the twentieth embodiment of FIG. 28 is changed.

Figure 47:
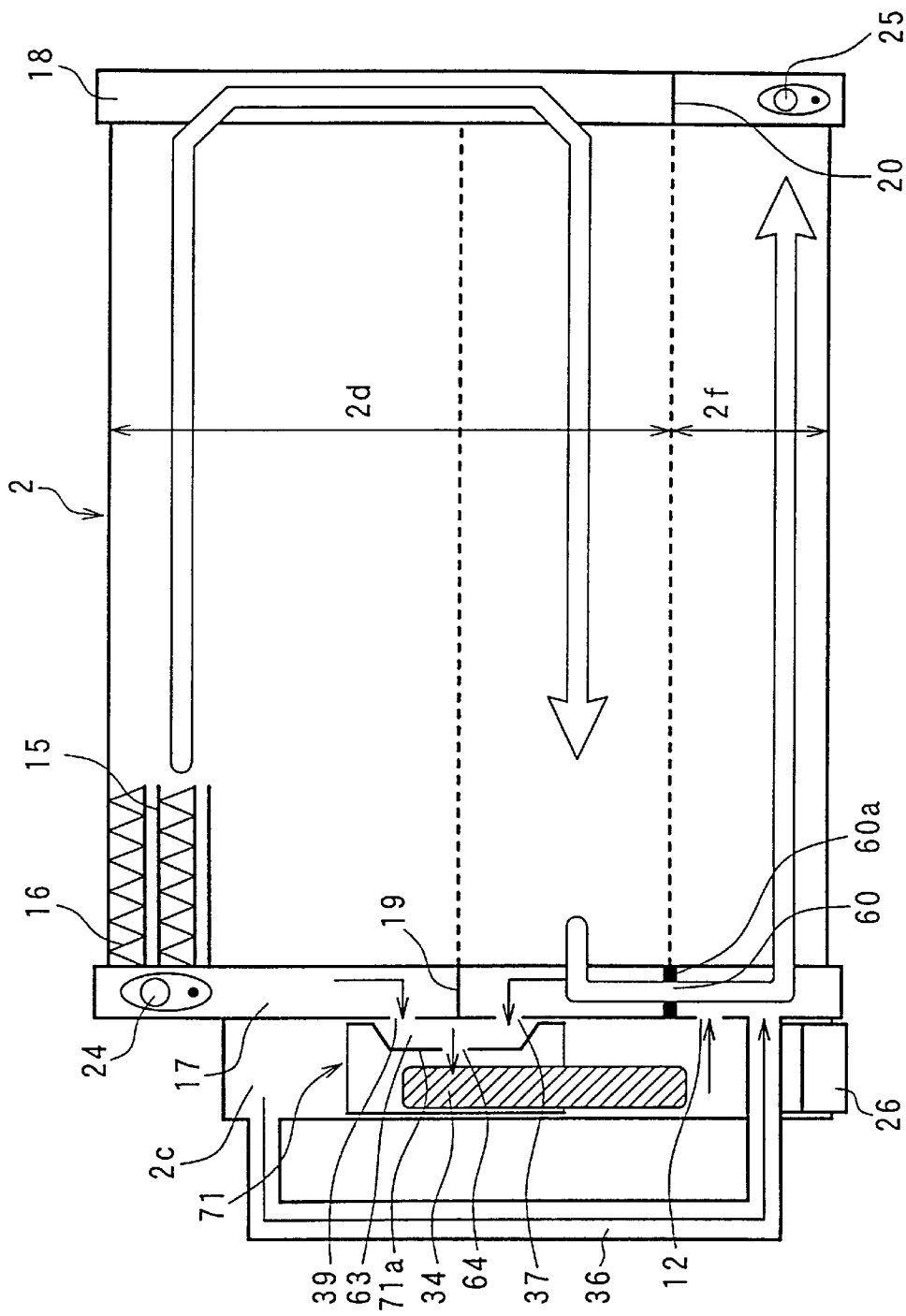
FIG. 47 is a schematic sectional view showing a separator-integrated condenser according to a thirtieth preferred embodiment of the present invention.

More specifically, according to the thirtieth embodiment, as shown in FIGS. 47, 48A and 48B, within a gas-liquid separator 2c, a cylindrical spacer member 71 is disposed along the inner wall surface thereof. This spacer member 71 is made of a metal such as aluminum, and is joined to the inner wall surface of the gas-liquid separator 2c. In the outer peripheral surface of the spacer member 71, at positions opposite to a bypass passage 39 and an inlet flow path 37 constituted of communication holes penetrating through wall surfaces of the gas-liquid separator 2c and the header tank 17, a concave portion 71a extending in the vertical direction is formed. A mixing chamber 63 extending in the vertical direction is formed by this concave portion 71a and an inner wall surface of a flat joined surface 2g of the gas-liquid separator 2c. Thus, in an intermediate position of the concave portion 71a in the vertical direction, there is opened an outlet communication path 64 through which the mixing chamber 63 communicates with the gas-liquid separator 2c.

Accordingly, a part of the refrigerant discharged from the compressor 1 flows into the mixing chamber 63 from the bypass passage 39, and at the same time, the gas-liquid refrigerant having passed through the first heat exchange unit 2d flows into the mixing chamber 63 from the inlet flow path 37. After the gas-liquid refrigerant and the refrigerant discharged from the compressor are mixed and are heat-exchanged within the mixing chamber 63, the mixed refrigerant flows into the gas-liquid separator 2c from the outlet communication path 64 of the mixing chamber 63.

According to the thirtieth embodiment, because the mixing chamber 63 is formed by the concave portion 71a of the spacer member 71 and the inner wall surface of the gas-liquid separator 2c, size and position of the mixing chamber 63 can be freely set by selection of a shape of the concave portion 71a in the spacer member 71. In the outer peripheral surface of the spacer member 71, if there is formed a concave portion which forms a gas return passage 36 and a liquid returning communication path 12 at positions different from the concave portion 71a for forming the mixing chamber 63, it will be possible to form the gas return passage 36 and the liquid returning communication path 12 in the spacer member 71. In FIG. 48B, the illustration of the gas return passage 36 is omitted.

(Thirty-first Embodiment)

Figure 49A:
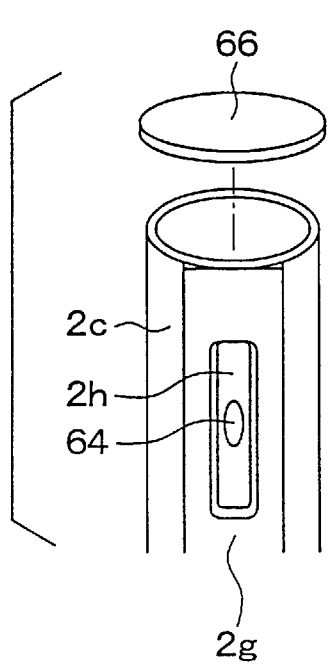
FIGS. 49A and 49B are a disassembled perspective view and a sectional view, respectively, showing a main part of a separator-integrated condenser according to a thirty-first embodiment of the present invention.
Figure 49B:
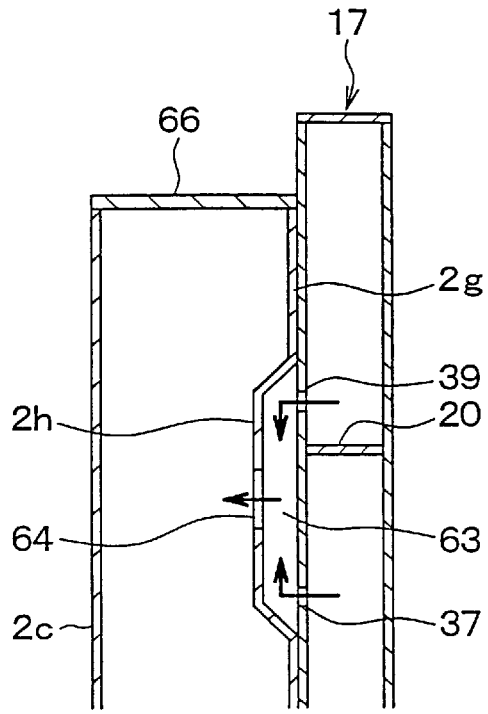

The thirty-first embodiment relates to an another structure (forming method) of the mixing chamber 63. According to the thirty-first embodiment, as shown in FIGS. 49A and 49B, a flat joined surface 2g of a gas-liquid separator 2c is provided with a concave portion 2h extending in the vertical direction, and a mixing chamber 63 extending in the vertical direction is formed by the concave portion 2h and the outer wall surface (a flat surface corresponding to the flat joined surface 2g) of the header tank 17. In this mixing chamber 63, there are opened a bypass passage 39 and an inlet flow path 37, which are constituted of communication holes penetrating through the wall surface of the header tank 17. In the intermediate position of the concave portion 2h in the vertical direction, there is opened an outlet communication path 64 through which the mixing chamber 63 communicates with the gas-liquid separator 2c.

According to the thirty-first embodiment, the mixing chamber 63 can be formed without the use of such an additional component as the spacer member 71 of the thirtieth embodiment.

(Thirty-second Embodiment)

Figure 50:
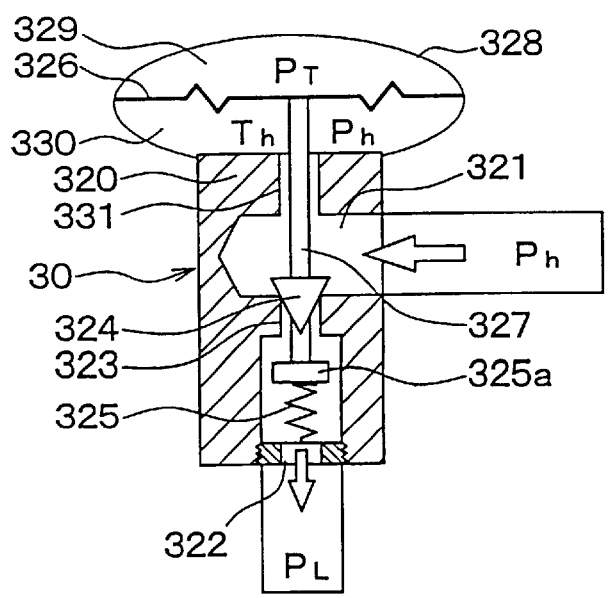
FIG. 50 is a schematic sectional view showing a variable restrictor (super-cooling control valve) according to a thirty-second embodiment of the present invention.
Figure 53:
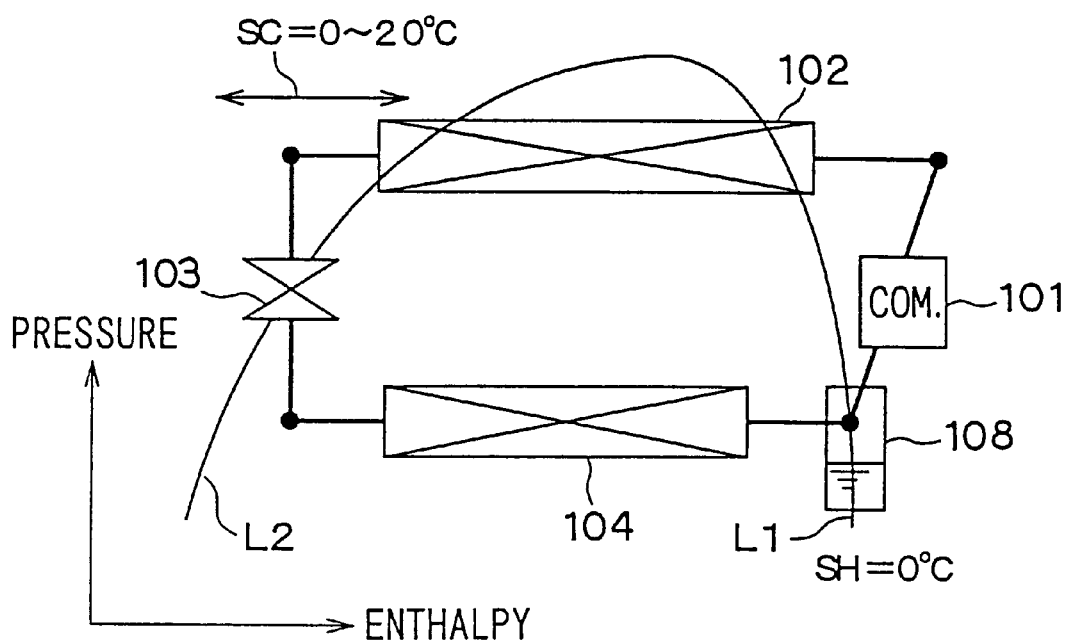
FIG. 53 is a Mollier diagram of an another conventional refrigerant cycle system.

FIG. 50 is a schematic sectional view showing a variable restrictor 30 according to the thirty-second embodiment of the present invention. In the thirty-second embodiment of the present invention, when the variable restrictor 30 is used as a decompression device as in the second embodiment of FIG. 4, this variable restrictor 30 is constituted of a super-cooling degree control valve, and the restrictor opening degree of the variable restrictor 30 is made variable in accordance with the super-cooling degree of the high-pressure refrigerant in a refrigerant cycle system.

As shown in FIG. 50, the variable valve 30 includes a valve housing 320. The valve housing 320 has a high-pressure refrigerant inlet 321 through which high-pressure refrigerant flows from the outlet side of the condenser 2, and a low-pressure refrigerant outlet 322 through which low-pressure refrigerant after the decompression is flowed out. The structure of the variable restrictor 30 is arranged such that a restriction flow path 323 is provided between this high-pressure refrigerant inlet 321 and the low-pressure refrigerant outlet 322, and that the opening degree of this restriction flow path 323 is made variable by a valve 324 movably arranged in the vertical direction of FIG. 50. In this respect, FIG. 50 shows a fully-closed state in which the valve 324 is abutted upon a valve seat of the restriction flow path 323.

A predetermined spring force Ps from a coil spring 325 is applied to the valve 324 through a spring supporting member 325*a* as a force in the direction that opens the valve. Onto the valve 324, a force caused by displacement of a diaphragm 326 is applied through a temperature-sensitive operating rod 327. A space within a diaphragm case 328 is partitioned into two upper and lower pressure chambers 329 and 330 by the diaphragm 326.

The upper first pressure chamber 329 is filled with refrigerant having property identical or approximate to circulating refrigerant within the cycle in a gas-liquid state, and temperature Th of inlet high-pressure refrigerant is conveyed to refrigerant filled within the first pressure chamber 329 through the temperature-sensitive operating rod 327 and the diaphragm 326, whereby the refrigerant filled within the first pressure chamber 329 generates saturated pressure PT corresponding to the temperature Th of the inlet high-pressure refrigerant.

On the other hand, in the lower second pressure chamber 330, pressure Ph of the inlet high-pressure refrigerant is introduced through a communication hole 331 of the valve housing 320. Accordingly, a difference in pressure between the two upper and lower pressure chambers 329 and 330 varies depending on a change in the super-cooling degree of the inlet high-pressure refrigerant.

The description will be concretely made of an operation of the super-cooling degree control valve 30 (variable restrictor) based on a change in the super-cooling degree of the inlet high-pressure refrigerant. When the super-cooling degree of the inlet high-pressure refrigerant becomes low, the temperature Th of the inlet high-pressure refrigerant becomes higher to raise saturated pressure Pt of the refrigerant filled within the first pressure chamber 329. Thereby, relationship of PT>(Ph+Ps) is satisfied, and the valve 324 makes a displacement in a direction that closes the valve to decrease the opening degree of the restriction flow path 323. Therefore, the high pressure Ph rises to increase the super-cooling degree of the inlet high-pressure refrigerant.

On the contrary, when the super-cooling degree of the inlet high-pressure refrigerant becomes high, the temperature Th of the inlet high-pressure refrigerant becomes lower to decrease saturated pressure Pt of the refrigerant filled within the first pressure chamber 329. Thereby, relationship of PT<(Ph+Ps) is satisfied, and the valve 324 makes a displacement in a direction that opens the valve to increase the opening degree of the restriction flow path 323, and therefore, the high pressure Ph lowers to decrease the super-cooling degree of the inlet high-pressure refrigerant. Thus, the super-cooling degree of refrigerant from the condenser 2 can be controlled within a predetermined range set by a spring force Ps of the coil spring 325.

According to the thirty-second embodiment, the variable valve 30 used as a decompression device is disposed to control the super-cooling degree of the outlet refrigerant from the condenser 2, the following advantages can be obtained. More specifically, when a fixed restrictor such as the decompression device 3 as in the first embodiment is used, on such condition as during an idling of the vehicle engine E that the cooling thermal load is high and the air amount of the condenser 2 decreases, the condenser cooling capacity becomes insufficient to decrease the degree of cooling of the high-pressure refrigerant, and the cooling performance lowers. According to the thirty-second embodiment, however, even when the condenser cooling capacity is insufficient at such a high load as described above, the high pressure Ph is raised by the variable restriction operation of the super-cooling degree control valve 30, whereby it is possible to secure the super-cooling degree of the outlet refrigerant of the condenser 2, and the cooling performance can be easily secured.

When the fixed restrictor such as the decompression device 3 of the first embodiment is used, the fixed restrictor always remains an opening state. Therefore, in the on-off control of the operation of the compressor 1, the operating (ON) time of the compressor 1 tends to become longer, and the stop (OFF) time tends to become shorter (See C1 of the above-described FIG. 8).

In contrast, in the thirty-second embodiment, when the high pressure Ph lowers when the compressor 1 is stopped (OFF), the valve 324 of the super-cooling degree control valve 30 is closed, and therefore, the compressor stop time can be extended by delaying a rise in the low pressure when the compressor 1 is stopped. During the operation (ON) of the compressor 1, in order to secure the super-cooling degree of the outlet refrigerant of the condenser 2, the valve 324 of the super-cooling degree control valve 30 controls the restriction opening degree to slightly restrict it. Therefore, the compressor operating time can be shortened by advancing a drop in the low pressure (See C1 of the above-described FIG. 8). Accordingly, the compressor driving power can be reduced by lowering the compressor operating efficiency.

Since the rise in the high pressure Ph can be fed back to a valve-opening operation of the valve 324 of the super-cooling degree control valve 30, the valve 324 becomes fully opened at an abnormal high pressure so that any rise in the high pressure Ph can be restricted.

(Thirty-third Embodiment)

The thirty-third embodiment performs a super-heating degree control, similar to the above-described fourteenth embodiment of FIG. 22. FIG. 51 shows a refrigerant cycle system according to the thirty-third embodiment. At the outlet side (suction side of the compressor 1) of the evaporator 4, there are provided a refrigerant temperature sensor 46*a* and a refrigerant pressure sensor 47*a*, detection signals from these both sensors 46*a* and 47*a* are inputted into super-heating determining means 49 of an electronic control unit 48, and this determining means 49 determines the degree of super-heat of the refrigerant from the evaporator 4. The signal of the super-heating degree obtained from the super-heating determining means 49 is given to heating amount control means 50. This heating amount control means 50 controls energization of an electric heater 51 for heating the liquid refrigerant provided under a gas-liquid separator 2*c*.

In other words, the energization of the electric heater 51 is controlled by the heating amount control means 50 in such a manner that the amount of heating of the electric heater 51 is increased as the super-heating degree of the refrigerant from the evaporator 4 becomes higher.

Therefore, according to the thirty-third embodiment, the amount of heating of the electric heater 51 is increased in accordance with the increase in the super-heating degree of the outlet refrigerant from the evaporator 4, whereby the amount of evaporation of the liquid refrigerant within the gas-liquid separator 2*c* can be increased, and the circulating refrigerant flow amount within the cycle can be increased. In other words, the amount of the liquid refrigerant within the gas-liquid separator 2*c* is changed in accordance with a change in the super-heating degree of the refrigerant from the evaporator 4, whereby the super-heating degree of the refrigerant discharged from the evaporator 4 can be controlled within a predetermined range by adjusting the circulating refrigerant flow amount within the cycle.

In this respect, the invention according to the thirty-third embodiment may be applied to the fifteenth embodiment of FIG. 23. In this case, the valve driving mechanism 53 for adjusting the opening degree of the valve 52 in the fifteenth embodiment of FIG. 23 can be changed to a mechanism that operates in response to the super-heating degree of the refrigerant from the evaporator 4, instead of the super-heating degree of discharged refrigerant from the compressor 1.

Although the present invention has been fully described in connection with the preferred embodiments thereof with reference to the accompanying drawings, it is to be noted that various changes and modifications will become apparent to those skilled in the art.

For example, in the above-described embodiments where the decompression device 3 is constructed by the fixed restrictor, it is of course that in place of this decompression device 3, the decompression device 30 constructed by the variable restrictor of FIG. 4, or the decompression device 30 consisting of a combination of the variable restrictor and the fixed restrictor of FIG. 7, or the super-cooling degree control valve 30 according to the thirty-second embodiment can be used.

In the low-pressure-side gas-liquid separator 40 according to the thirteenth embodiment (FIG. 21), the refrigerant amount adjusting means according to the fourteenth to sixteenth embodiments (FIGS. 22 to 24) can be also applied.

In the seventeenth to twenty-fourth embodiments shown in FIGS. 25 to 36, it may be possible to detachably construct the cap member 26 for blocking the lower end portion of the gas-liquid separator 2c similarly to the ninth embodiment shown in FIGS. 13 to 15, and to form a communication path (hole) 23a defining a part of the liquid returning communication path 12, in the cap member 26. Thereby, even in the seventeenth to twenty-fourth embodiments, the liquid returning communication path 12 can be simply tuned only by replacing the cap member 26.

In addition, in each of the above-described embodiments, the present invention is typically used for a refrigerant cycle system for vehicle air-conditioning, but it is of course that the present invention can be also used for refrigerant cycle systems for any other uses.

Such changes and modifications are to be understood as being within the scope of the present invention as defined by the appended claims.

What is claimed is:

1. A refrigerant cycle system comprising:
   a compressor which compresses and discharges refrigerant;
   a condenser for cooling and condensing refrigerant discharged from the compressor;
   a decompression device decompressing refrigerant from an outlet of the condenser; and
   an evaporator for evaporating refrigerant from the decompression device, the evaporator being disposed so that refrigerant from the evaporator is sucked into the compressor, wherein:
   the condenser includes a first heat exchange unit, a second heat exchange unit at a downstream side of the first heat exchange unit in a refrigerant flow direction, and a gas liquid separator arranged between the first heat exchange unit and the second heat exchange unit in the refrigerant flow direction in such a manner that refrigerant discharged from the compressor is cooled in the first heat exchange unit and at least gas refrigerant separated in the gas-liquid separator flows into the second heat exchange unit; and
   in the condenser, a refrigerant state flowing from the first heat exchange unit to the gas-liquid separator is changed in accordance with a super-heating degree of refrigerant discharged from the compressor to change a liquid refrigerant amount stored in the gas-liquid separator.

2. The refrigerant cycle system according to claim 1, further comprising
   a communication path through which liquid refrigerant stored in the gas-liquid separator is introduced into an upstream side of the decompression device in the refrigerant flow direction.

3. The refrigerant cycle system according to claim 2, further comprising
   a restriction unit for restricting an opening degree of the communication path, disposed in the communication path.

4. The refrigerant cycle system according to claim 1, wherein the decompression device is a fixed restrictor.

5. The refrigerant cycle system according to claim 1, wherein the decompression device is a variable restrictor which adjusts a restriction opening degree in accordance with a state of high-pressure refrigerant.

6. The refrigerant cycle system according to claim 5, wherein the variable restrictor has a variable throttle valve which changes an opening degree in accordance with a pressure difference between upstream and downstream sides of the variable throttle valve.

7. The refrigerant cycle system according to claim 1, wherein the evaporator is disposed inside a passenger compartment of a vehicle, and the decompression device is disposed outside the passenger compartment.

8. The refrigerant cycle system according to claim 1, wherein the first heat exchange unit and the second heat exchange unit are integrated to form a single heat exchanger.

9. The refrigerant cycle system according to claim 8, wherein the gas-liquid separator is disposed to be integrated with the first heat exchange unit and the second heat exchange unit.

10. The refrigerant cycle system according to claim 1, wherein the first heat exchange unit is disposed separately from the second heat exchange unit.

11. The refrigerant cycle system according to claim 1, further comprising
    a volume chamber member disposed between the evaporator and the compressor in the refrigerant flow direction, which expands a refrigerant flow passage to reduce a pulsating noise of refrigerant sucked into the compressor.

12. The refrigerant cycle system according to claim 11, wherein the volume chamber member has a volume chamber in which refrigerant from the evaporator is separated into gas refrigerant and liquid refrigerant.

13. The refrigerant cycle system according to claim 1, further comprising
    adjustment means for adjusting an amount of liquid refrigerant stored in the gas-liquid separator in accordance with the super-heating degree of refrigerant discharged from the compressor,
    wherein the adjustment means reduces the amount of liquid refrigerant stored in the gas-liquid separator when the super-heating degree of refrigerant discharged from the compressor increases.

14. The refrigerant cycle system according to claim 1, wherein:
the first heat exchange unit and the second heat exchange unit are disposed integrally to have a plurality of tubes disposed in parallel with each other, through which refrigerant flows;
the condenser further includes a first header tank disposed at one end side of the first and second heat exchange units to communicate with the tubes, and a second header tank disposed at the other end side of the first and second heat exchange units to communicate with the tubes; and
the gas-liquid separator is disposed to be integrated with any one of the first and second header tanks.

15. The refrigerant cycle system according to claim 5, wherein the decompression device is a variable restrictor which adjusts a restriction opening degree in accordance with a super-cooling degree of high-pressure refrigerant.

16. A refrigerant cycle system comprising:
a compressor which compresses and discharges refrigerant;
a condenser for cooling and condensing refrigerant discharged from the compressor;
a decompression device decompressing refrigerant from an outlet of the condenser;
an evaporator for evaporating refrigerant from the decompression device, the evaporator being disposed so that refrigerant from the evaporator is sucked into the compressor;
a gas liquid separator for separating refrigerant into gas refrigerant and liquid refrigerant; and
adjustment means for adjusting an amount of liquid refrigerant stored in the gas-liquid separator in accordance with a super-heating degree of refrigerant discharged from the compressor,
wherein the adjustment means reduces the amount of liquid refrigerant stored in the gas-liquid separator to increase a flow amount of refrigerant circulating in the compressor when the super-heating degree of refrigerant discharged from the compressor increases.

17. The refrigerant cycle system according to claim 16, wherein the adjustment means is disposed to always adjust the amount of liquid refrigerant stored in the gas-liquid separator when the compressor operates.

18. The refrigerant cycle system according to claim 16, further comprising:
a main refrigerant passage through which refrigerant flows through the compressor, the condenser, the decompression device and the evaporator in this order,
wherein the gas-liquid separator is disposed to separate refrigerant branched from the main refrigerant passage at a predetermined position into gas refrigerant and liquid refrigerant, and to return at least one of gas refrigerant and liquid refrigerant separated from each other to the main refrigerant passage at a downstream side of the predetermined position in the main refrigerant passage in a refrigerant flow direction.

19. The refrigerant cycle system according to claim 16, wherein:
the gas-liquid separator is disposed to separate refrigerant from the condenser into gas refrigerant and liquid refrigerant; and the adjustment means is a bypass passage through which a part of refrigerant discharged from the compressor is directly introduced into the gas-liquid separator while bypassing the condenser.

20. The refrigerant cycle system according to claim 16, wherein:
the gas-liquid separator is disposed at a downstream side of the decompression device in a refrigerant flow direction to separate refrigerant from the decompression device into gas refrigerant and liquid refrigerant; and
the adjustment means includes a bypass passage though which a part of refrigerant discharged from the compressor is introduced into the gas-liquid separator, and an additional decompressing unit disposed in the bypass passage to decompress refrigerant introduced into the gas-liquid separator.

21. The refrigerant cycle system according to claim 16, wherein the adjustment means is heating means for adjusting a heating amount of liquid refrigerant in the gas-liquid separator in accordance with the super-heating degree of refrigerant discharged from the compressor.

22. The refrigerant cycle system according to claim 16, further comprising
a main refrigerant passage through which refrigerant flows through the compressor, the condenser, the decompression device and the evaporator in this order,
wherein the adjustment means includes a communication path through which liquid refrigerant in the gas-liquid separator returns to the main refrigerant passage, and a valve disposed in the communication path to increase a valve opening degree in accordance with an increase of the super-heating degree of refrigerant discharged from the compressor.

23. The refrigerant cycle system according to claim 19, wherein the gas-liquid separator is disposed to return both gas refrigerant and liquid refrigerant separated from each other in the gas-liquid separator to the main refrigerant passage at a downstream side of the predetermined position in the refrigerant flow direction within the condenser.

24. The refrigerant cycle system according to claim 16, further comprising:
a refrigerant inlet provided in the one of the first and second header tanks, through which refrigerant from the compressor is introduced; and
a bypass passage through which a part of refrigerant flowing into the refrigerant inlet is directly introduced into the gas-liquid separator while bypassing the first heat exchange unit.

25. The refrigerant cycle system according to claim 16, wherein the decompression device is a fixed restrictor.

26. The refrigerant cycle system according to claim 16, wherein the decompression device is a variable restrictor which adjusts a restriction opening degree in accordance with a state of high-pressure refrigerant.

27. The refrigerant cycle system according to claim 26, wherein the variable restrictor has a variable throttle valve which changes an opening degree in accordance with a pressure difference between upstream and downstream sides of the variable throttle valve.

28. The refrigerant cycle system according to claim 26, wherein the decompression device is a variable restrictor which adjusts a restriction opening degree in accordance with a super-cooling degree of high-pressure refrigerant.

29. The refrigerant cycle system according to claim 16, wherein the evaporator is disposed inside a passenger compartment of a vehicle, and the decompression device is disposed outside the passenger compartment.

30. The refrigerant cycle system according to claim 16, further comprising
a volume chamber member disposed between the evaporator and the compressor in the refrigerant flow direction, which expands a refrigerant flow passage to reduce a pulsating noise of refrigerant sucked into the compressor.

31. The refrigerant cycle system according to claim 30, wherein the volume chamber member has a volume chamber in which refrigerant from the evaporator is separated into gas refrigerant and liquid refrigerant.

32. A refrigerant cycle system comprising:
a compressor which compresses and discharges refrigerant;
a condenser for cooling and condensing refrigerant discharged from the compressor;
a decompression device decompressing refrigerant from an outlet of the condenser;
an evaporator for evaporating refrigerant from the decompression device, the evaporator being disposed so that refrigerant from the evaporator is sucked into the compressor;
a main refrigerant passage in which the compressor, the condenser, the decompression device and the evaporator are disposed in this order;
a gas liquid separator for separating refrigerant into gas refrigerant and liquid refrigerant; and
adjustment means for adjusting an amount of liquid refrigerant stored in the gas-liquid separator in accordance with a super-heating degree of refrigerant circulating in the main refrigerant passage,
wherein the adjustment means reduces the amount of liquid refrigerant stored in the gas-liquid separator to increase a flow amount of refrigerant circulating in the main refrigerant passage when the super-heating degree of refrigerant circulating in the main refrigerant passage increases.

33. A condenser for a refrigerant cycle system comprising:
a heat-exchanging portion having a plurality of tubes disposed in parallel with each other, through which refrigerant flows, the heat-exchanging portion is composed of a first heat exchange unit and a second heat exchange unit disposed in order in a refrigerant flow direction;
first and second header tanks disposed at both sides of the heat-exchanging portion to communicate with the tubes; and
a gas-liquid separator disposed to separate refrigerant into gas refrigerant and liquid refrigerant, between the first heat exchange unit and the second heat exchange unit in the refrigerant flow direction, wherein:
the first heat exchange unit is for cooling and condensing refrigerant from the compressor;
the gas-liquid separator is disposed to separate refrigerant from the first heat exchange unit into gas refrigerant and liquid refrigerant;
the second heat exchange unit is disposed to cool and condense gas refrigerant from the gas-liquid separator; and
the gas-liquid separator is disposed to be integrated with one of the first and second header tanks.

34. The condenser according to claim 33, wherein:
the gas-liquid separator is disposed to form a gyrating flow of refrigerant flowing from the first heat exchange portion to generate a centrifugal force; and
the gas-liquid separator separates refrigerant into gas refrigerant and liquid refrigerant using the centrifugal force due to the gyrating flow.

35. The condenser according to claim 33, further comprising:
a communication path through which liquid refrigerant stored in the gas-liquid separator is introduced into the one of the first and second header tanks.

36. The condenser according to claim 35, wherein:
the gas-liquid separator has a tank portion and a cap member detachably attached to a lower end of the tank portion to close the lower end of the tank portion; and
the communication path is provided in the cap member.

37. The condenser according to claim 36, further comprising
a filter for filtering liquid refrigerant passing through the communication path, wherein the filter is disposed in the cap member.

38. The condenser according to claim 33, further comprising:
a refrigerant inlet provided in the one of the first and second header tanks, through which refrigerant from the compressor is introduced; and
a bypass pass age through which a part of refrigerant flowing into the refrigerant inlet is directly introduced into the gas-liquid separator while bypassing the first heat exchange unit.

39. A condenser for a refrigerant cycle system having a compressor for compressing refrigerant, the condenser comprising:
a heat-exchanging portion having a plurality of tubes disposed in parallel with each other, through which refrigerant flows;
first and second header tanks disposed at both sides of the heat-exchanging portion to communicate with the tubes, the first header tank having a refrigerant inlet through which refrigerant discharged from the compressor is introduced;
a gas-liquid separator disposed to separate refrigerant into gas refrigerant and liquid refrigerant, the gas-liquid separator being integrally connected to the first header tank; and
a bypass passage through which a part of refrigerant flowing into the refrigerant inlet from the compressor is directly introduced into the gas-liquid separator while by passing the heat-exchanging portion.

40. The condenser according to claim 39, wherein the bypass passage is a communication path through which a space within the first header tank communicates with a space within the gas-liquid separator.

41. The condenser according to claim 39, wherein the heat exchanging portion and the first and second header tanks are disposed to define a refrigerant passage, the refrigerant passage being U-turned once in each of the first and second header tanks, the condenser further comprising:
an inlet flow path provided between the first header tank and the gas-liquid separator, through which a part of refrigerant in the refrigerant passage is branched to be introduced into the gas-liquid separator;
a gas return passage through which gas refrigerant within the gas-liquid separator is introduced into the refrigerant passage at a downstream side position from the inlet flow path in a refrigerant flow direction; and a liquid return passage through which liquid refrigerant within the gas-liquid separator is introduced into the refrigerant passage at a downstream side position from the inlet flow path in the refrigerant flow direction.

42. The condenser according to claim 41, further comprising restrictor means provided between a branch point at which the inlet flow path is branched from the refrigerant passage, and a join point at which the gas return path and the liquid return path are joined in the refrigerant passage.

43. The condenser according to claim 41, further comprising:

a mixing chamber in which refrigerant from the bypass passage and refrigerant from the inlet flow path are mixed, wherein the mixing chamber is provided in such a manner that refrigerant mixed in the mixing chamber is introduced into the gas-liquid separator.

44. The condenser according to claim 41, wherein:

the gas-liquid separator includes a cylindrical body portion defining a tank space in which refrigerant is received to be separated into gas refrigerant and liquid refrigerant;

the cylindrical body portion has an auxiliary passage extending in parallel with the tank space; and the auxiliary passage is provided to define at least one of the gas return path and the liquid return path.

45. The condenser according to claim 43, wherein:

the gas-liquid separator includes a cylindrical body portion defining a tank space in which refrigerant is received to be separated into gas refrigerant and liquid refrigerant;

the cylindrical body portion has first and second auxiliary passages extending in parallel with the tank space;

the first auxiliary passage is provided to define at least one of the gas return path and the liquid return path; and the second auxiliary passage is provided to define the mixing chamber.

46. The condenser according to claim 45, wherein the cylindrical body portion and the first header tank are integrally molded.

47. The condenser according to claim 41, wherein:

the gas-liquid separator has a tank portion and a cap member detachably attached to a lower end of the tank portion to close the lower end of the tank portion; and the liquid return path is provided in the cap member.

48. The condenser according to claim 41, further comprising a desiccant for a water absorption, disposed within the gas-liquid separator to have a space around the desiccant in the gas-liquid separator, wherein:

the desiccant is disposed opposite to at least one of the inlet flow path and the liquid return path; and the space around the desiccant within the gas-liquid separator is set to be larger at a position where the at least one of the inlet flow path and the liquid return path is provided.

49. The condenser according to claim 39, wherein:

the gas-liquid separator has a cylindrical body portion defining a tank space; and the cylindrical body portion is formed integrally with the first header tank.

50. The condenser according to claim 43, further comprising a plate member disposed between the gas-liquid separator and the first header tank, wherein the plate member is disposed to define the mixing chamber.

* * * * *